(12) United States Patent
Shimizu et al.

(10) Patent No.: US 6,323,969 B1
(45) Date of Patent: Nov. 27, 2001

(54) COLOR CONVERTING APPARATUS AND METHOD

(75) Inventors: Masayoshi Shimizu; Shoji Suzuki; Satoshi Semba, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,674

(22) Filed: Mar. 24, 1998

(30) Foreign Application Priority Data

Jul. 31, 1997 (JP) .................................................. 9-206741

(51) Int. Cl.⁷ ....................................................... G03F 3/08
(52) U.S. Cl. ............................................. 358/523; 358/518
(58) Field of Search ........................... 395/109; 358/518, 358/523; 382/167, 170, 172

(56) References Cited

U.S. PATENT DOCUMENTS

| | | | |
|---|---|---|---|
| 4,837,722 | 6/1989 | Sara | 364/723 |
| 5,241,373 | * 8/1993 | Kanamori et al. | 358/27 |
| 5,377,025 | * 12/1994 | Spaulding et al. | 358/523 |
| 5,428,465 | * 6/1995 | Kanamori et al. | 358/518 |
| 5,438,649 | * 8/1995 | Ruetz | 395/109 |
| 5,471,324 | 11/1995 | Rolleston | 358/518 |
| 5,689,350 | * 11/1997 | Rolleston | 358/504 |
| 5,699,491 | * 12/1997 | Barzel | 358/523 |
| 5,724,442 | * 3/1998 | Ogatsu et al. | 358/523 |
| 5,933,252 | * 8/1999 | Emori et al. | 358/500 |

FOREIGN PATENT DOCUMENTS 7-30774   1/1995   (JP) .

OTHER PUBLICATIONS

Panasonic, "Key Device for Color Management, High–Speed Color Transformation Processor MN5515", Apr. 1, 1997, Matsushita Electric Industry Co., Ltd.

Kawamura, et al., "Device Independent Color Reproduction and Evaluation of Hardcopy in Scanner–Printer System", Mar. 1993, Technical Report of IEICE, IE92–121, PRU92–144, The Institute of Electronic Information and Communication Engineers.

Ogatsu, et al., "An Accurate Color Transformation Algorithm Based on Flexible GCR, (1) Application to Real Time Image Processing", 1994, Collection of 1994 Japan Hard Copy Papers, B–3P.

* cited by examiner

Primary Examiner—Cheukfan Lee
(74) Attorney, Agent, or Firm—Staas & Halsey LLP

(57) ABSTRACT

A color converting apparatus and method which accurately converts a color signal in the vicinity of the boundary of a color range of a color reproducing device. This enables dissimilar devices to exchange color images and accurately reproduce colors from the sending device to the receiving device despite different color capabilities of the two devices. This is accomplished by a first color converted result and a second color converted result are stored in a color conversion table. The first color converted result is obtained by converting an input color signal into a color signal that is color-reproducible. The second color converted result is obtained by converting an input color signal into a color signal that is not color-reproducible. In a region outside of the color reproducible range of a printer, a display, or other similar devices, when the relationship of an input color signal is accurately kept, a color signal is accurately performed.

39 Claims, 39 Drawing Sheets

| L*a*b* VALUE | CMY VALUE | |
|---|---|---|
| OMITTED | | ⎫ |
| 0 0 0 | 312 302 298 | ⎬ OUT OF COLOR RANGE |
| OMITTED | | ⎭ |
| 12.5 0 0 | 273 271 257 | ⎫ |
| OMITTED | | ⎪ |
| 25 0 0 | 228 224 208 | ⎬ IN COLOR RANGE |
| OMITTED | | ⎪ |
| 37.5 0 0 | 182 185 161 | ⎭ |
| OMITTED | | ⎱ OUT OF COLOR RANGE |
| 50 0 -128 | 261 96 -112 | ⎰ |
| 50 0 -96 | 244 112 -47 | ⎫ |
| 50 0 -64 | 202 129 2 | ⎪ |
| 50 0 -32 | 171 133 51 | ⎬ IN COLOR RANGE |
| 50 0 0 | 135 140 112 | ⎪ |
| OMITTED | | ⎭ |

FIG. 3

(a) SCHEMATIC DIAGRAM SHOWING CUBE INTERPOLATION (b) SCHEMATIC DIAGRAM SHOWING TRIANGULAR PRISM INTERPOLATION (c) SCHEMATIC DIAGRAM SHOWING TETRAHEDRON INTERPOLATION

| L*a*b* VALUE | CMY VALUE | |
|---|---|---|
| OMITTED | | } OUT OF COLOR RANGE |
| 0 0 0 | 266 266 272 | |
| OMITTED | | |
| 16 0 0 | 232 238 222 | } IN COLOR RANGE |
| OMITTED | | |
| 32 0 0 | 198 210 172 | |
| OMITTED | | } OUT OF COLOR RANGE |
| 48 0 -96 | 311 113 -89 | |
| 48 0 -80 | 276 118 -54 | |
| 48 0 -64 | 241 123 -19 | |
| 48 0 -48 | 206 128 16 | } IN COLOR RANGE |
| 48 0 -32 | 171 133 51 | |
| OMITTED | | |

*FIG. 17*

CASE THAT CMY VALUE IS LESS THAN 0

CASE THAT CMY VALUE IS EXCEEDS 255

| L✴a✴b✴ VALUE | CMY VALUE |
|---|---|
| OMITTED | |
| 0 0 0 (OUT OF COLOR RANGE) | 266 266 272 |
| OMITTED | |
| 16 0 0 (IN COLOR RANGE) | 232 238 222 |
| OMITTED | |
| 32 0 0 (IN COLOR RANGE) | 198 210 172 |
| OMITTED | |
| 48 0 -96 (OUT OF COLOR RANGE) | 311 113 -89 |
| 48 0 -80 (OUT OF COLOR RANGE) | 276 118 -54 |
| 48 0 -64 (IN COLOR RANGE) | 241 123 -19 |
| 48 0 -48 (IN COLOR RANGE) | 206 128 16 |
| 48 0 -32 (IN COLOR RANGE) | 171 133 51 |
| OMITTED | |

- Row 1–2: OUT OF COLOR RANGE
- Rows 3–7: IN COLOR RANGE
- Rows 8–9: OUT OF COLOR RANGE
- Rows 10–13: IN COLOR RANGE

FIG. 37

| L*a*b* VALUE | CMY VALUE |
|---|---|
| 0 -128 -128 | 255 235 230 |
| 0 -128 -96 | 255 240 247 |
| 0 -128 -64 | 255 240 253 |
| OMITTED | |
| 12.5 -128 -128 | 255 255 255 |
| OMITTED | |
| 12.5 0 0 | 255 255 255 |
| OMITTED | |
| 25 0 0 | 228 224 208 |
| OMITTED | |
| 37.5 0 0 | 182 185 161 |
| OMITTED | |
| 50 0 -128 | 255 111 0 |
| 50 0 -96 | 240 120 0 |
| 50 0 -64 | 202 129 2 |
| 50 0 -32 | 171 133 51 |
| 50 0 0 | 135 140 112 |
| OMITTED | |
| 100 128 128 | 10 0 15 |

} IN COLOR RANGE

FIG. 39
*PRIOR ART*

COLOR CONVERTING APPARATUS AND METHOD

CROSS-REFERENCE TO RELATED APPLICATIONS

This application is based upon and claims priority of a Japanese Patent Application No. 09-206741 filed Jul. 31, 1996, the contents of which are incorporated herein by reference.

BACKGROUND OF THE INVENTION

1. Field of the Invention

The present invention relates to a color converting apparatus and method. In particular, to a device and method suitable for accurately converting a color signal represented in a different formats by different devices so that a color image from one device may be accurately reproduced by a different device.

2. Description of the Related Art

In recent years, printers, facsimile machines, and related devices have acquired the ability to output data in full color and have become widely available. As a result of this growth in color reproduction devices a need has developed for sharing color picture images among different devices. However, since different devices reproduce images differently, when color picture images are shared with different devices the colors of a transmitted picture may be different from the colors of a picture that are received at the reception site.

The reason for this color mismatch is that in devices such as printers and scanners, colors are handled as color signals comprising a CMY signal and an RGB signal. For example, in a printer of which the minimum value and maximum a color signal is equal to a value of 0 to 255, respectively, all output colors are represented by a combination of values ranging from 0 to 255 of the CMY signal. In this case, even if the same value of the CMY signal is input, the color that is printed depends on the type of the printer. Thus, the method of representing colors with the CMY signal is device-dependent.

In the prior art, a color signal in the device-dependent format is represented in an intermediate format that is device-independent. Using this method, color reproducibility is obtained in different devices.

For example, an L*a*b* signal and an XYZ signal have been used as a color representation method in which colors are represented in a device-independent format. Colors represented in these formats are uniquely defined. Thus, these formats are used as intermediate color representing systems and colors are converted among different devices.

In reality, a picture that is input from a scanner and represented with an RGB signal is converted into a picture represented with an L*a*b* signal. Thereafter, the L*a*b* signal is converted into a CMY signal. The CMY signal is output to a printer. When the representing formats of these color signals are accurately converted, colors can be matched between devices.

To convert the format of a color signal, the value of a color signal in one format must be converted into the appropriate value of a color signal in another format. In order to convert the value of a color signal, a color conversion table that represents the relation between colors in respective color device is used. In this color signal converting method using a color conversion table, when a color signal registered in the color conversion table is converted, the relationship of colors registered in the color conversion table is used. When converting a color signal that does not exist in the color conversion table, a color signal listed in the color conversion table is interpolated to provide a corresponding color signal.

FIG. 38 is a schematic diagram for a two-dimensional registering method of a conventional color conversion table in a color space in the prior art.

In FIG. 38 shows L*a*b* values at grid points P1 to P16 in an L*a*b* space corresponding to CMY values at points Q1 to Q16 in a CMY space. The relationship between L*a*b* grid points is listed in the color conversion table. Assuming that CMY values at points Q1, Q2, Q5, Q9, and Q13 are out of the color reproducible range of the device, CMY values at points Q1', Q2', Q5', Q9', and Q13'that are in the color reproducible range of the device are substituted for points Q1, Q2, 05, Q9, and Q13, respectively. The substituted CMY values are then registered to the color conversion table.

This color converting method using the conventional color conversion table with numeric values will now be discussed in further detail. In this example, the printer or other related device has a color conversion (CMY values) in the color reproducible range from 0 to 255 (from an L*a*b* signal to a CMY signal). However, it should be noted that the device may be other than a printer and that a color signal other than the L*a*b* signal and CMY signal may be used.

As shown in FIG. 39, a table depicting the structure of a conventional color conversion table is provided. The color conversion table shows the relation between an L*a*b* color signal and a CMY color signal. With the color conversion table, the L*a*b* color signal can be converted into the CMY color signal in the color reproducible range of the printer.

In FIG. 39, the relation between the L*a*b* color signal and the CMY color signal in the color reproducible range of the printer is $0 \leq L^* \leq 100$, $-128 \leq a^* \leq 128$, and $-128 \leq b^* \leq 128$, where the values of the L* signal are discretely registered at intervals of 12.5 and the values of the a* signal and b* signal are discretely registered at intervals of 32. This occurs because all values cannot be listed in the color conversion table. In the color conversion table shown in FIG. 39, L*a*b* values are distributed at equal intervals.

Thus, CMY values corresponding to L*a*b* values registered in the color conversion table can be directly obtained from the color conversion table.

CMY values corresponding to L*a*b* values that are not in the color conversion table are obtained by interpolation calculations relating L*a*b values and CMY values registered in the color conversion table. In this case, when L*a*b* values are regularly distributed and registered in the color conversion table, interpolation calculations can be easily performed.

When an L*a*b* value equal to (0, −128, −64) is input, since it has been registered in the color conversion table shown in FIG. 39, a CMY value equal to (255, 240, 253) corresponding to the L*a*b* value of (0, −128, −64) can be directly obtained with reference to the color conversion table shown in FIG. 39.

However, when an L*a*b* value equal to (1, −128, −64) is input, since it has not been registered in the color conversion table shown in FIG. 39, a CMY value corresponding to the L*a*b* value of (1, −128, −64) is obtained by interpolating a CMY value corresponding to the L*a*b* value equal to (1, −128, −64).

In the conventional color conversion table, CMY values registered therein are values in the range of the color signal of the device in use. When the color conversion table is used for a printer that handles CMY values ranging from 0 to 255, CMY values corresponding to L*a*b* values out of the color range of the printer are substituted to CMY values ranging from 0 to 255 and then registered to the color conversion table.

In the case when L* values represent a black color and the printer reproduces black colors above a value of 18 and cannot output darker colors, CMY values that correspond to the color reproducible represented by L*a*b* values in the color range of the printer are registered. For example, a CMY value=(228, 224, 208) is registered corresponding to an L*a*b* value=(25, 0, 0).

Colors represented by L*a*b* values out of the color range of the printer are substituted with CMY values that can be reproduced by the printer and are registered in the color conversion table. For example, if a CMY value corresponding to an L*a*b* value equal to (12.5, 0, 0) is desired, a black color of an L* value equal to 12.5 cannot be produced as indicated above. Therefore, the darkest CMY value is selected corresponding to a CMY value equal to (255, 255, 255) is registered.

When an L*a*b* value which is not listed in the color conversion table is converted into a CMY value, a plurality of L*a*b* values in the vicinity of the L*a*b value to be converted are selected corresponding to the relation between L*a*b* values and CMY values registered in the color conversion table. The selected L*a*b* values are then interpolated and a value determined. For further information on interpolation methods, please refer to "High Accuracy Color Conversion with Flexible UCR (translated title)", Japan Hard Copy Proceedings, 1994, pp. 177–180.

The interpolation method of a color signal using the conventional color conversion table will be described with reference to actual values.

In the case that a color signal is converted by interpolating calculations with the conventional color conversion table, when values registered in the color conversion table are accurate, almost good color converted results can be obtained in the color range of the device by the interpolating calculations.

In this example, two pieces of data are provided as illustration. The first has an L*a*b* value equal to (25, 0, 0) and the second an L*a*b* value equal to (37.5, 0, 0) that have been registered in the color conversion table shown in FIG. 39. A CMY value corresponding to an L*a*b* value equal to (31.25, 0, 0), that has not been registered in the color conversion table shown in FIG. 39, is obtained by interpolation calculations. When many colors are involved a CMY value is calculated by a three-dimensional interpolation.

Using interpolation calculations a color at the position of the CMY signal corresponding to the position of the L*a*b* signal is obtained. Thus, the process for obtaining a CMY value corresponding to the intermediate L*a*b* value between an L*a*b* value equal to (25, 0, 0) and an L*a*b* value equal to (37.5, 0, 0) obtains a CMY value equal to (228, 224, 208) corresponding to an L*a*b* value equal to (25, 0, 0) and a CMY value equal to (182, 185, 161) corresponding to an L*a*b* value equal to (37.5, 0, 0) and obtains the intermediate CMY value between the CMY value equal to (228, 224, 208) and the CMY value equal to (182, 185, 161).

Thus, the interpolated result produces a CMY value equal to (205, 204.5, 184.5). Therefore, the converted result of a CMY signal corresponding to the L*a*b* value equal to (31.25, 0, 0) that has not been registered in the color conversion table is a CMY value equal to (205, 204.5, 184.5).

When the characteristics of the printer are not remarkably irregular, the interpolated result is usually correct. In other words, when the relation of colors registered in the color conversion table are accurate, values obtained through interpolation are also accurate.

In the conventional color conversion table, a color that cannot be reproduced by the device is substituted with the closest color thereto that can be reproduced by the device and this substitution is registered in the color conversion table. When only with referring to the color conversion table, it is difficult to determine whether an input L*a*b* value is reproducible by the device. To solve this problem, an identifier that represents the color range of the device is associated to an L*a*b* value that is distributed in a grid shape (refer to "The ICC Profile Specifications Version 3.3"). Alternatively, a locus of a color range in a particular length L is registered as a boundary descriptor so as to determine whether a particular L*a*b* value is in the color range of the device.

However, when the conventional color conversion table is used a problem is encountered since colors at the boundaries of the color range of the device cannot be accurately interpolated. These colors at the boundaries of the color range of the device would include light colors, very dark colors, and very bright colors.

As shown in FIG. 38, when a CMY value corresponding to a point R in the vicinity of the boundary of the color range in the L*a*b* space is obtained, since the CMY value corresponding to the point R has not been registered in the color conversion table, interpolation calculations are performed. In the interpolation calculations, CMY values corresponding to grid points P2, P3, P6, and P7 that surround point R are obtained from the color conversion table. The CMY values are weighted in order to determine the CMY value corresponding to the point R. In this case, although the CMY value corresponding to the grid point P2 is actually a CMY value corresponding to the point Q, the CMY value is substituted with a CMY value corresponding to the point Q'and registered in the color conversion table. Further, although the real CMY value corresponding to the point R is a CMY value corresponding to the point S, a CMY value corresponding to the point S'is calculated. Consequently, a CMY value that is different from the real CMY value is output and the true color desired is not reproduced.

The case that an L*a*b* value to be interpolated is present in the vicinity of the boundary of the color range will be described with actual numeric values registered in the color conversion table.

It is assumed that the printer in question can output dark colors above an L*a*b* value equal to (18, 0, 0). In this case, as shown in FIG. 39, since the printer cannot output a color corresponding to an L*a*b* value equal to (12.5, 0, 0), a CMY value equal to (255, 255, 255) which is the darkest color the printer can reproduce is registered in the color conversion table.

In this case, a CMY color signal corresponding to an L*a*b* value equal to (18.75, 0, 0) (the intermediate value of an L*a*b* value equal to (12.5, 0, 0) and an L*a*b* value equal to (25, 0, 0)) is obtained by interpolation calculations.

As described above, since the printer is limited to colors having an L*a*b* value equal to (18, 0, 0), when a CMY value=(252, 253, 235) is designated, the printer can output a color of an L*a*b* value=(18.75, 0, 0). When a printer that can print colors of up to an L*a*b* value=(18, 0, 0) prints a color of an L*a*b* value=(18.75, 0, 0), each element of the CMY value becomes almost a value of 255.

Thus, it is preferable to calculate a CMY value equal to (252, 253, 235) as the interpolated result of the L*a*b* value equal to (18.75, 0, 0).

However, when a CMY value equal to (255, 255, 255) corresponding to an L*a*b* value equal to (12.5, 0, 0) and a CMY value equal to (228, 224, 208) corresponding to an L*a*b* value equal to (25, 0, 0) are averaged using the color conversion table shown in FIG. 39 the results are inaccurate. The results received are a CMY value corresponding to the intermediate L*a*b* value equal to (18.75, 0, 0), and a CMY value=((228+255)/2, (224+255)/2, (208+255)/2)=(241.5, 239.5, 231.5) which substantially deviate from the real value.

In the conventional color conversion table, although the L*a*b* value equal to (12.5, 0, 0) corresponds to a CMY value out of the color range of the device, a CMY value at the boundary of the color range is registered. Thus, when the interpolating calculations are performed with these two colors, a color in the vicinity of the boundary of the color range is calculated as a color inside the color range.

With respect to the conventional method for determining whether a particular color is in the color range of the device or out of the color range of the device, when an identifier associated with a grid point is used, the color range cannot be determined with higher resolution than the intervals of grid points.

In the conventional method in which loci are registered corresponding to respective hues, to use loci that have been divided and registered corresponding to respective hues, complicated calculations for obtaining hues (trigonometric function) are required.

Therefore, problems are encountered in the prior art relating to the accuracy of color reproduction among different devices when the colors are at the boundaries of the reproducible range of the device. Interpolation of colors at these boundaries is also a problem since the results may be inaccurate and cause further inaccuracy when determining the values of other colors by means of interpolation. In addition, the conventional method is limited in its accuracy to the intervals of the grid points and the when determining hues by using loci requires considerable processing due to the math involved.

SUMMARY OF THE INVENTION

An object of the present invention is to convert color image signals between color image detecting and reproducing devices such as scanners, printers, displays, facsimiles and other similar devices so that an image detected, displayed, or printed on one can be accurately reproduced on another despite dissimilar color capabilities between these devices.

Objects and advantages of the present invention are achieved in accordance with embodiments by a color signal conversion device converting a color signal between a first color space and a second color space. This color signal conversion device includes: a color conversion table comprising a relation between color signals in a first color space and color signals in a second color space is represented out of a color reproducible range; and a color converting unit which converts the color signal using the relation of the first color space and of the second color space of the color conversion table whereby a color image from the first color space is accurately reproduced on the second color space.

In accordance with embodiments of the present invention, the first color space is a device-independent color space and the second color space is a device-dependent color space.

Also the values of the color signals in the first color space are regularly distributed. The color conversion table includes: a first identifier representing a color signal apart from the color reproducible range by larger than a predetermined value in the first color space; a second identifier representing whether a color signal is inside the color reproducible range or outside of the color reproducible range in the first color space; and a third identifier for representing whether a color signal is present in the vicinity of the boundary of the color reproducible range in the first color space.

Further objects and advantages of the present invention are achieved by a color converting apparatus which comprises: a color converting unit to convert a color signal of a first color space into a color signal of a second color space that is not color-reproducible; and a color interpolating unit to interpolate a color signal corresponding to a color signal in a second color space that is not color-reproducible.

In accordance with embodiments of the present invention, the color converting apparatus also includes: a color range determining unit to determine whether the interpolated result is in a color reproducible range; and a substituting unit to substitute the interpolated result with a color signal in -the second color space that is color-reproducible when the interpolated result is not in the color reproducible range.

Further objects and advantages of the present invention are achieved by a color converting apparatus which includes: a color reproduction means to reproduce a color in a predetermined range of a first color space; a color converting unit to convert a color signal in a second color space into a color signal outside of the predetermined range in the first color space; and an interpolating unit to interpolate a color signal corresponding to a converted result into the color signal in the first color space.

In accordance with embodiments of the present invention, the color converting apparatus also includes: a substituting unit to substitute the interpolated color signal with a color signal in the predetermined range when the interpolated color signal is outside of the predetermined range; the first color space is any of a CMY space, a CMYK space or a RGB space and the second color space is a L*a*b* space, an L*u*v* space, or a XYZ space. Any of the components of the first and second color spaces may combined to form six possible combinations.

Further objects and advantages of the present invention are achieved by a color converting apparatus which includes: input means to input a color signal in a first color space; a color signal selecting unit to select grid points that surround the color signal that has been input in the first color space; a color conversion table comprising a relation between a color signal at a grid point in the first color space and a color signal in a second space, the relation being a representation of both inside and outside of a color reproducible range of a color reproduction device; a proximity color detecting unit to detect a color signal in the second color space corresponding to the selected grid point by referencing the color conversion table; weight calculating means for calculating a weighing coefficient corresponding to the position of the input color signal in the first color space; and first color signal calculating means for calculating a color signal in the second color space corresponding to the color signal in the first color space that has been input from the input means, corresponding to the color signal in the second color space detected from the color conversion table and the calculated weighing coefficient.

In accordance with embodiments of the present invention, the color converting apparatus includes: a first color range determining unit to determine whether the color signal calculated by the first color signal calculating means is in the color reproducible range of the color reproduction device; and a first color substituting unit to substitute the color signal calculated by the first color signal calculating means with a color signal in the color reproducible range of the color reproduction device when the first color range determining unit has determined that the color signal calculated by the first color signal calculating means is outside of the color reproducible range of the color reproduction device.

In accordance with embodiments of the present invention, the first color substituting unit includes: a second color signal calculating unit to calculate a color signal with the same luminance and achromatic color as the color signal calculated by the first color signal calculating unit; excess level calculating means for calculating an excess level that represents how far the color signal calculated by the first color signal calculating means is separated from the color reproducible range of the color reproduction device; and color signal moving means for moving the color signal calculated by the first color signal calculating means in the direction of the color signal with the same luminance and achromatic color by the excess level.

In accordance with embodiments of the present invention, the color converting apparatus includes: first luminance changing means for changing the luminance of the color signal with the same luminance and achromatic color to a value equal to or less than a first level when the luminance of the color signal with the same luminance and achromatic color exceeds the first level; and second luminance changing means for changing the luminance of the color signal with the same luminance and achromatic color to a value equal to or greater than a second level when the luminance of the color signal with the same luminance and achromatic color is less than the second level.

In accordance with embodiments of the present invention, the color converting apparatus includes: a second color range determining unit to determine whether a color signal in the second color space corresponding to the grid point selected by the color signal selecting unit has been registered in the color conversion table; and a second color substituting unit to move the color signal in the first color space that has been input by the input means toward the center of the color reproducible range of the device when the color signal in the second color space has not been registered in the color conversion table.

In accordance with embodiments of the present invention, the second color substituting unit also includes: chromaticity decreasing means for decreasing the chromaticity of the color signal in the first color space that has been input by the input means when the color signal in the second color space has not been registered in the color conversion table.

In accordance with embodiments of the present invention, the color converting apparatus includes: third luminance changing means for changing the luminance of the color signal in the first color space that has been input by the input means toward the center of the color reproducible space, when the color signal in the second color space registered in the color conversion table is not detected in the case that the chromaticity of the color signal in the first color space that has been input by the input means is 0.

Still further objects and advantages of the present invention are achieved by a color signal generating apparatus which includes: color signal generating means for generating a color signal that is not color-reproducible corresponding to a color signal that is color-reproducible.

In accordance with embodiments of the present invention, the color signal generating means includes: a color signal selecting unit for selecting a color signal that is color-reproducible; and a color signal extrapolating unit for extrapolating the selected color signal.

Still further objects and advantages of the present invention are achieved by a method for converting a color signal between a first color space and a second color space, which employs the following steps: generating a color conversion table, by: obtaining a first relation between color signals in a first color space and color signals in a second color space in a color reproducible range of a device; obtaining a second relation between color signals in the first color space and color signals in the second color space out of the color reproducible range of the device corresponding to the first relation; and registering the first relation and the second relation to the color conversion table; and converting the color signal using the first relation and second relation stored in the color conversion table.

In accordance with embodiments of the present invention, the step of generating the color conversion table further may be broken down into the steps of: selecting a first point adjacent to a outside boundary of the color reproducible range of the device in the first color space; selecting a second point adjacent the first point and toward the center of the first color space; selecting a third point which is adjacent to the second point by one position and further toward the center of the first color space; obtaining a fourth point in the second color space corresponding to the second point and corresponding to the first relation; obtaining a fifth point in the second color space corresponding to the third point and corresponding to the first relation; obtaining a color signal at a sixth point that is point-symmetrical to the fifth point with respect to the fourth point in the second color space; and registering the color signal at the sixth point to the color conversion table corresponding to the color signal at the first point.

In accordance with embodiments of the present invention, the step of generating the color conversion table further may be broken down into the steps of: calculating the distance between the fourth point and the fifth point in the second color space; generating a seventh point in the second color space corresponding to the distance between the fourth point and the fifth point in the second color space; calculating a multiple of the distance between the forth point and the seventh point corresponding to the distance between the fourth point and the fifth point in the second color space; calculating an eighth point outside the second point by the position represented by the multiple in the first color space; registering a color signal at the seventh point in the second color space to the color conversion table corresponding to a color signal at the eighth point in the first color space. The seventh point in the second color space is generated in the direction of which the fourth point faces the fifth point. In addition, the following steps are performed: evaluating the distance between the fourth point and the fifth point in the second color space and or the direction of which the fourth point in the second color space faces the fifth point; determining whether both the distance and or direction satisfies a predetermined condition; and selecting a ninth point inside the third point in the first color space by one position when the distance or the direction does not satisfy the predetermined condition.

In accordance with embodiments of the present invention, a method for converting a color signal between a first color space and a second color space which includes the steps of: generating a color conversion table, which further includes the steps of: obtaining a first relation between color signals in a first color space and color signals in a second color signal in a color reproducible range of a device; obtaining a second relation between color signals in the first color space and color signals in the second color signal out of the color reproducible range of the device corresponding to the first relation; obtaining a third relation between color signals in the first color space and color signals in the second color space corresponding to the first relation and the second relation; registering the third relation to a color conversion table; and converting the color signal using the third relation stored in the color conversion table.

In accordance with embodiments of the present invention, a method for converting a color signal between a first color space and a second color space, includes the steps of: generating a color conversion table, comprising the steps of: obtaining a first relation between color signals irregularly distributed in a first color space and color signals distributed at grid points in a second color space in a color reproducible range of a device; interpolating the first relation so as to obtain a second relation between color signals distributed at grid points in the first color space and color signals irregularly distributed in the second color signal in the color reproducible range of the device; extrapolating the second relation so as to obtain a third relation between color signals distributed at grid points in the first color space and color signals irregularly distributed in the second color space; registering the second relation and the third relation to the color conversion table; and converting the color signal using the second relation and third relation stored in the color conversion table.

Still further objects and advantages of the present invention are achieved by a method for converting a color signal between a first color space and a second color space, where the step of generating a color conversion table, further includes the steps of: dividing a unit cube surrounded by grid points in the second color space into a plurality of cubes; calculating color signals in the second color space at the vertexes of the divided cubes corresponding to the positions of the vertexes; calculating color signals in the first color space corresponding to the vertexes of the divided cubes by an interpolation calculating process; comparing the values of the color signals calculated by the interpolation calculating process with the values at the grid points in the first color space; and selecting color signals in the second color space at the vertexes of the divided cubes corresponding to the color signals at the grid points in the first color space, when the values of the color signals calculated by the interpolation calculating process are in a predetermined range from the values at the grid points in the first color space.

In accordance with embodiments of the present invention, the interpolation calculating process including the steps of: calculating the volumes of rectangular parallelepipeds of which the unit cube is divided at the vertexes of the divided cubes; referencing the color conversion table so as to detect color signals in the first color space corresponding to grid points that surround the vertexes of the divided cubes; and multiplying the detected color signals in the first color space by the volumes of the rectangular parallelepipeds so as to calculate color signals in the first color space corresponding to the vertexes of the divided cubes.

Other objects and advantages of the present invention are achieved by a color range determining method which includes the steps of: inputting a first color signal; selecting a second color signal in the vicinity of the first color signal; referencing a color conversion table that has registered the relation of color signals being both in and out of a color reproducible range of a device; detecting the relation between the second color signal and a third color signal; determining whether the third color signal is in the color reproducible range of the device; and determining whether the first color signal is in the color reproducible range of the device corresponding to the determined result of the third color signal.

Still other objects and advantages of the present invention are achieved by a color range determining method which includes the steps of: inputting a first color signal; selecting a second color signal in the vicinity of the first color signal; converting the second color signal into a third color signal containing a value out of a color reproducible range of a device; converting the first color signal into a fourth color signal using the third color signal; determining whether the fourth color signal is in the color reproducible range of the device; and determining whether the first color signal is in the color reproducible range of the device corresponding to the determined result of the fourth color signal.

In accordance with embodiments of the present invention, the color range determining method further includes the steps of: determining whether the third color signal is in the color reproducible range of the device; determining that the first color signal is in the color reproducible range when the third color signal contains only a value in the color reproducible range of the device; and determining that the first color signal is out of the color reproducible range of the device when the third color signal contains only a value out of the color reproducible range of the device.

It should be that the above described embodiments of the present invention may be embodied in the form of computer executable programs and placed on storage medium which is computer readable. These programs may then be read and used to control the execution of the computer to achieve the noted objects and benefits.

BRIEF DESCRIPTION OF THE DRAWINGS

These and other objects and advantages of the invention will become apparent and more readily appreciated for the following description of the preferred embodiments, taken in conjunction with the accompanying drawings of which:

FIG. 3 is a table showing an example of numeric values registered in a color conversion table according to an embodiment of the present invention.

FIG. 8(b) is a schematic diagram showing a triangular prism interpolating method.

FIG. 8(c) is a schematic diagram showing a tetrahedron interpolating method.

FIG. 17 is a table showing the content of the color conversion table generated by the process shown in FIG. 16.

FIG. 37 is a schematic diagram showing the content of a color conversion table in which identifiers for determining a color range have been registered according to an embodiment of the present invention.

FIG. 39 is a schematic diagram showing the content of a conventional color conversion table.

DESCRIPTION OF THE PREFERRED EMBODIMENTS

Figure 1:
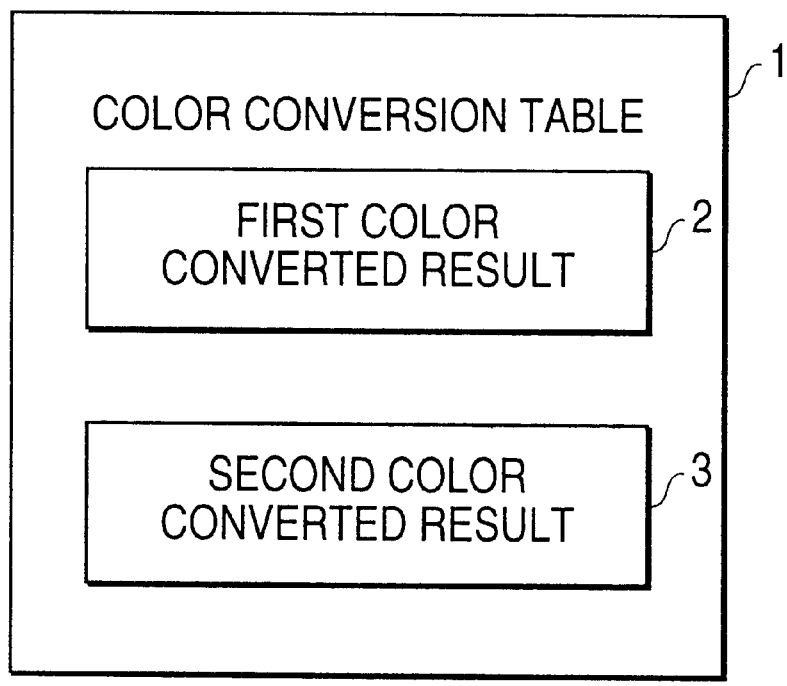
FIG. 1 is a block diagram showing the structure of a color conversion table according to an embodiment of the present invention.

Reference will now be made in detail to the preferred embodiments of the present invention, examples of which are illustrated in the accompanying drawings, wherein like reference numerals refer to like elements throughout.

FIG. 1 is a block diagram showing the structure of a color conversion table according to an embodiment of the present invention.

As shown in FIG. 1, a color conversion table 1 stores a first color converted result 2 of which an input color signal is converted into a color signal that is color-reproducible and a second color converted result 3 of which an input color signal is converted into a color signal that is not color reproducible. When a color signal that is not color reproducible is registered in color conversion table 1, the relationship between color signals can be accurately kept in a region out of a color reproducible range of a printer, a display, or similar devices. When the relationship of a color signal that has not been registered in the color conversion table is obtained, even if the relation of a color signal out of the color reproducible range is used in interpolating calculations, the interpolating calculations can be accurately executed.

Figure 2:
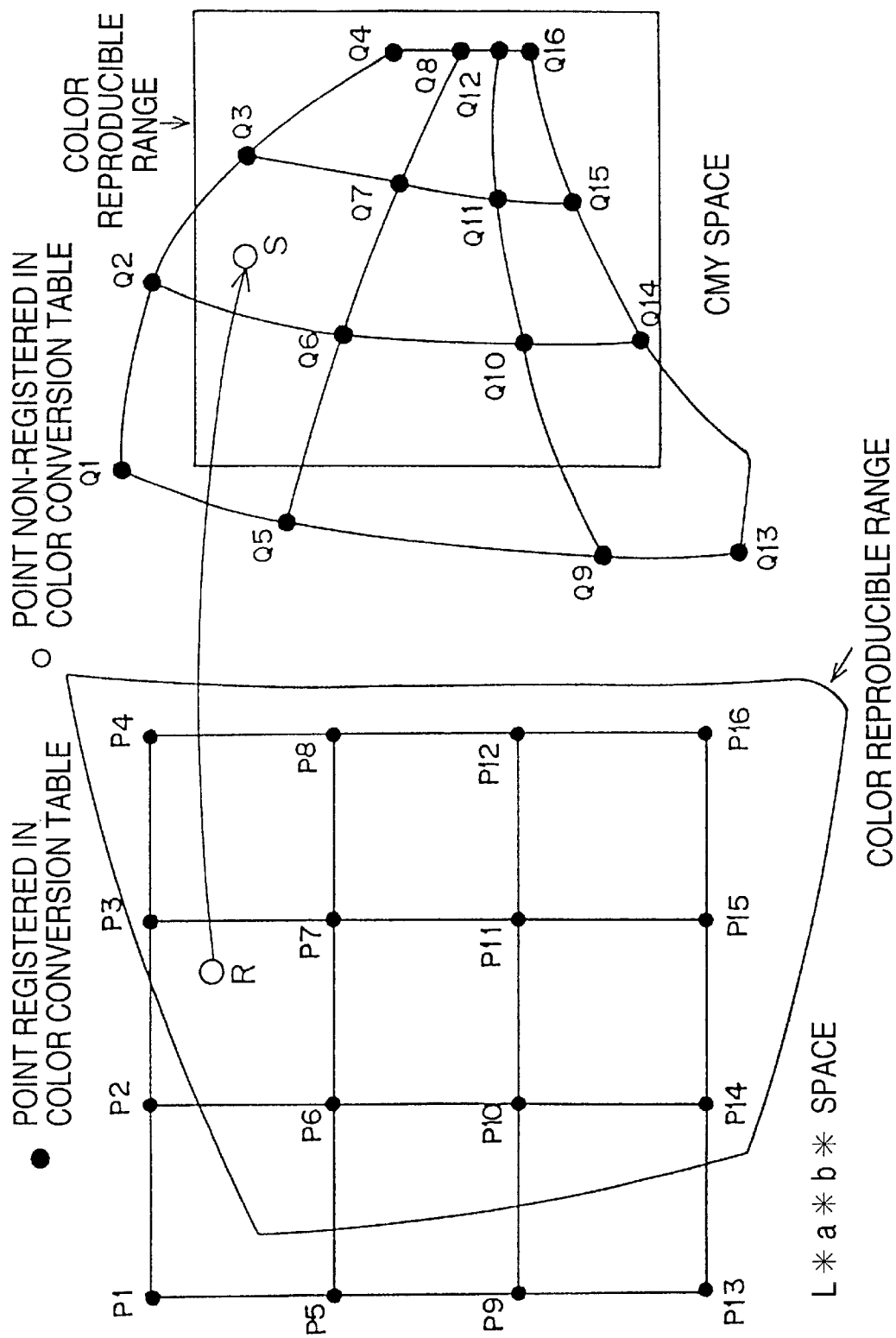
FIG. 2 is a schematic diagram showing the relation between an L*a*b* signal and a CMY signal in a two-dimensional color space according to an embodiment of the present invention.

FIG. 2 is a schematic diagram showing the relationship between an L*a*b* signal and a CMY signal in a two-dimensional color space according to an embodiment of the present invention.

As shown in FIG. 2, L*a*b* values at grid points P1 to P16 in an L*a*b* space correspond to CMY values at points Q1 to Q16 in a CMY space, respectively. The relationships of the L*a*b* grid points are registered in a color conversion table. CMY values at points Q1, Q2, Q5, Q9, and Q13 that are out of the color reproducible range of the device are registered as they correspond to L*a*b* values at the grid points P1, P2, P5, P9, and P13 in the L*a*b* space, respectively.

When a CMY value corresponding to a point R in the vicinity of the boundary of the color range in the L*a*b* space is obtained, since the CMY value corresponding to the point R has not been registered in the color conversion table, the CMY values corresponding to the grid points P2, P3, P6, and P7 that surround the point R are obtained from the color conversion table. By performing weighing calculations for the resultant CMY values, the CMY value at the point 5 corresponding to the point R is obtained.

In this case, since the CMY value at the point Q2 out of the color reproducible range of the device has been registered as it is in the color conversion table, interpolating calculations can be performed with an original color signal corresponding to the L*a*b* value at the grid point P2. Thus, the CMY value at the point S can be accurately obtained as the CMY value at the point R.

FIG. 3 is a table showing an example of numeric values registered in a color conversion table according to an embodiment of the present invention.

As shown in FIG. 3, the relationship between the L*a*b* color signal and the CMY color signal is $0 \leq L^* \leq 100$, $-128 \leq a^* \leq 128$, and $-128 \leq b^* \leq 128$, where the values of the L* signal are discretely registered at intervals of 12.5 and the values of the a* signal and b* signal are discretely registered at intervals of 32.

Assuming that the CMY values in the color range of the printer are in the range from 0 to 255, CMY values out of the color range of the printer are registered to the color conversion table.

In the case where L* values represent the darkest black color in the reproducible range of the printer up to a value of 18, CMY values that corresponding to this color represented by L*a*b* values in the color range of the printer are registered in the color conversion table. For example, a CMY value equal to (228, 224, 208) is registered corresponding to an L*a*b* value of (25, 0, 0).

Regarding a CMY value corresponding to an L*a*b* value equal to (12.5, 0, 0) which is out of the color range of the printer, although the printer cannot output a black color in which L* equals 12.5, a CMY value equal to (273, 271, 255) corresponding to an L*a*b* value equal to (12.5, 0, 0) is registered in the color conversion table.

With respect to the color conversion table, a CMY value corresponding to an L*a*b* value equal to (18.75, 0, 0) is obtained by an interpolation calculations. In this case, it is assumed that an L*a*b* value equal to (12.5, 0, 0) and an L*a*b* value equal to (25, 0, 0) have been selected as L*a*b* values used in the interpolation calculations. Referring to the color conversion table shown in FIG. 3, a CMY value equal to (273, 271, 257) corresponding to the L*a*b* value equal to (12.5, 0, 0) is obtained. In addition, a CMY value equal to (228, 224, 208) corresponding to the L*a*b* value equal to (25, 0, 0) is also obtained.

Since the L*a*b* value equal to (18.75, 0, 0) is an intermediate value between the L*a*b* value (12.5, 0, 0) and the L*a*b value (25, 0, 0) in the L*a*b space, when the relationship is applied to the CMY space, the intermediate value between the CMY value equal to (273, 271, 257) and the CMY value equal to (228, 224, 208) is CMY value corresponding to the L*a*b* value equal to (18.75, 0, 0). Thus, a CMY value equal to (250.5, 247.5, 232.5) is obtained. This value is thereby very close to the actual CMY value equal to (252, 253, 235).

Next, a method for generating a color signal out of the color reproducible range of the device will be described. When the relation of a color signal out of the color reproducible range of the device is registered to the color conversion table, a color corresponding to the color signal cannot be actually reproduced. Thus, the relation between color signals in the color range is obtained. Assuming that the relation between the color signals in the color range is satisfied for signals out of the color range, the relation between the color signals in the color range is extended out of the color range. Thus, a color signal out of the color reproducible range of the device is generated.

Figure 4:
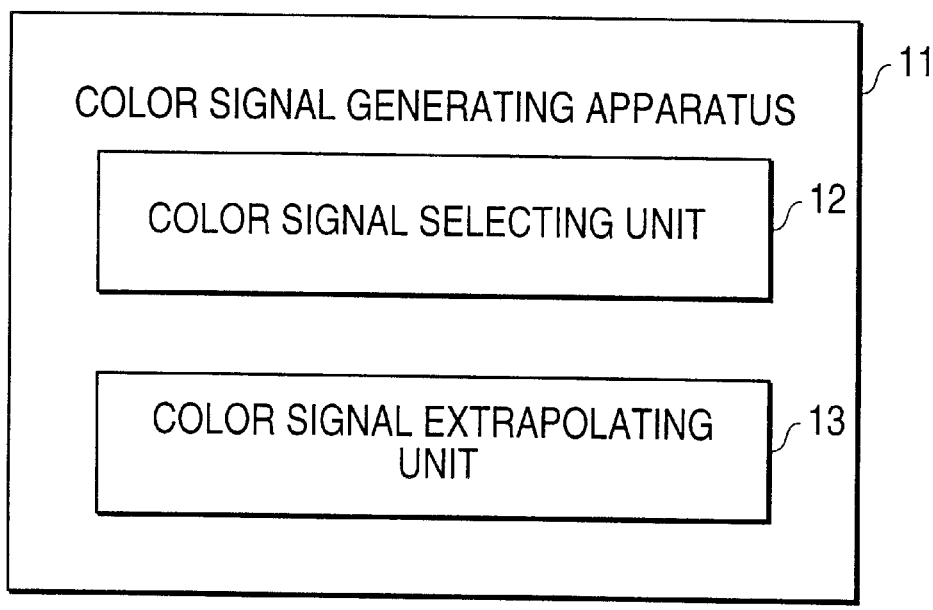
FIG. 4 is a block diagram showing the structure of a color signal generating apparatus according to an embodiment of the present invention.

FIG. 4 is a block diagram showing the structure of a color signal generating apparatus according to an embodiment of the present invention.

As shown in FIG. 4, a color signal generating apparatus 11 comprises a color signal selecting unit 12 and a color signal extrapolating unit 13. The color signal selecting unit 12 selects the relation of color signals in a color range of a device. The color signal extrapolating unit 13 extrapolates the relationship of color signals in the color range of the device so as to generate a color signal out of the color reproducible range of the device.

Thus, when the relationship of color signals in a color range of a device is extrapolated, a color signal of a color that cannot be measured can be calculated. Consequently, a color signal out of the color reproducible range of the device can be generated.

Figure 5:
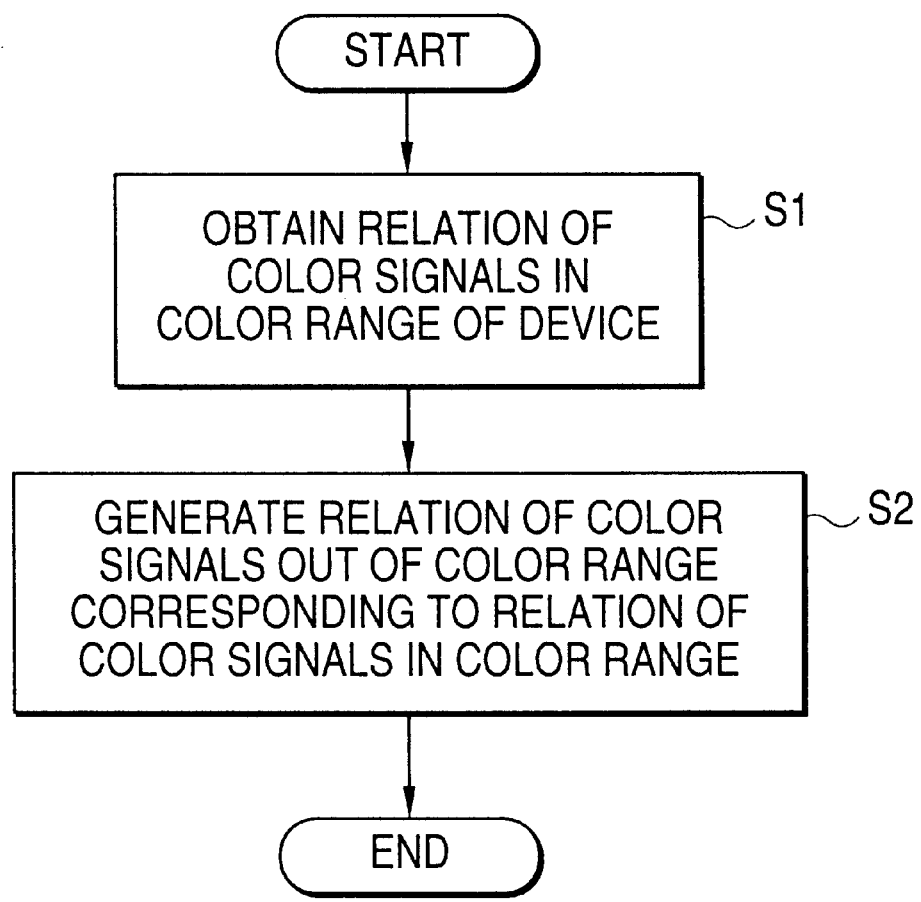
FIG. 5 is a flow chart showing a color signal generating method according to an embodiment of the present invention.

FIG. 5 is a flow chart showing a color signal generating method according to an embodiment of the present invention.

As shown in FIG. 5, the relationship of color signals in a color range of a device is obtained at step S1. With the relationship of the color signals in the color range of the device, the relationship of color signals out of the color range of the device is generated at step S2.

Figure 6:
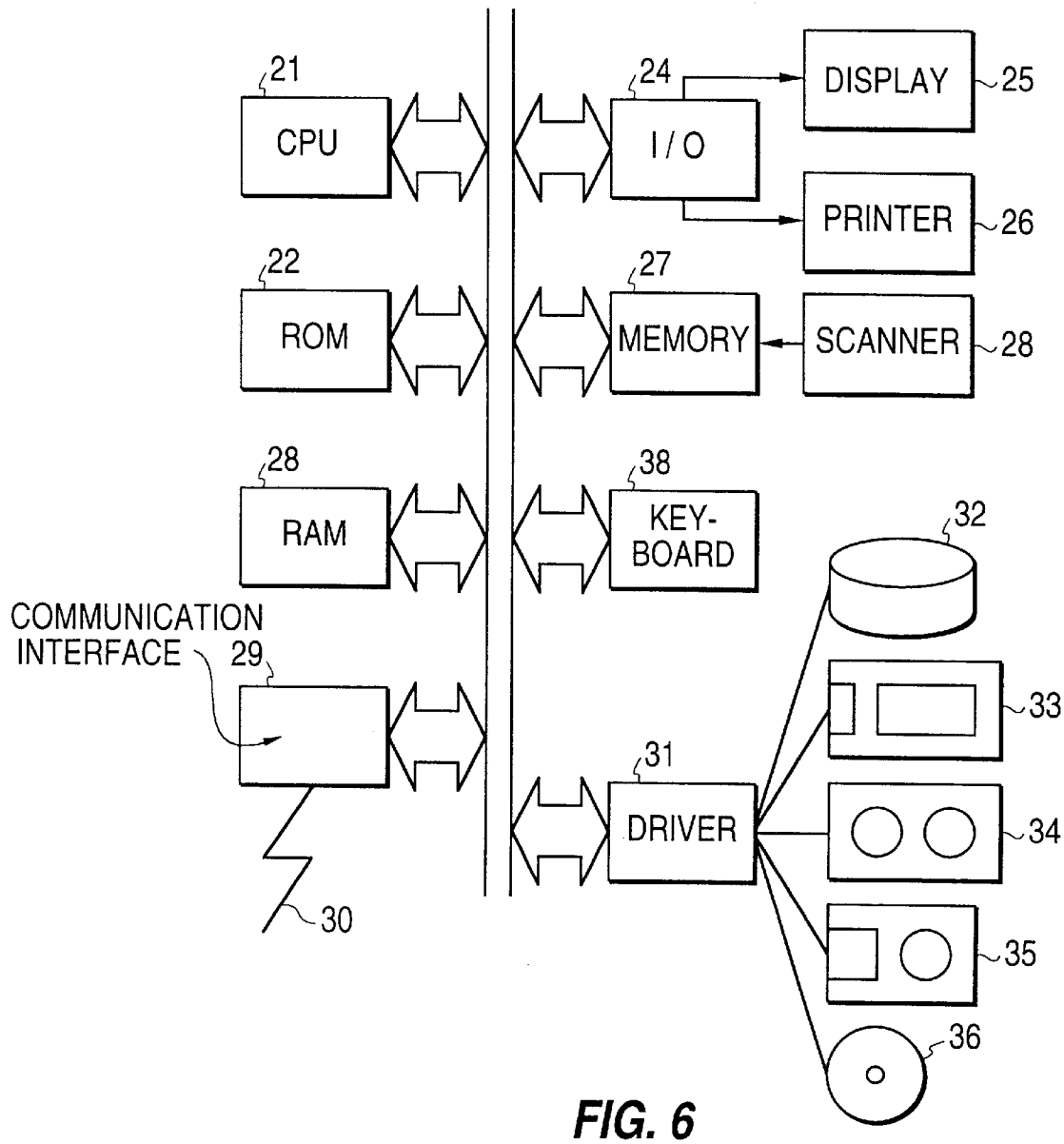
FIG. 6 is a block diagram showing the system structure of a color signal generating apparatus according to an embodiment of the present invention.

FIG. 6 is a block diagram showing the system structure of a color signal generating apparatus or a color converting apparatus according to an embodiment of the present invention.

As shown in FIG. 6, reference numeral 21 is a central processing unit (CPU) that executes general processes of the system. Reference numeral 22 is a read-only memory (ROM). Reference numeral 23 is a random access memory (RAM). Reference numeral 24 is an input/output interface. Reference numeral 25 is a display that displays a color picture corresponding to an RGB signal. Reference numeral 26 is a printer that prints a color picture corresponding to a CMY signal. Reference numeral 27 is a memory that temporarily stores data read by a scanner 28. The reference numeral 28 is the scanner that reads a color picture and outputs an RGB signal. Reference numeral 29 is a communication interface. Reference numeral 30 is a communication network. Reference numeral 31 is a driver that drives a storage medium. Reference numeral 32 is a hard disk. Reference numeral 33 is an IC memory card. Reference numeral 34 is a magnetic tape. Reference numeral 35 is a floppy disk. Reference numeral 36 is an optical disc such as a CD-ROM or a DVD-ROM. Reference numeral 37 is a bus. Reference numeral 38 is a keyboard.

Programs for performing a color signal generating process, a color signal converting process, or evaluating the contents of a color conversion table are stored on a storage medium such as the hard disk 32, the IC memory card 33, the magnetic tape 34, the floppy disk 35, or the optical disc 36. These programs are read from one of these storage media and placed into the RAM 23 where the CPU may retrieve them for execution. Alternatively, the programs for performing the color signal generating process, the color signal converting process, or the evaluation of the contents of the color conversion table can be stored in the ROM 22.

In addition, the programs for performing the color signal generating process, the color signal converting process, or the evaluation of the contents of the color conversion table can be obtained from a communication network 30 through a communication interface 29. Examples of the communication network 30 connected to the communication interface 29 are a LAN (Local Area Network), a WAN (Wide Area Network), the Internet, an analog telephone network, and a digital telephone network (ISDN: Integral Service Digital Network), and radio communication networks such as PHS (Personal Handyphone System) and satellite communications.

When the program for performing the color signal generating process is executed, the CPU 21 sends a CMY signal to the printer 26. When the printer 26 receives the CMY signal, it prints data in a color corresponding to the CMY signal. The color is measured by a color measuring unit and an L*a*b* value corresponding to the color is input from the keyboard 38. The CPU 21 extrapolates the relationship between the CMY signal sent to the printer 26 and the L*a*b* value that has been input from the keyboard 38, generates the relationship between a CMY value out of the color reproducible range of the printer 26 and an L*a*b* value, and registers the relationship to the color conversion table.

When the program for performing the color converting process is executed, the CPU 21 receives an RGB signal from the scanner 28. When the CPU 21 receives the RGB signal from scanner 28, the CPU 21 references the color conversion table of scanner 28 and converts the RGB signal into an L*a*b* signal. Thereafter, the CPU 21 references the color conversion table of the printer 26, converts the L*a*b* signal into a CMY signal, and outputs the CMY signal to printer 26.

FIRST PREFERRED EMBODIMENT

A method for generating a conversion table for converting an L*a*b* value into a CMY value according to a first embodiment of the present invention will be described.

Figure 7:
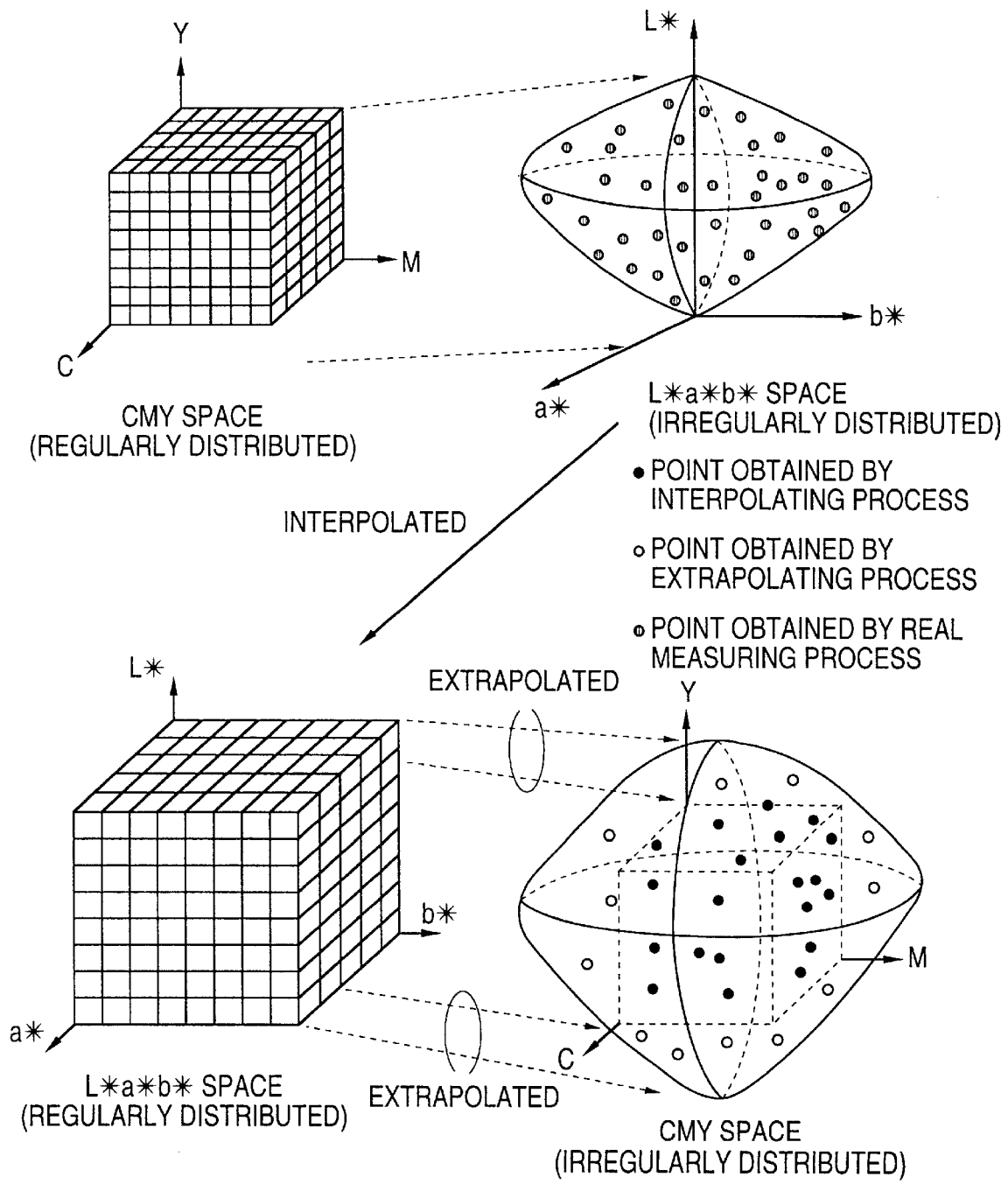
FIG. 7 is a schematic diagram showing a method for generating a color signal in a color space according to a first embodiment of the present invention.

FIG. 7 is a schematic diagram showing a generating process of a color signal in a color space according to the color conversion table generating method of the first embodiment of the present invention. According to the first embodiment, with the relationship between L*a*b* values regularly distributed in a grid shape and CMY values irregularly distributed, an extrapolating process is performed so as to generate the relationship between CMY values and L*a*b* values out of the color range of the printer.

As shown in FIG. 7, colors regularly distributed as CMY values are printed by the printer. The colors printed by the printer are regularly distributed in a grid shape in the CMY space and are only present in the color reproducible range of the printer.

Next, the printed result of the printer is measured by the color measuring unit. The colors measured by the color measuring unit are distributed in the L*a*b* space. L*a*b* values corresponding to the CMY values at the grid points in the CMY space are irregularly distributed. In other words, the relationship between the CMY values regularly distributed in the CMY space and the L*a*b* values irregularly distributed in the L*a*b* space is obtained.

Next, the relationship between the CMY values regularly distributed in the CMY space and the L*a*b* values irregularly distributed in the L*a*b* space is converted so that L*a*b* values are regularly distributed in the L*a*b* space. This conversion is performed in the following manner. L*a*b* values irregularly distributed in the L*a*b* space are interpolated and the relationship between the L*a*b* values at the grid points in the L*a*b* space and the CMY values is obtained.

As an example of the interpolation calculations, a plurality of CMY values that have been designated are selected so that they surround a CMY value that has not been designated. L*a*b* values corresponding to the CMY values are weighted. L*a*b* values at the grid points in the L*a*b* space are selected from those obtained in the interpolating process and CMY values corresponding to the resultant L*a*b* values are registered to the color conversion table.

After the relation between L*a*b* values regularly distributed in the L*a*b* space and the CMY values in the color range of the printer is obtained, the relationship between the L*a*b* values and the CMY values in the color range of the printer is extrapolated and thereby the relationship between the CMY values out of the color range of the printer and the L*a*b* values is generated.

Thus, with this method for generating the color conversion table according to the first embodiment, color signals at grid points in the L*a*b* space that is independent from the device are extrapolated and the relation of color signals out of the color reproducible range of the device is generated. Consequently, extrapolating points in the L*a*b* space can be generated at equal intervals. Thus, a color conversion table that allows a color to be effectively converted out of the color reproducible range of the device can be generated at high speed.

A description is now provided for a method to generate the relationship between L*a*b* values regularly distributed in the L*a*b* space and CMY values which correspond to the relationship between CMY values regularly distributed in the CMY space and L*a*b* values irregularly distributed in the L*a*b* space will be described.

Figure 8:
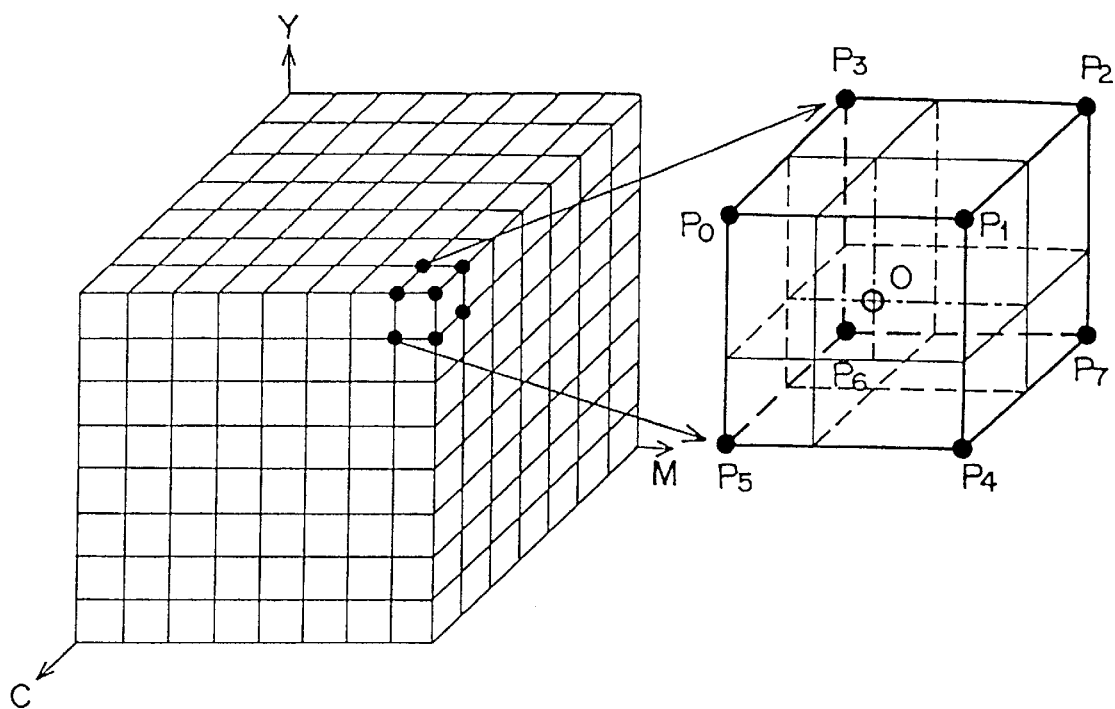
FIG. 8($a$) is a schematic diagram showing a cube interpolating method.
Figure 8:
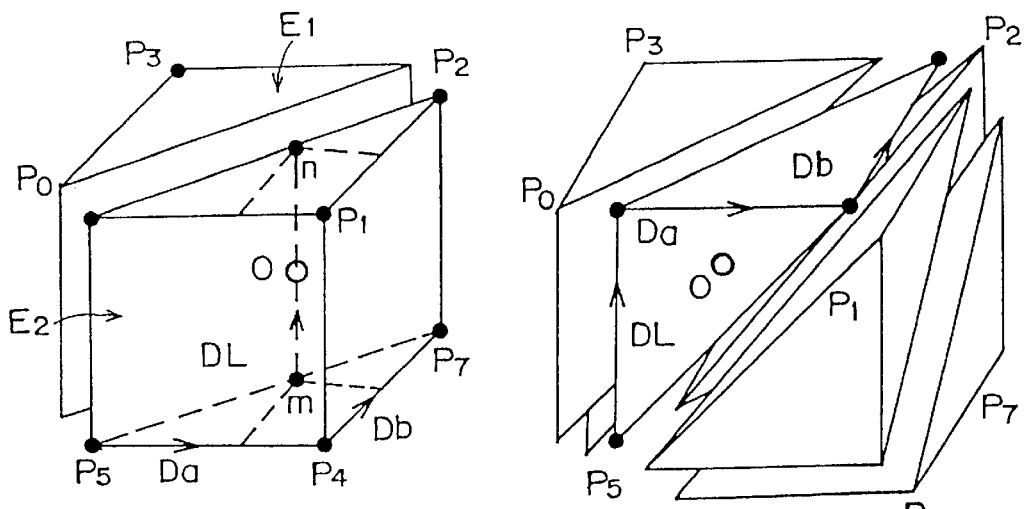

FIG. 8 is a schematic diagram for explaining a method for interpolating the relationship between CMY values at grid points and L*a*b* values corresponding to the relationship of CMY values among grid points in the CMY space and L*a*b* values.

FIG. 8(a) shows a cube interpolating method. In this case, it is assumed that the relationship between CMY values discretely distributed at grid points in the CMY space and L*a*b* values has been designated. Assuming that an input CMY value is present at a point O in the CMY space, a unit cube containing the point O is present in the CMY space. Thus, L*a*b* values corresponding to eight vertexes P0 to P7 that compose the unit cube are obtained.

When the unit cube is divided by planes that traverse the point O and perpendicularly intersect respective axes of the CMY space, eight parallelepipeds are obtained. When the volumes of the eight parallelepipeds are denoted by V0 to V7 corresponding to the eight vertexes P0 to P7 and an L*a*b* value corresponding to the point O is denoted by Oout, the following Formula is obtained.

$$Oout=(P0 \cdot V7+P1 \cdot V6+P2 \cdot V5+P3 \cdot V4+P4 \cdot V3+P5 \cdot V2+P6 \cdot V1+P7 \cdot V0)/VT \quad (1)$$

(where VT=V0+V1+V2+V3+V4+V5+V6+V7)

P0 to P7 in Formula (1) are L*a*b* values designated to correspond to the eight vertexes P0 to P7 in the CMY space.

FIG. 8(b) shows a triangular prism interpolating method. As shown in FIG. 8(b), P0 to P7 are eight vertexes of a unit cube that contains a point O. DL, Da, and Db are distances in individual axial directions defined by the point O. In the triangular prism interpolating method, the unit cube is divided into two regions. One of the two regions that contains the point O is determined by evaluating the relation of Da≧Db. When the relation of Da≧Db is true, the point O is contained in the triangular prism E2. When the relation of Da≧Db is false, the point O is contained in the triangular prism E1.

When the point O is contained in the triangular prism E2, Oout corresponding to the position of the point O can be obtained as follows.

$$m=P5+Da \cdot (P4-P5)+Db \cdot (P7-P4)$$

$$n=P0+Da \cdot (P1-P0)+Db \cdot (P2-P1)$$

$$Oout=m+DL \cdot (n-m) \quad (2)$$

FIG. 8(c) shows a tetrahedron interpolating method. P0 to P7 are eight vertexes of a unit cube that contains a point O. DL, Da, and Db are distances in individual axial directions defined by the point O. In the tetrahedron interpolating method, the unit cube is divided into six tetrahedrons. One of six tetrahedrons that contains the point O is determined by evaluating the relations of DL≧Da, Da>Db, and Db>DL. When the relation of DL≧Db is true, the relation of Da>Db is true, and the relation of Db>DL is false, the point O is contained in a tetrahedron defined by P5P0P1P2.

When the relation DL≧Db is true, the relation of Da>Db is false, and the relation of Db>DL is false, the point O is contained in a tetrahedron defined by P5P0P3P2.

When the relation DL≧Db is true, the relation Da>Db is false, and the relation Db>DL is true, the point O is contained in a tetrahedron defined by P5P6P3P2.

When the relation DL≧Db is false, the relation Da>Db is true, and the relation Db>DL is true, the point O is contained in a tetrahedron defined by P5P4P7P2.

When the relation DL≧Db is false, the relation Da>Db is true, and the relation Db>DL is false, the point O is contained in a tetrahedron defined by P5P6P7P2.

When the relation DL≧Db is false, the relation Da>Db is false, and the relation Db>DL is true, the point O is contained in a tetrahedron defined by P5P4P1P2.

When the point O is contained in the tetrahedron defined by P5P0P1P2, Oout corresponding to the position of point O is obtained as follows.

$$Oout=P5+DL \cdot (P0-P5)+Da \cdot (P1-P0)+Db \cdot (P2-P1) \quad (3)$$

Figure 9:
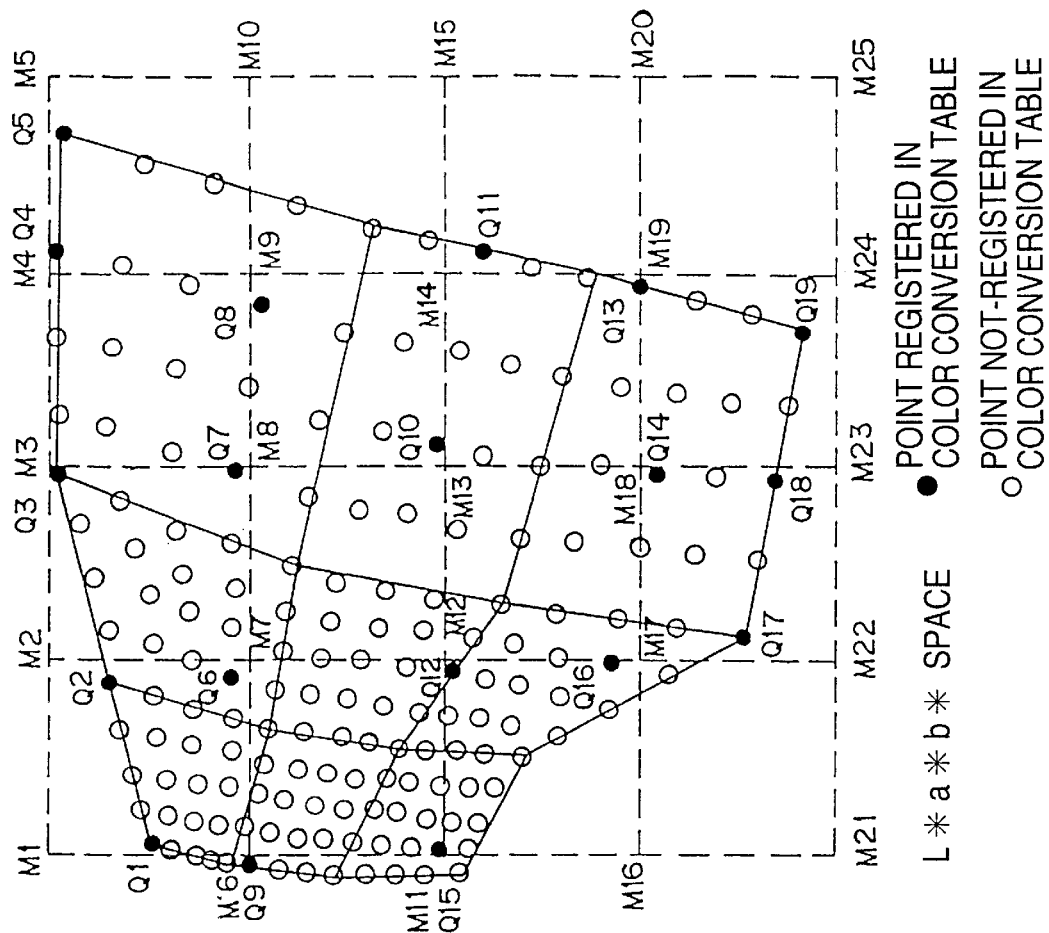
FIG. 9 is a schematic diagram showing the relationship between CMY signals and L*a*b* signals at divided points in a two-dimensional color space according to an embodiment of the present invention.
Figure 9:
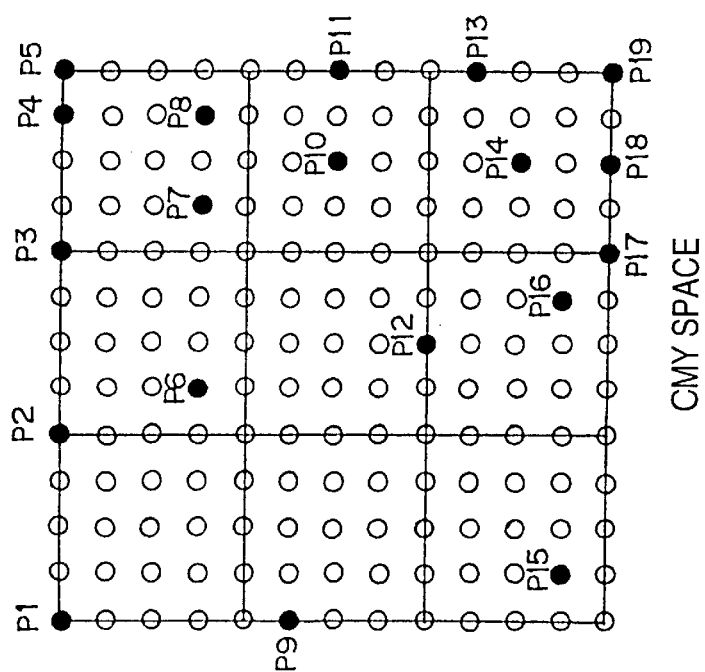

FIG. 9 is a schematic diagram for two-dimensional explaining a method for obtaining the relation between L*a*b* values regularly distributed in the L*a*b* space and CMY values by an interpolating process.

As shown in FIG. 9, it is assumed that colors corresponding to grid points in the CMY space are printable by a printer. The colors printed by the printer are measured by a color measuring unit. Thus, it is assumed that the relation between CMY values at grid points in the CMY space and L*a*b* values in the L*a*b* space is discretely generated. In this case, the L*a*b* values corresponding to the CMY values at the grid points in the CMY space are irregularly distributed in the L*a*b* space. Thus, when the relation between CMY values at the grid points in the CMY space and L*a*b* values in the L*a*b* space is interpolated, CMY values corresponding to L*a*b* values at grid points M1 to M25 in the L*a*b* space are generated.

A square composed of four grid points at which CMY values have been designated is divided into 4×4 squares. In the actual three-dimensional CMY space, a cube composed of eight grid points at which CMY values have been designated is divided into 4×4×4 cubes. L*a*b* values corresponding to CMY values at individual divided grid points are obtained by an interpolating process. L*a*b* values that are closest to L*a*b* values at the grid points M1 to M25 in the L*a*b* space are selected from the L*a*b* values obtained by the interpolating process. The relationship between the selected L*a*b* values and CMY values are registered as the relationship between L*a*b* values at the grid points in the L*a*b* space and CMY values.

For example, it is assumed that the points P1 to P19 in the CMY space correspond to the points Q1 to Q19 in the L*a*b* space, respectively. When the L*a*b* value at the point Q1 in the L*a*b* values in the L*a*b* space is closest to the L*a*b* value at the grid point M1, the CMY value at the point P1 in the CMY space is registered as a CMY value corresponding to the L*a*b* value at the grid point M1. When the L*a*b* value at the point Q2 in the L*a*b* values in the L*a*b* space is closest to the L*a*b* value at the grid point M2, the CMY value at the point P2 in the CMY space is registered as the CMY value corresponding to the L*a*b* value at the grid point M2.

Similarly, when the L*a*b* value at the point Q3 is selected as the L*a*b* value that is closest to the L*a*b* value at the grid point M3, the CMY value at the point P3 in the CMY space is registered as the CMY value corresponding to the L*a*b* value at the grid point M3. When the L*a*b* value at the point Q4 is selected as the L*a*b* value that is closest to the L*a*b* value at the grid point M4, the CMY value at the point P4 in the CMY space is registered as the CMY value corresponding to the L*a*b* value at the grid point M4. When the L*a*b* value at the point Q5 is selected as the L*a*b* value that is closest to the L*a*b* value at the grid point M5, the CMY value at the point P5 in the CMY space is registered as the CMY value corresponding to the L*a*b* value at the grid point M5.

In addition, the CMY value at the point P9 in the CMY space is registered corresponding to the L*a*b* value at the grid point M6. The CMY value at the point P6 in the CMY space is registered corresponding to the L*a*b* value at the grid point M7. The CMY value at the point P7 in the CMY space is registered corresponding to the L*a*b* value at the grid point M8. The CMY value at the point P8 in the CMY space is registered corresponding to the L*a*b* value at the grid point M9. The CMY value at the point P15 in the CMY space is registered corresponding to the L*a*b* value at the grid point M11. The CMY value at the point P12 in the CMY space is registered corresponding to the L*a*b* value at the grid point M12. The CMY value at the point P10 in the CMY space is registered corresponding to the L*a*b* value at the grid point M13. The CMY value at the point P11 in the CMY space is registered corresponding to the L*a*b* value at the grid point M14. The CMY value at the point P16 in the CMY space is registered corresponding to the L*a*b* value at the grid point M17. The CMY value at the point P14 in the CMY space is registered corresponding to the L*a*b* value at the grid point M18. The CMY value at the point P13 in the CMY space is registered corresponding to the L*a*b* value at the grid point M19. The CMY value at the point P17 in the CMY space is registered corresponding to the L*a*b* value at the grid point M22. The CMY value at the point P18 in the CMY space is registered corresponding to the L*a*b* value at the grid point M23. The CMY value at the point P19 in the CMY space is registered corresponding to the L*a*b* value at the grid point M24.

Thus, the relationship of color signals regularly distributed in the CMY space is improved by the interpolating process and color signals close to grid points in the L*a*b* space are obtained. The relationship between the color signals distributed at the grid points in the L*a*b* space and the color signals in the CMY space can be approximately obtained corresponding to the relationship between the color signals irregularly distributed in the L*a*b* space and the color signals regularly distributed in the CMY space. In addition, by decreasing the dividing intervals of the CMY space, the accuracy of the relationship between the color signals distributed at the grid points in the L*a*b* space and the color signals in the CMY space can be improved.

Figure 10:
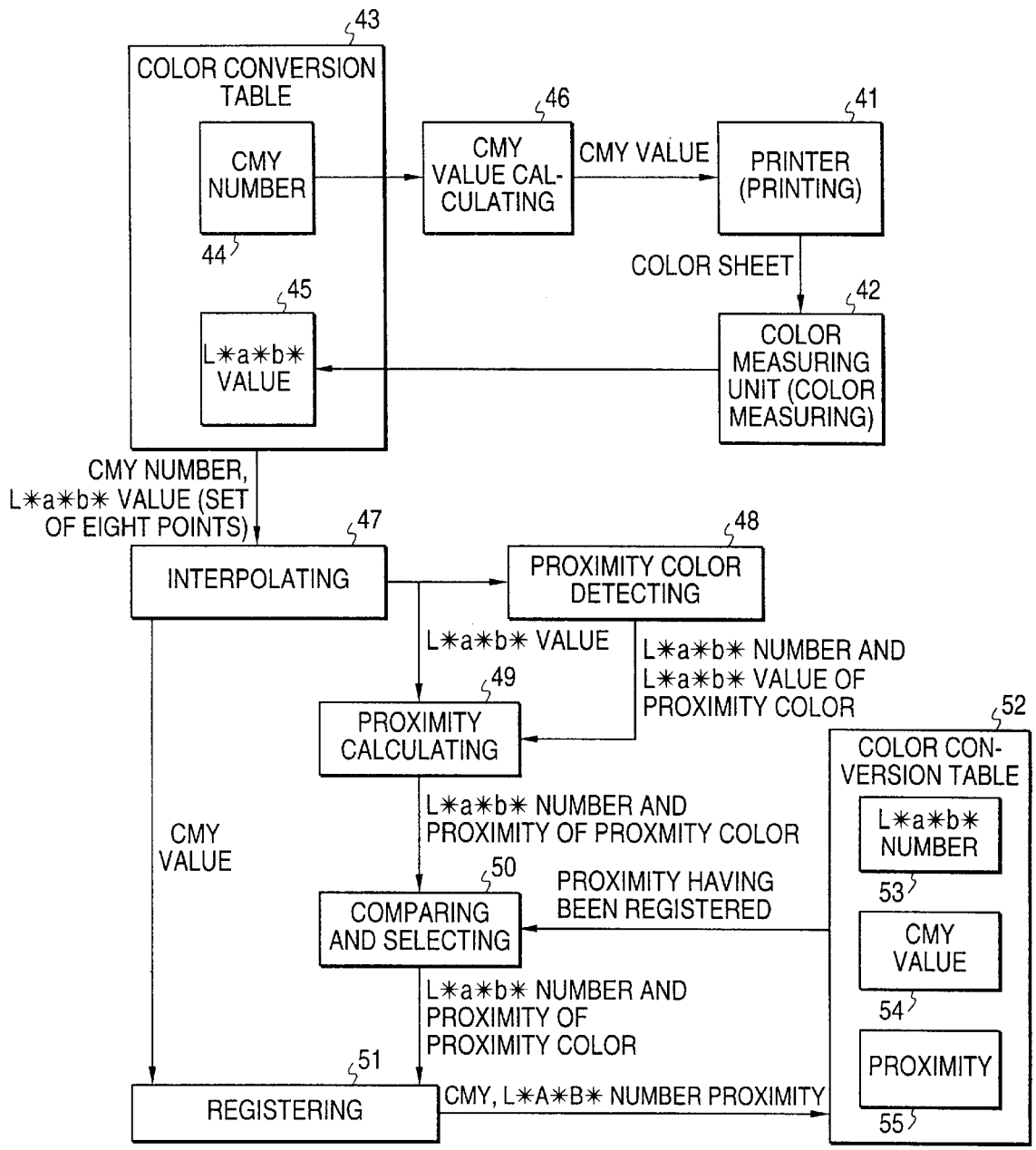
FIG. 10 is a schematic diagram showing the structure of a color conversion table generating apparatus according to an embodiment of the present invention.

FIG. 10 is a block diagram showing the structure for converting L*a*b* values irregularly distributed in the L*a*b* space into L*a*b* values regularly distributed.

As shown in FIG. 10, a printer 41 can output data of 256 tones or hues as a CMY value. With a CMY value designated ranging from 0 to 255, a color corresponding to the CMY value is printed. A color measuring unit 42 measures a color on a color sheet printed by the printer 41. The color measuring unit 42 outputs an L*a*b* value corresponding to the color on the color sheet.

When a CMY number 44 is designated with a color conversion table 43, a CMY value calculating unit 46 calculates a CMY value corresponding to the CMY number 44 and outputs the obtained CMY value to the printer 41. The printer 41 prints a color corresponding to the CMY value. The color measuring unit 42 measures the color on the color sheet printed by the printer 41. Thus, the color measuring unit 42 outputs an L*a*b* value corresponding to the color of the color sheet. The L*a*b* value that is output from the color measuring unit 42 is registered to the color conversion table 43.

When an L*a*b* value 45 corresponding to a CMY value that is distributed in a grid shape in the CMY space and that varies in nine levels is registered to the color conversion table 43, the CMY number 44 varies in the range from 0 to 9. In this case, the CMY value corresponding to the CMY number 44 is obtained as follows.

$$\text{CMY value} = (\text{int})(255.0 \times \text{CMY number}/8.0 + 0.5) \quad (4)$$

(where int represents that the value after the decimal point is rounded off)

As indicated from Formula (4), CMY values in the CMY space are distributed in a grid shape in the color conversion table. However, as shown in FIG. 9, L*a*b* values in the L*a*b* space are irregularly distributed. Thus, the relationship between L*a*b* values distributed in the grid shape in the L*a*b* space and the CMY values is generated and registered to the color conversion table 52.

An interpolating unit 47 interpolates the color conversion table 43 corresponding to the relationship between the CMY numbers 44 and the L*a*b* values 45 registered in the color conversion table 43 so as to improve the relationship between CMY values and L*a*b* values. For example, the interpolating unit 47 divides a unit cube defined by eight grid points in the CMY space into 4×4×4 portions and obtains L*a*b* values corresponding to CMY values at the divided points by weighing operations of L*a*b* values corresponding to eight grid points that surround each divided point.

A proximity color detecting unit 48 detects a grid point that has an L*a*b* value close to an L*a*b* value obtained by the interpolating unit 47 from the L*a*b* space and calculates an L*a*b* number corresponding to the grid point.

A proximity calculating unit 49 calculates the proximity of the L*a*b* value obtained by the interpolating unit 47 to the L*a*b* value at the grid point detected by the proximity color detecting unit 48. The proximity is obtained by squaring the distance between the L*a*b* value obtained by the interpolating unit 47 and the L*a*b* value at the grid point detected by the proximity color detecting unit 48.

A comparing and selecting unit 50 reads a proximity 55 of the L*a*b* number 53 calculated by the proximity color detecting unit 48 from the color conversion table 52 and compares the proximity 55 that has been read from the color conversion table 52 with the proximity calculated by the proximity calculating unit 49. When the proximity 55 that has been read from the color conversion table 52 is larger than the proximity calculated by the proximity calculating unit 49, the L*a*b* number 53 calculated by the proximity color detecting unit 48 and the proximity calculated by the proximity calculating unit 49 are output to a registering unit 51.

The registering unit 51 then registers the CMY value received from the interpolating unit 47 and the proximity received from the comparing and selecting unit 50 to the color conversion table 52 corresponding to the L*a*b* number 53 received from the comparing and selecting unit 50.

The range of L*a*b* values registered to the color conversion table 52 are $0 \leq L^* \leq 100$, $-100 \leq a^* \leq 100$, and $-100 \leq b^* \leq 100$ including the color reproducible range of the printer 41. The L*a*b* values in the L*a*b* space are distributed at intervals of 16 in a grid shape. Thus, the range of the L*a*b* values is $0 \leq L^*$ number $\leq 7$, $0 \leq a^*$ number $\leq 13$, and $0 \leq b^*$ number $\leq 13$. The relation between L*a*b* numbers and L*a*b* values is obtained as follows.

$$L^* \text{value} = L \text{-number} \times 16 \quad (5)$$

$$a^* \text{value} = a^* \text{number} \times 16 - 100 \quad (6)$$

$$b^* \text{value} = b^* \text{number} \times 16 - 100 \quad (7)$$

Figure 11:
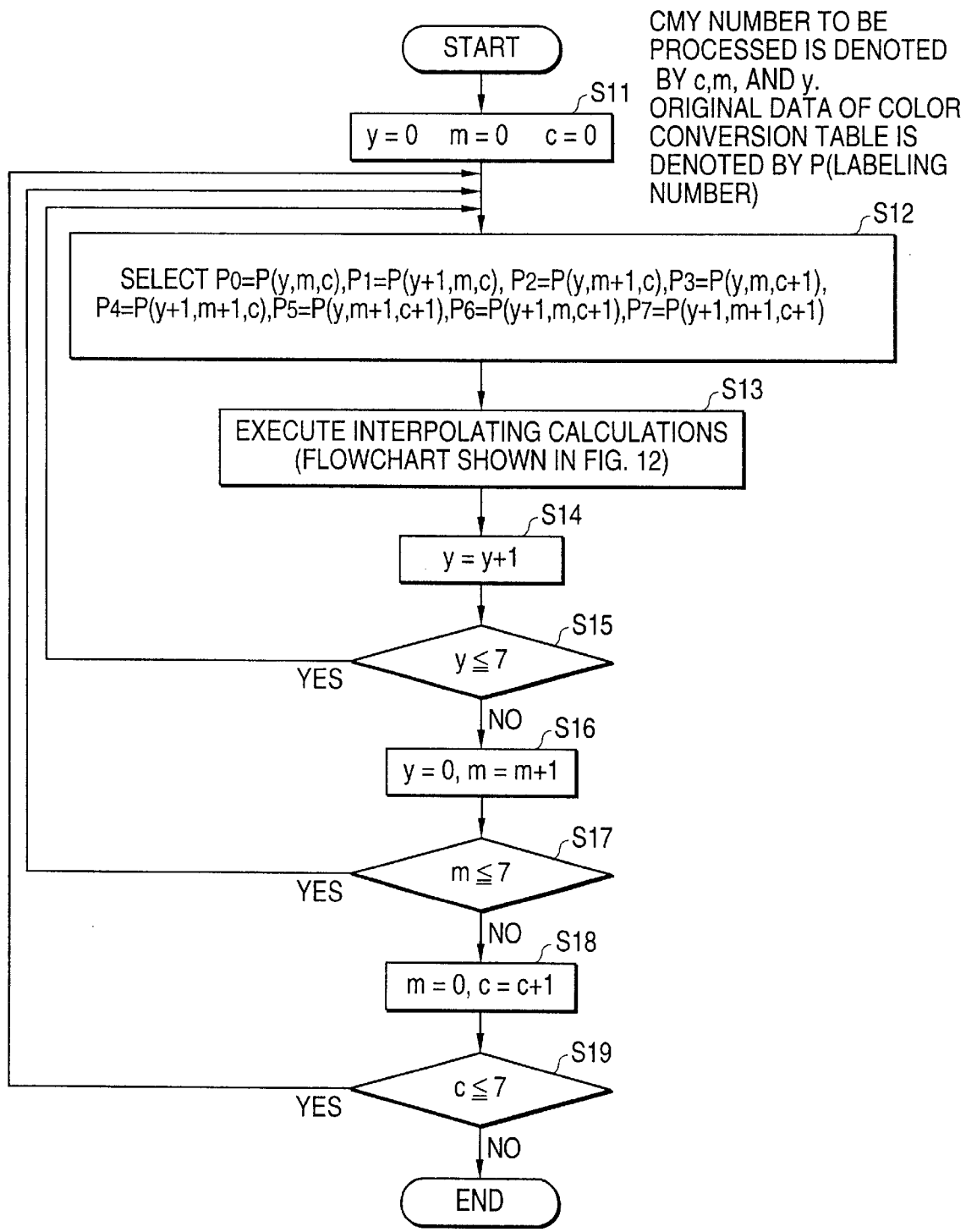
FIG. 11 is a flow chart showing a data selecting process according to an embodiment of the present invention.

FIG. 11 is a flow chart showing a process for selecting a designated point of a CMY value used to interpolate a non-designated point of a CMY value. In the flow chart shown in FIG. 11, it is assumed that CMY values have been registered in the color conversion table 43 in the range of $0 \leq C$ number $\leq 8$, $0 \leq M$ number $\leq 8$, and $0 \leq Y$ number $\leq 8$.

As shown in FIG. 11, a CMY number is initialized as y=0, m=0, and c=0 (y is Y number; m is M number; and c is C number) (at step S11).

Eight grid points P0 to P7 that composes a unit cube in the CMY space are selected at step S12.

$$P0 = P(y, m, c) \quad (8)$$

$$P1 = P(y+1, m, c) \quad (9)$$

$$P2 = P(y, m+1, c) \quad (10)$$

$$P3 = P(y, m, c+1) \quad (11)$$

$$P4 = P(y+1, m+1, c) \quad (12)$$

$$P5 = P(y, m+1, c+1) \tag{13}$$

$$P6 = P(y+1, m, c+1) \tag{14}$$

$$P7 = P(y+1, m+1, c+1) \tag{15}$$

where P(y, m, c) represents the position of a grid point represented by y, m, and c.

The L*a*b* values corresponding to the selected eight grid points P0 to P7 are weighted and thereby L*a*b* values corresponding to the divided points in the unit cube designated by the eight grid points P0 to P7 are obtained. An L*a*b* value that is the closest to the L*a*b* values at the grid points in the L*a*b* space is registered to the color conversion table 52 at step S13 of FIG. 11.

Next, one of y, m, and c is incremented by 1 and thereby one of 8×8×8 unit cubes registered in the color conversion table 43 is selected. Thereafter, the interpolating process is performed for the selected unit cube from steps S14 to S19 of FIG. 11.

Figure 12:
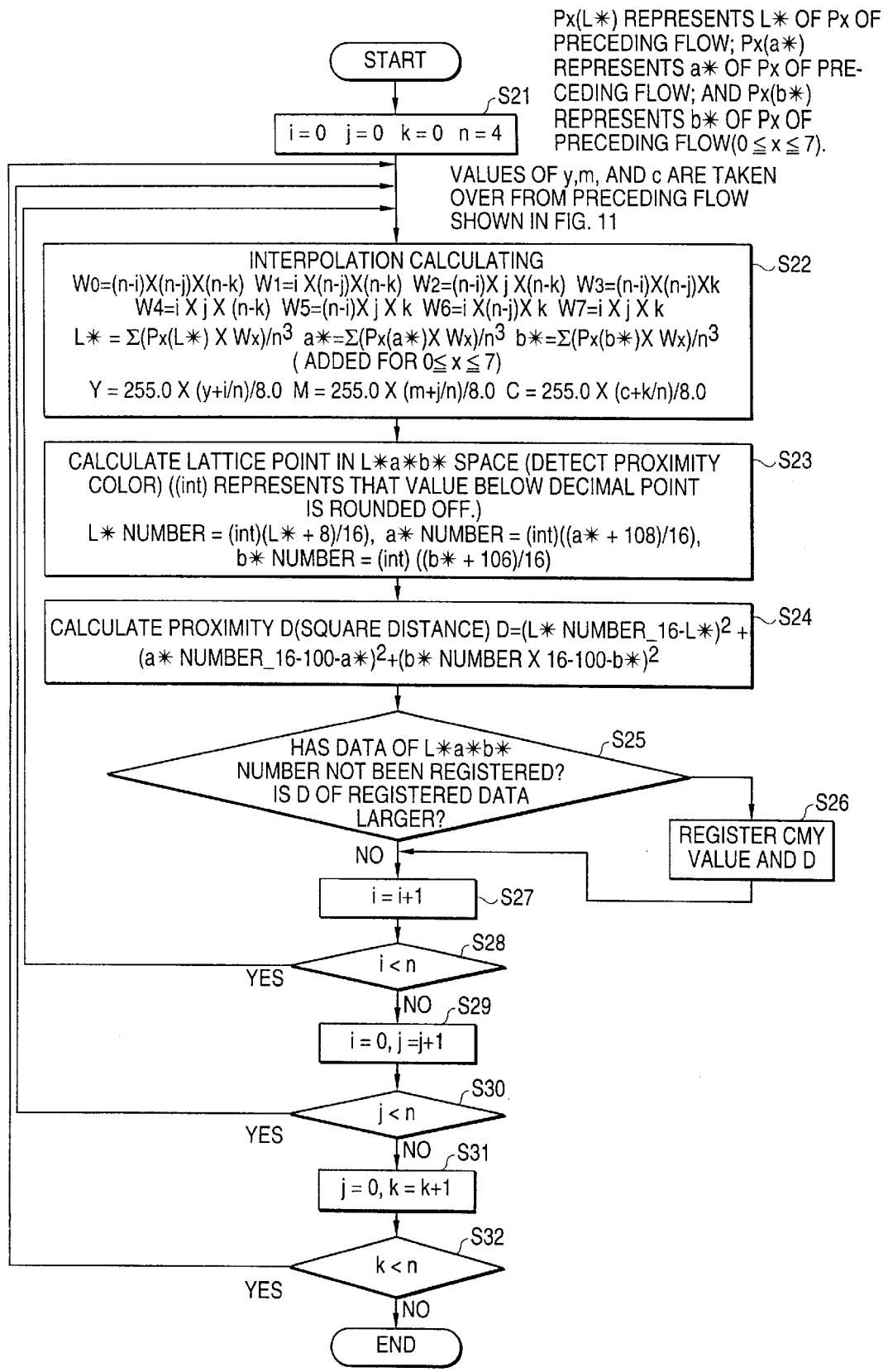
FIG. 12 is a flow chart showing an interpolation calculating process and a data registering process according to an embodiment of the present invention.

FIG. 12 is a flow chart showing the interpolating operation process at step 13 shown in FIG. 11. In the flow chart shown in FIG. 12, the unit cube designated with the eight grid points P0 to P7 is divided into 4×4×4 portions. The range of L*a*b* values registered in the color conversion table 52 is $0 \leq L^* \leq 100$, $-100 \leq a^* \leq 100$, and $-100 \leq b^* \leq 100$. The L*a*b* values in the L*a*b* space are distributed at intervals of 16 in a grid shape.

As shown in FIG. 12, i=0, j=0, k=0, and n=4 are designated where i, j, and k are variables that present the positions of the divided points of the unit cube and have ranges of $0 \leq i \leq 3$, $0 \leq j \leq 3$, and $0 \leq k \leq 3$ because the unit cube is divided into 4×4×4 portions at step S21 of FIG. 12.

Next, weighing coefficients for obtaining L*a*b* values corresponding to the divided points designated by i, j, and k are generated. In this example, the interpolating process is performed corresponding to the cube interpolating method. In the cube interpolating method, volumes of eight rectangular parallelepipeds that are divided by planes that traverse each divided point and perpendicularly intersect with each CMY axis are used as weighing coefficients for the interpolating calculations. In other words, the weighing coefficients W0 to W7 are expressed as follows.

$$W0 = (n-i) \times (n-j) \times (n-k) \tag{16}$$

$$W1 = i \times (n-j) \times (n-k) \tag{17}$$

$$W2 = (n-i) \times j - (n \times k) \tag{18}$$

$$W3 = (n-i) \times (n-j) \times k \tag{19}$$

$$W4 = i \times j \times (n-k) \tag{20}$$

$$W5 = (n-i) \times j \times k \tag{21}$$

$$W6 = i \times (n-j) \times k \tag{22}$$

$$W7 = i \times j \times k \tag{23}$$

With the weighing coefficients W0 to W7, L*a*b* values corresponding to the divided points are expressed as follows at step S22 of FIG. 12.

$$L^* = (P0(L^*) \times W0 + P1(L^*) \times W1 + P2(L^*) \times W2 + p3(L^*) \times W3 + P4(L^*) \times W4 + P5\ (L^*) \times W5 + P6(L^*) \times W6 + P7(L^*) \times W7)/n3 \tag{24}$$

$$a^* = (P0(a^*) \times W0 + P1(a^*) \times W1 + P2(a^*) \times W2 + P3(a^*) \times W3 + P4(a^*) \times W4 + P5\ (a^*) \times W5 + P6(a^*) \times W6 + P7(a^*) \times W7)/n3 \tag{25}$$

$$b^* = (P0(b^*) \times W0 + P1(b^*) \times W1 + P2(b^*) \times W2 + P3(b^*) \times W3 + P4(b^*) \times W4 + P5\ (b^*) \times W5 + P6(b^*) \times W6 + P7(b^*) \times W7)/n3 \tag{26}$$

Where P0 (L*) to P7 (L*) are L* values corresponding to the grid points P0 to P7 selected in FIG. 11; P0 (a*) to P7 (a*) are a* values corresponding to the grid points P0 to P7 selected in FIG. 11; and P0 (b*) to P7 (b*) are b* values corresponding to the grid points P0 to P7 selected in FIG. 11.

A CMY value at a divided point designated by i, j, and k is expressed as follows.

$$Y = 255.0 \times (y + i/n)/8.0 \tag{27}$$

$$M = 255.0 \times (m + j/n)/8.0 \tag{28}$$

$$C = 255.0 \times (c + k/n)/8.0 \tag{29}$$

Where y, m, and c are variables that represent the position of a unit cube.

A grid point close to the obtained L*a*b* value in the L*a*b* space is detected. Thus, a grid point in the L*a*b* space in the vicinity of the obtained L*a*b* value is detected at step S23 of FIG. 12. In other words, the L*a*b* number at the grid point in the L*a*b* space in the vicinity of the obtained L*a*b* value is expressed as follows.

$$L^* \text{number} = (\text{int})((L^* + 8)/16) \tag{30}$$

$$a^* \text{number} = (\text{int})((a^* + 108)/16) \tag{31}$$

$$b^* \text{number} = (\text{int})((b^* + 108)/16) \tag{32}$$

where (int) represents that the value after the decimal point is rounded off.

Next, the proximity D of the obtained L*a*b* value to the grid point in the L*a*b* space is obtained by the following expression (at step S24).

$$D = (L^* \text{number} \times 16 - L)^2 + (a^* \text{number} \times 16 - 100 - a)^2 + (b^* \text{number} \times 16 - 100 - b)^2 \tag{33}$$

In the case that a CMY values corresponding to an L*a*b* value has not been registered in the color conversion table 52, or in the case that the proximity corresponding to the L*a*b* value registered in the color conversion table 52 is smaller than the proximity obtained at step S24 at step S25 of FIG. 12, the CMY value obtained at step S22 of FIG. 12 and the proximity obtained at step S24 of FIG. 12 are registered to the color conversion table 52 corresponding to the L* a*b* number obtained at step S23 of FIG. 12 at step S26 of FIG. 12.

Further, one of i, j, or k is incremented by 1 and thereby one of the divided points of the unit cubes that have been divided by 4×4×4 is selected. The interpolation calculating process and the updating process of the color conversion table 52 are repeated for the selected divided point from steps S27 to S32 of FIG. 12.

Thus, the relationship between L*a*b* values regularly distributed in the L*a*b* space and CMY values in the color range of the printer is generated.

As shown in FIG. 7, the relationship between L*a*b* values regularly distributed in the L*a*b* space and CMY values distributed out of the color range of the printer 41 is generated by extrapolating the L*a*b* values regularly distributed in the L*a*b space and the CMY values in the color range of the printer 41.

Figure 13:
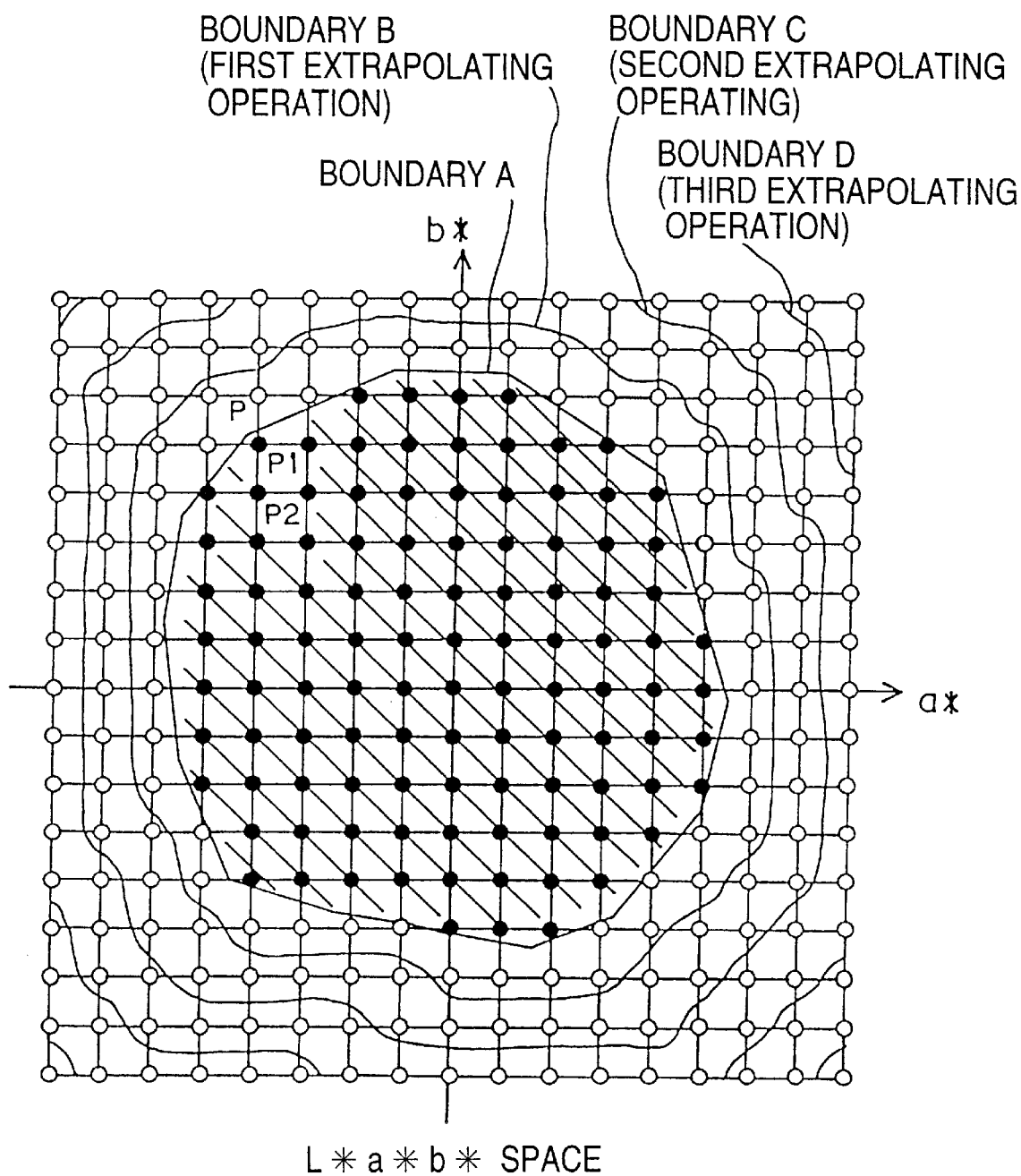
FIG. 13 is a schematic diagram two-dimensional showing an extrapolating point selecting process in an L*a*b* space according to an embodiment of the present invention.

FIG. 13 is a schematic diagram showing the distribution of grid points in and out of a color range of a printer on an a*b* plane in the L* a*b* sp ace.

As shown in FIG. 13, assuming that CMY values corresponding to grid points (black points) in the color range of the printer have be en obtained in the processes shown in FIGS. 11 and 12, CMY values corresponding to grid points (clear or white points) out of the color range of the printer are obtained by extrapolating the CMY values corresponding to the grid points (black points) in the color range of the printer. When a CMY value corresponding to a grid point P is obtained, a grid point P1 adjacent to the grid point P and a grid point P2 adjacent to the grid point P1 are obtained from grid points inside a boundary A in the color range of the printer. With a CMY value corresponding to the grid point P1 and a CMY value corresponding to the grid point P2, a CMY value corresponding to the grid point P is obtained. When the grid point P1 adjacent to the grid point P and the grid point P2 adjacent to the grid point P1 are not present in the color range of the printer, the next grid point in the L*a*b* space is processed.

When the above-described process is performed for all the grid points in the L*a*b* space, a CMY value can be designated to a grid point inside a boundary B in the vicinity of the color range of the printer. Next, with data of a grid point inside the boundary B, a CMY value can be designated to a grid point inside a boundary C. With data of a grid point inside the boundary C, a CMY value can be designated to a grid point inside a boundary D.

Figure 14:
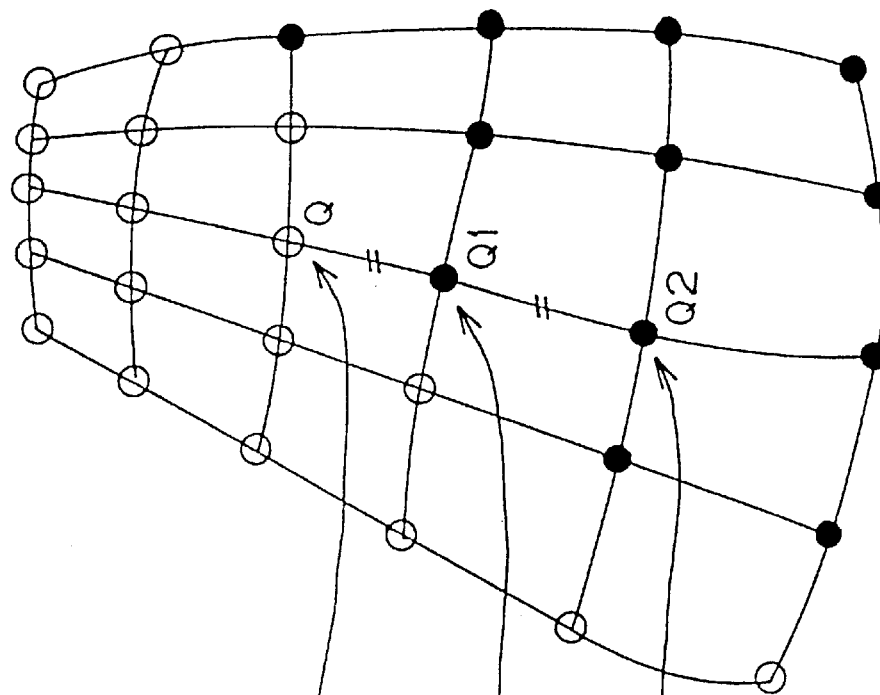
FIG. 14 is a schematic diagram two-dimensional showing an extrapolating point selecting process in a color space according to an embodiment of the present invention.
Figure 14:
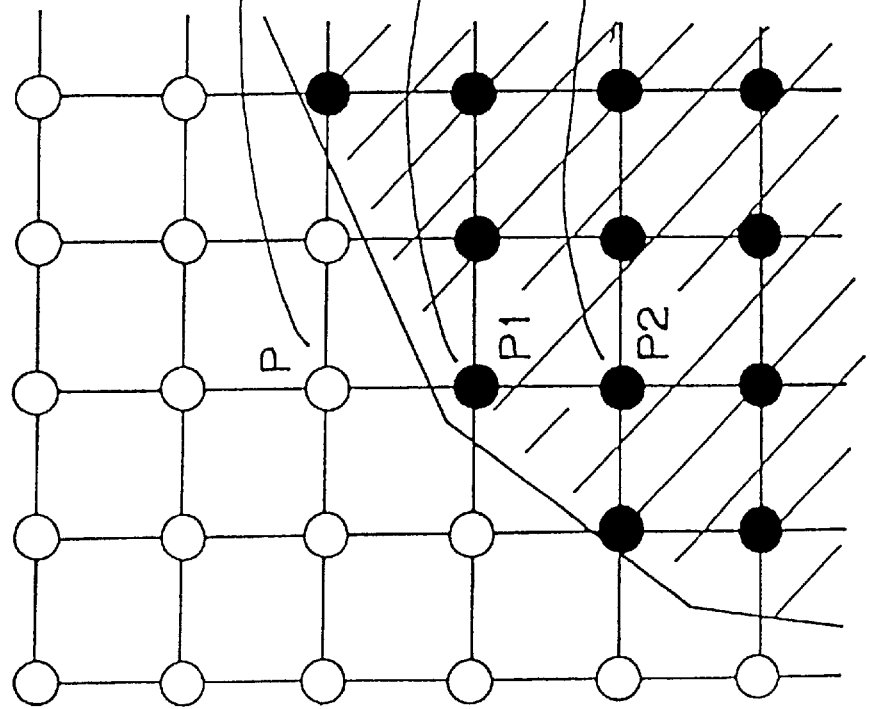

FIG. 14 is a schematic diagram for explaining a method for calculating a CMY value corresponding to a grid point P shown in FIG. 13.

As shown in FIG. 14, it is assumed that a grid point P1 is adjacent to a grid point P and that a grid point P2 is adjacent to the grid point P1. In addition, it is assumed that the grid point P1 corresponds to a point Q1 in the CMY space, that the grid point P2 corresponds to a point Q2 in the CMY space, and that the grid point P2 corresponds to a point Q2 in the CMY space. It is assumed that a CMY value at the point Q1 and a CMY value at the point Q2 have been registered in the color conversion table. At this point, a CMY value corresponding to the grid point P is obtained as a CMY value at the point Q that is point-symmetrical to the point Q2 with respect to the point Q1.

This method for calculating a CMY value corresponding to a grid point P will be described using mathematical expressions. It is assumed that the range of L*a*b* values in a color conversion table to be generated is $0 \leq L^* \leq 112$, $-128 \leq a^* \leq 128$, and $-128 \leq b^* \leq 128$ at intervals of 16 (unlike with the range of the actual colors). An L*a*b* value is managed with an L*a*b* number ($0 \leq Lnum \leq 7$, $anum \leq 17$, and $0 \leq bnum \leq 17$). For example, an L*a*b* number equal to (0, 0, 0) corresponds to a grid point of an L*a*b* value equal to (0, -128, -128). An L*a*b* number equal to (0, 0, 1) corresponds to a grid point of an L*a*b* value equal to (0, -128, -112). An L*a*b* number equal to (5, 17, 17) corresponds to a grid point of an L*a*b* value equal to (112, 128, 128). In other words, the following relations are satisfied.

$$L^* = Lnum \cdot 16 \tag{34}$$

$$a^* = anum \cdot 16 - 128 \tag{35}$$

$$b^* = bnum \cdot 16 - 128 \tag{36}$$

where Lnum, anum, and bnum represent L* number, a* number, and b* number, respectively.

The color conversion table is a three-dimensional array with arguments of L*, a*, and b* numbers as C value, M value, and Y value. The three-dimensional array is expressed as follows:

C[Lnum][anum][bnum];
M[Lnum][anum][bnum];
Y[Lnum][anum][bnum].

All grid points are selected one after the other and the following process is performed for each grid point. In this case, an L*a*b* number at the selected grid point is represented by (Lnum, anum, and bnum).

Initially, it is determined whether data has been designated to the selected grid point. In the initial state, data has been designated to only grid points in the color range of the printer. Thereafter, a grid point at which data has not been designated is selected. It is determined whether data has been designated to two grid points adjacent to the selected grid points. An L*a*b* number at the grid point adjacent to the selected grid point is denoted by (Lnum1, anum1, bnum1). An L*a*b* number at the further distant selected grid point is denoted by (Lnum2, anum2, bnum2).

Figure 15:
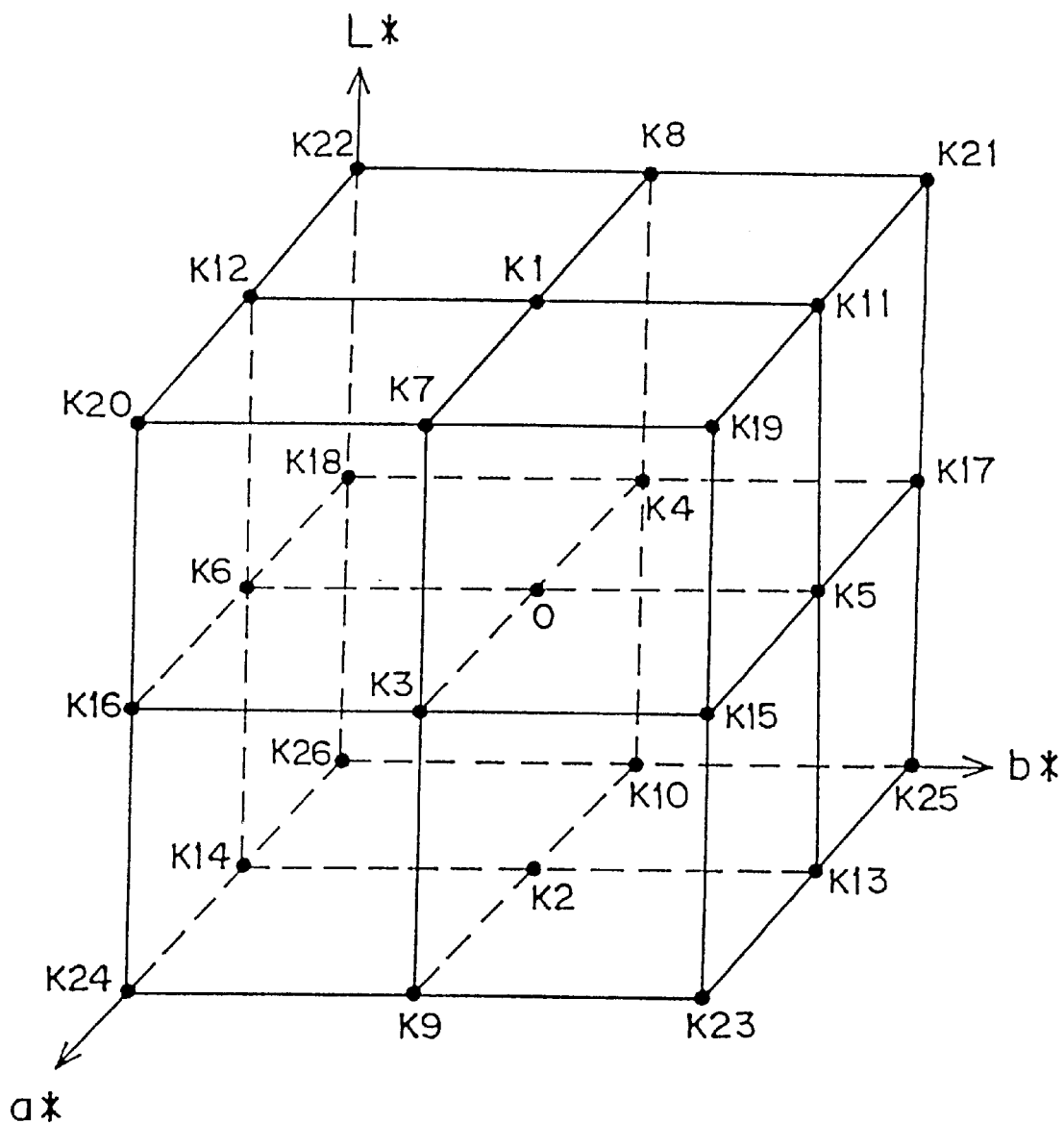
FIG. 15 is a schematic diagram showing adjacent points in a three-dimensional space according to an embodiment of the present invention.

FIG. 15 is a schematic diagram showing positions of grid points K1 to K26 adjacent to a selected grid point O. As shown in FIG. 15, there are 26 grid points K1 to K26 adjacent to the selected grid point O. L*a*b* numbers (Lnum1, anum1, bnum1) of the grid points K1 to K26 adjacent to the selected grid point O and L*a*b* numbers (Lnum2, anum2, bnum2) at the grid point further adjacent to the selected grid point O are represented with the L*a*b* numbers (Lnum, anum, bnum) at the selected grid point O as follows.

| | |
|---|---|
| 1) (Lnum1, anum1, bnum1) = (Lnum + 1, anum, bnum) | (K1) |
|    (Lnum2, anum2, bnum2) = (Lnum + 2, anum, bnum) | |
| 2) (Lnum1, anum1, bnum1) = (Lnum − 1, anum, bnum) | (K2) |
|    (Lnum2, anum2, bnum2) = (Lnum − 2, anum, bnum) | |
| 3) (Lnum1, anum1, bnum1) = (Lnum, anum + 1, bnum) | (K3) |
|    (Lnum2, anum2, bnum2) = (Lnum, anum + 2, bnum) | |
| 4) (Lnum1, anum1, bnum1) = (Lnum, anum − 1, bnum) | (K4) |
|    (Lnum2, anum2, bnum2) = (Lnum, anum − 2, bnum) | |
| 5) (Lnum1, anum1, bnum1) = (Lnum, anum, bnum + 1) | (K5) |
|    (Lnum2, anum2, bnum2) = (Lnum, anum, bnum + 2) | |
| 6) (Lnum1, anum1, bnum1) = (Lnum, anum, bnum − 1) | (K6) |
|    (Lnum2, anum2, bnum2) = (Lnum, anum, bnum − 2) | |
| 7) (Lnum1, anum1, bnum1) = (Lnum + 1, anum + 1, bnum) | (K7) |
|    (Lnum2, anum2, bnum2) = (Lnum + 2, anum + 2, bnum) | |
| 8) (Lnum1, anum1, bnum1) = (Lnum + 1, anum − 1, bnum) | (K8) |
|    (Lnum2, anum2, bnum2) = (Lnum + 2, anum − 2, bnum) | |
| 9) (Lnum1, anum1, bnum1) = (Lnum − 1, anum + 1, bnum) | (K9) |
|    (Lnum2, anum2, bnum2) = (Lnum − 2, anum + 2, bnum) | |
| 10) (Lnum1, anum1, bnum1) = (Lnum − 1, anum − 1, bnum) | (K10) |
|     (Lnum2, anum2, bnum2) = (Lnum − 2, anum − 2, bnum) | |
| 11) (Lnum1, anum1, bnum1) = (Lnum + 1, anum, bnum + 1) | (K11) |
|     (Lnum2, anum2, bnum2) = (Lnum + 2, anum, bnum + 2) | |
| 12) (Lnum1, anum1, bnum1) = (Lnum + 1, anum, bnum − 1) | (K12) |
|     (Lnum2, anum2, bnum2) = (Lnum + 2, anum, bnum − 2) | |
| 13) (Lnum1, anum1, bnum1) = (Lnum − 1, anum, bnum + 1) | (K13) |
|     (Lnum2, anum2, bnum2) = (Lnum − 2, anum, bnum + 2) | |
| 14) (Lnum1, anum1, bnum1) = (Lnum − 1, anum, bnum − 1) | (K14) |
|     (Lnum2, anum2, bnum2) = (Lnum − 2, anum, bnum − 2) | |
| 15) (Lnum1, anum1, bnum1) = (Lnum, anum + 1, bnum + 1) | (K15) |
|     (Lnum2, anum2, bnum2) = (Lnum, anum + 2, bnum + 2) | |
| 16) (Lnum1, anum1, bnum1) = (Lnum, anum + 1, bnum − 1) | (K16) |
|     (Lnum2, anum2, bnum2) = (Lnum, anum + 2, bnum − 2) | |
| 17) (Lnum1, anum1, bnum1) = (Lnum, anum − 1, bnum + 1) | (K17) |
|     (Lnum2, anum2, bnum2) = (Lnum, anum − 2, bnum + 2) | |
| 18) (Lnum1, anum1, bnum1) = (Lnum, anum − 1, bnum − 1) | (K18) |
|     (Lnum2, anum2, bnum2) = (Lnum, anum − 2, bnum − 2) | |
| 19) (Lnum1, anum1, bnum1) = (Lnum + 1, anum + 1, bnum + 1) | (K19) |
|     (Lnum2, anum2, bnum2) = (Lnum + 2, anum + 2, bnum + 2) | |
| 20) (Lnum1, anum1, bnum1) = (Lnum + 1, anum + 1, bnum − 1) | (K20) |
|     (Lnum2, anum2, bnum2) = (Lnum + 2, anum + 2, bnum − 2) | |
| 21) (Lnum1, anum1, bnum1) = (Lnum + 1, anum − 1, bnum + 1) | (K21) |
|     (Lnum2, anum2, bnum2) = (Lnum + 2, anum − 2, bnum + 2) | |
| 22) (Lnum1, anum1, bnum1) = (Lnum + 1, anum − 1, bnum − 1) | (K22) |
|     (Lnum2, anum2, bnum2) = (Lnum + 2, anum − 2, bnum − 2) | |
| 23) (Lnum1, anum1, bnum1) = (Lnum − 1, anum + 1, bnum + 1) | (K23) |
|     (Lnum2, anum2, bnum2) = (Lnum − 2, anum + 2, bnum + 2) | |
| 24) (Lnum1, anum1, bnum1) = (Lnum − 1, anum + 1, bnum − 1) | (K24) |
|     (Lnum2, anum2, bnum2) = (Lnum − 2, anum + 2, bnum − 2) | |

-continued 25) (Lnum1, anum1, bnum1) = (Lnum − 1, anum − 1, bnum + 1)   (K25)
    (Lnum2, anum2, bnum2) = (Lnum − 2, anum − 2, bnum + 2)
26) (Lnum1, anum1, bnum1) = (Lnum − 1, anum − 1, bnum − 1)   (K26)
    (Lnum2, anum2, bnum2) = (Lnum − 2, anum − 2, bnum − 2)

Since there are 26 directions at the selected grid point O, the grid points are successively determined in the order from 1 to 26. However, the determining order is not limited to a sequential order. When data has been designated by two grid points adjacent to the selected grid point, the extrapolation calculating operation process is performed.

In the extrapolation calculating process, a CMY value symmetrical with respect to a grid point of an L*a*b* number (Lnum2, anum2, bnum2) around a CMY value corresponding to a grid point of an L*a*b* number (Lnum1, anum1, bnum1) is calculated as follows.

$$C[Lnum][anum][bnum]=C[Lnum1][anum1][bnum1]\cdot 2C[Lnum2][anum2][bnum2] \quad (37)$$

$$M[Lnum][anum][bnum]=M[Lnum1][anum1][bnum1]\cdot 2M[Lnum2][anum2][bnum2] \quad (38)$$

$$Y[Lnum][anum][bnum]=Y[Lnum1][anum1][bnum1]\cdot 2Y[Lnum2][anum2][bnum2] \quad (39)$$

The above-described process is performed for all grid points. Thus, CMY values at grid points around a grid point in the color range can be designated.

Figure 16:
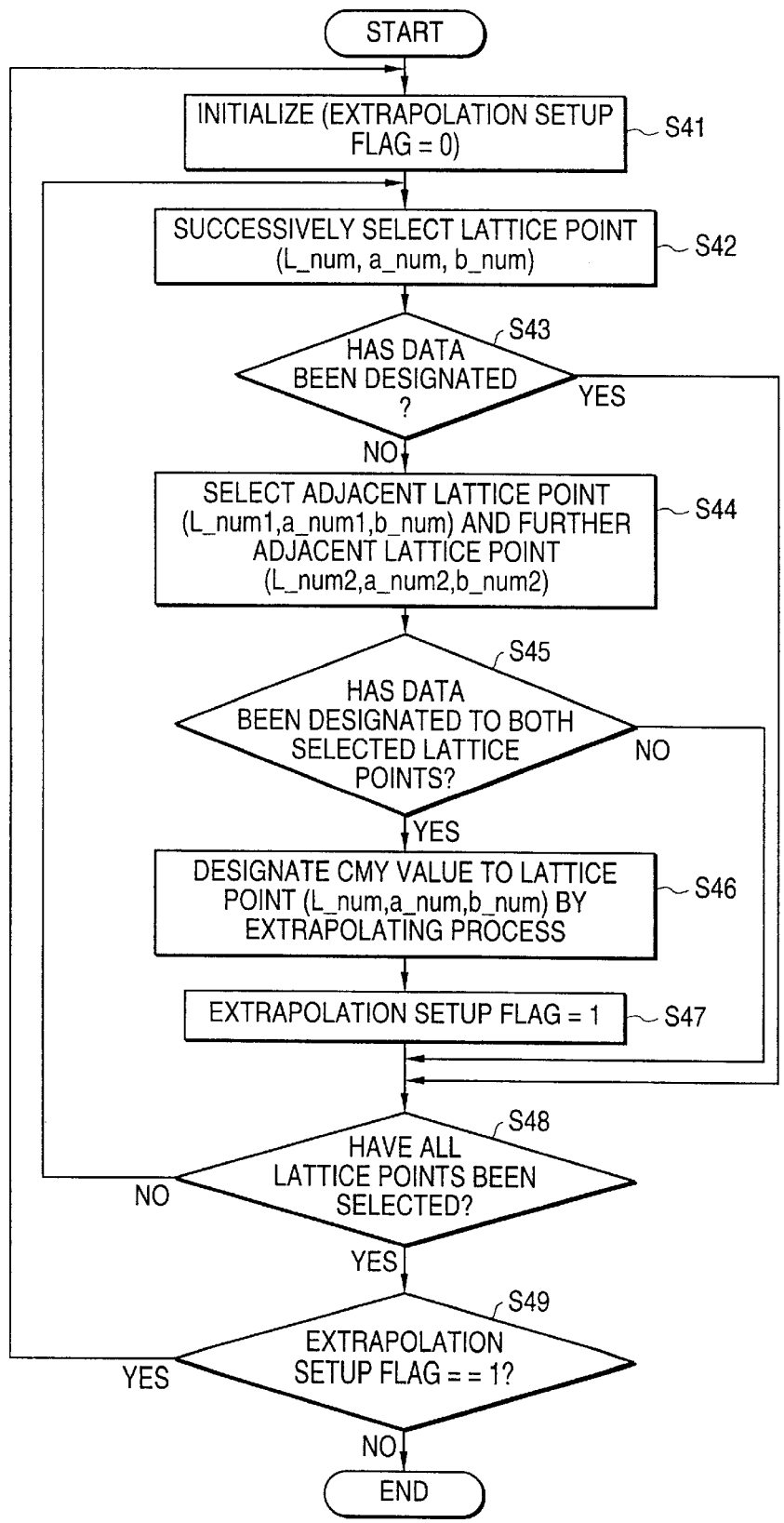
FIG. 16 is a flow chart showing a method for generating a color signal out of a color range according to the first embodiment of the present invention.

FIG. 16 is a flow chart showing a method for obtaining a CMY value out of the color range by an extrapolating process.

As shown in FIG. 16, an extrapolation setup flag is set to 0 at step S41 of FIG. 16 as an initializing step. In the initial state, data is designated to grid points in the color range.

Next, an L*a*b* number (Lnum, anum, bnum; $0 \leq Lnum \leq 7$, $anum < 13$, $0 \leq bnum \leq 13$) is selected. Thus, a grid point in the L*a*b* space is selected at step S42 of FIG. 16. It is determined whether data has been designated to the selected grid point at step S43 of FIG. 16. When data has not been designated to the selected grid point, a data designating process is performed.

In the data designating process, two grid points adjacent to the selected grid are selected at step S44 of FIG. 16. It is determined whether data has been designated to the two grid points adjacent to the selected grid point at step S45 of FIG. 16. At this point, the L*a*b* number at the grid point adjacent to the selected grid point is denoted by (Lnum1, anum1, bnum1). The L*a*b* number at the grid point further adjacent to the selected grid point is denoted by (Lnum2, anum2, bnum2).

When data has been designated to two grid points adjacent to the selected grid point in one of the 26 directions, the extrapolation calculating process is performed with data at the two grid points adjacent to the selected grid point. Thus, a CMY value corresponding to the selected grid point is calculated at step S46 of FIG. 16. The extrapolation setup flag is set to 1 at step S47 of FIG. 16.

When data has not been designated to the two grid points adjacent to the selected grid point in all the 26 directions, unless all grid points have been selected at step S48 of FIG. 16, the flow returns to step S42. At step S42, the next grid point in the L*a*b* space is selected.

After all the grid points have been selected for the first time and the extrapolation setup flag is 1 at step S49 of FIG. 16, the flow returns to step S41. At step S41 of FIG. 16, all the grid points are selected for a second time. Thus, data is designated to grid points outside those that have been newly designated. After these processes have been repeated and data has been designated to all the grid points in the L*a*b* space, it is determined that the extrapolation setup flag is 0 at step S49. Thus, the process is completed.

Data can be designated to only grid points around those in the color range of the printer. Thus, with the grid points in the color range of the printer, CMY values cannot be designated to grid points apart from those in the color range of the printer. Consequently, CMY values are designated to grid points around those in the color range of the printer. With the designated CMY values, outer grid points are extrapolated.

FIG. 17 shows an example of the content of a color conversion table generated in the above-described process.

As shown in FIG. 17, assuming that CMY values that are color-reproducible by the printer are in the range from 0 to 255, data of which CMY values are in the range from 0 to 255 is data in the color range, whereas data of which CMY values is less than 0 or larger than 256 is data out of the color range. Since data out of the color range has a numeric value other than the range from 0 to 255, when a color in the color range or out of the color range is converted by the interpolating process, it can be accurately converted up to the boundary of the color range.

In the above-described embodiment, data that is largely separated from the color range is designated. However, since data that is largely separated from the color range is generated by extrapolating a large distance, the data may contain a large error. Thus, identification data that represents the distance of the extrapolated data from the color range may be used. For example, in the flow chart shown in FIG. 16, by repeating the process at the branch of "extrapolation setup flag=1" at step S49, data at an outer grid point is generated so as to designate data that is largely apart from the color range. Thus, when data at a grid point is designated, the number of times that the flow passes through the branch is added as identification data.

When the accuracy of the data registered in the color conversion table is low, since the accuracy of data out of the color range deteriorates, data out of the color range is generated in such a manner that data that largely deviates from a grid point is not used. For example, the conformity to a grid point may be written to the color conversion table beforehand. When data with low conformity has been registered in the color conversion table, the data is treated as if it has not been registered therein. Thus, data with low accuracy can be prevented from being extrapolated. Thereby, data out of the color range (data with low accuracy) can be prevented from being generated.

SECOND PREFERRED EMBODIMENT

A method for generating a conversion table for converting an L*a*b* value into a CMY value according to a second embodiment will be described.

Figure 18:
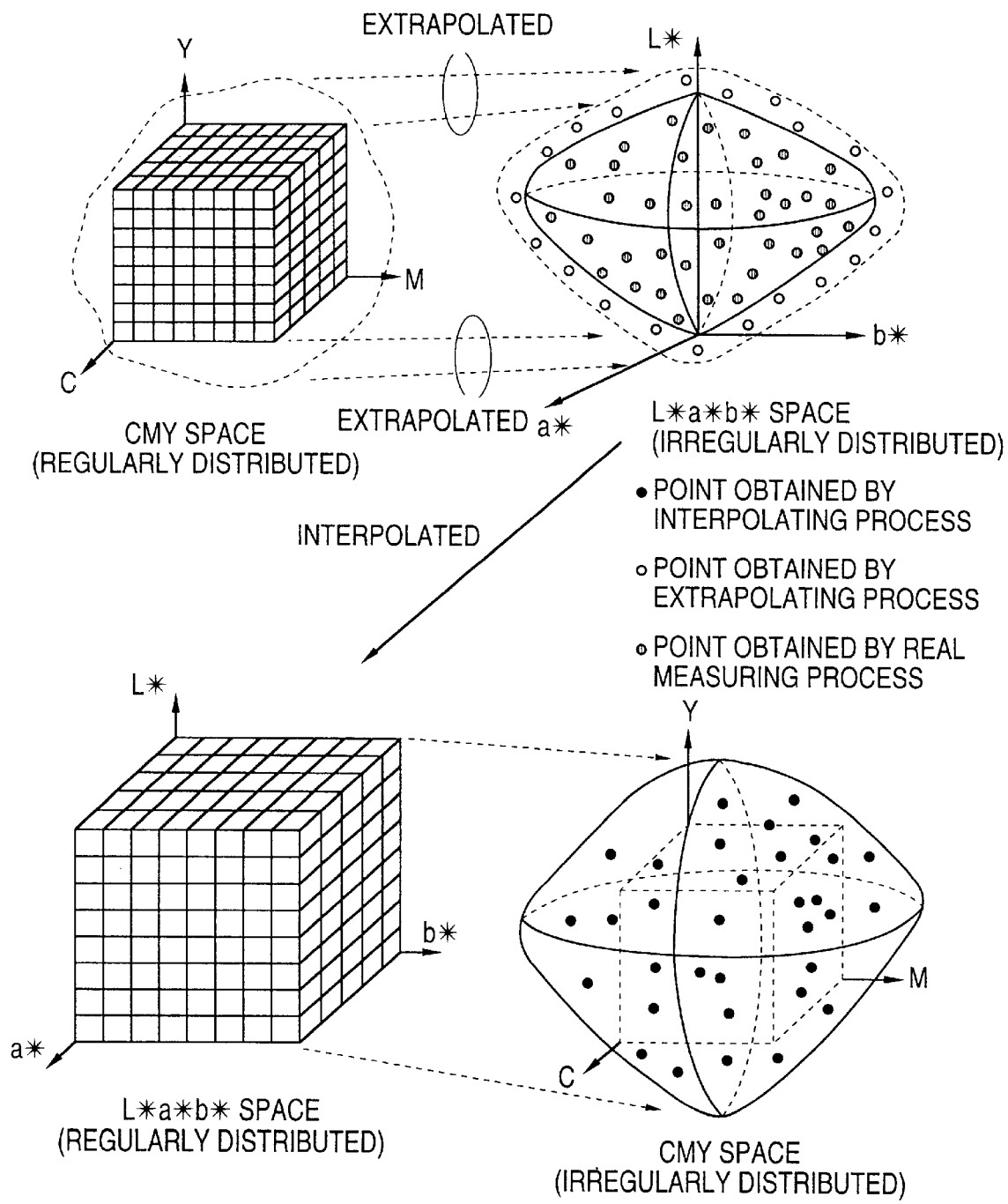
FIG. 18 is a schematic diagram showing a method for generating a color signal in a color space according to a second embodiment of the present invention.

FIG. 18 is a schematic diagram showing a process for generating a color signal in a color space according to the second embodiment. In the above-described first embodiment, the L*a*b* space in which colors are regularly distributed is treated as an object for the extrapolating process. However, in the second embodiment, a CMY space in which colors are regularly distributed is treated as an object for the extrapolating process.

In FIG. 18, colors regularly distributed as CMY values are printed by a printer. The colors printed by the printer are regularly distributed in the CMY space in a grid shape and present only in the color reproducible range.

The printed results from the printer is measured by a color measuring unit. Colors measured by the color measuring unit are distributed in the L*a*b* space. L*a*b* values corresponding to CMY values at grid points in the CMY space are irregularly distributed. In other words, the relationship between the CMY values regularly distributed in the CMY space and the L*a*b* values irregularly distributed in the L*a*b* space is obtained. The obtained relation is distributed only in the color reproducible range of the printer.

The relationship between the CMY values in the color reproducible range of the printer and L*a*b* values is then extrapolated. Thus, the relation between the CMY values out of the color reproducible range of the printer and L*a*b* values is generated.

A conversion is then performed in order to cause L*a*b* values irregularly distributed in the L*a*b* space to be regularly distributed in the L*a*b* space. In this case, L*a*b* values irregularly distributed in the L*a*b* space are interpolated and the relation between L*a*b* values at grid points in the L*a*b* space and CMY values is obtained. As an example of the interpolating process, a plurality of CMY values that have been designated are selected so that they surround a CMY value that has not been designated. L*a*b* values corresponding to the CMY values are weighted. Thereafter, L*a*b* values that are present at a grid point in the L*a*b* space are selected from those obtained by the interpolating process. CMY values corresponding to the L*a*b* values are registered to the color conversion table.

Thus, in the method for generating the color conversion table according to the second embodiment, after the relationship of color signals out of the color reproducible range of the device is obtained by the extrapolating process with measured values, the interpolating process is performed so that color signals in the L*a*b* space are distributed at grid points. Thus, errors can be prevented from being accumulated in the extrapolating process. Consequently, a color conversion table for effectively converting a color out of the color reproducible range of the device can be effectively generated.

A method for extrapolating a CMY value in the color reproducible range of the printer out of the color reproducible range of the printer will be described.

In this extrapolating process, the following processes are performed:

(1) The outermost grid point is selected from grid points as an object to be extrapolated;

(2) The direction of the extrapolating process is determined;

(3) An inner grid point used in the extrapolating process is selected;

(4) The distance for the extrapolating process is calculated; and (5) The extrapolation calculating process is performed.

For simplicity, it is assumed that a total of 125 colors made of five C values, five Y values, and five M values have been printed and measured.

$$\text{C value} = (\text{int})((\text{Cnum}-1)\cdot 255+2)/4 \quad (40)$$

$$\text{M value} = (\text{int})((\text{Mnum}-1)\cdot 255+2)/4 \quad (41)$$

$$\text{Y value} = (\text{int})((\text{Ynum}-1)\cdot 255+2)/4 \quad (42)$$

where each of Cnum, Mnum, and Ynum ranges from 1 to 5 (integers); (int) represents that the value after the decimal point is rounded off.

From Formulas (40) to (42), a CMY value can be labeled with a CMY number (Cnum, Mnum, Ynum). In addition, an L*a*b* value as a measured value can be labeled with an L*a*b* number (Lnum, anum, bnum). The relation obtained by the color measurement is 5×5×5 data. However, when data out of the color range is generated around the color range obtained by the color measurement, 7×7×7 data can be generated. In this case, as the format of an L*a*b* value, a three-dimensional array (L[7][7][7], a[7][7][7], b[7][7][7]) with an argument of a CMY number (Cnum, Mnum, Ynum) is used. Data obtained by the color measurement is stored in the array with the argument ranging from 1 to 5. Data generated by the extrapolating process is stored in the array with the argument whose values are 0 and 6.

(1) In the process for selecting the outermost grid point as an object to be extrapolated, the outermost grid point is selected from data in an array of 5×5×5 (in a grid shape) in the CMY space.

In reality, as will be described later, there are three types of selecting methods that are planes, edge lines, and vertexes of a cube. There are points that are redundantly selected with respect to the planes and edge lines. In the following description, * represents any value ranging from 1 to 5.

(i) With respect of the planes of a cube, all outer grid points are selected. The selected grid points are represented with array arguments as follows.

(1, *, *), (5, *, *), (*, 1, *),
(*, 5, *), (*, 1, *), (*, *, 5)

(ii) With respect to the edge lines of a cube, all grid points on the edge lines are selected. The selected grid points are represented with array arguments as follows.

(1, 1, *), (1, 5, *), (5, 1, *),
(5, 5, *), (*, 1, 1), (*, 1, 5),
(*, 5, 1), (*, 5, 5), (1, *, 1),
(1, *, 5), (5, *, 1), (5, *, 5), (iii) With respect to the vertexes of a cube, all grid points on the vertexes are selected. The selected grid points on the vertexes are represented with array arguments as follows.

(1, 1, 1), (1, 1, 5), (1, 5, 1), (5, 1, 1),
(5, 5,1), (5,1, 5), (1, 5, 5), (5, 5, 5)

(2) In the process for determining the direction of the extrapolating process, the direction of the extrapolating process for each of planes, edge lines, and vertexes of a cube is determined.

Figure 19:
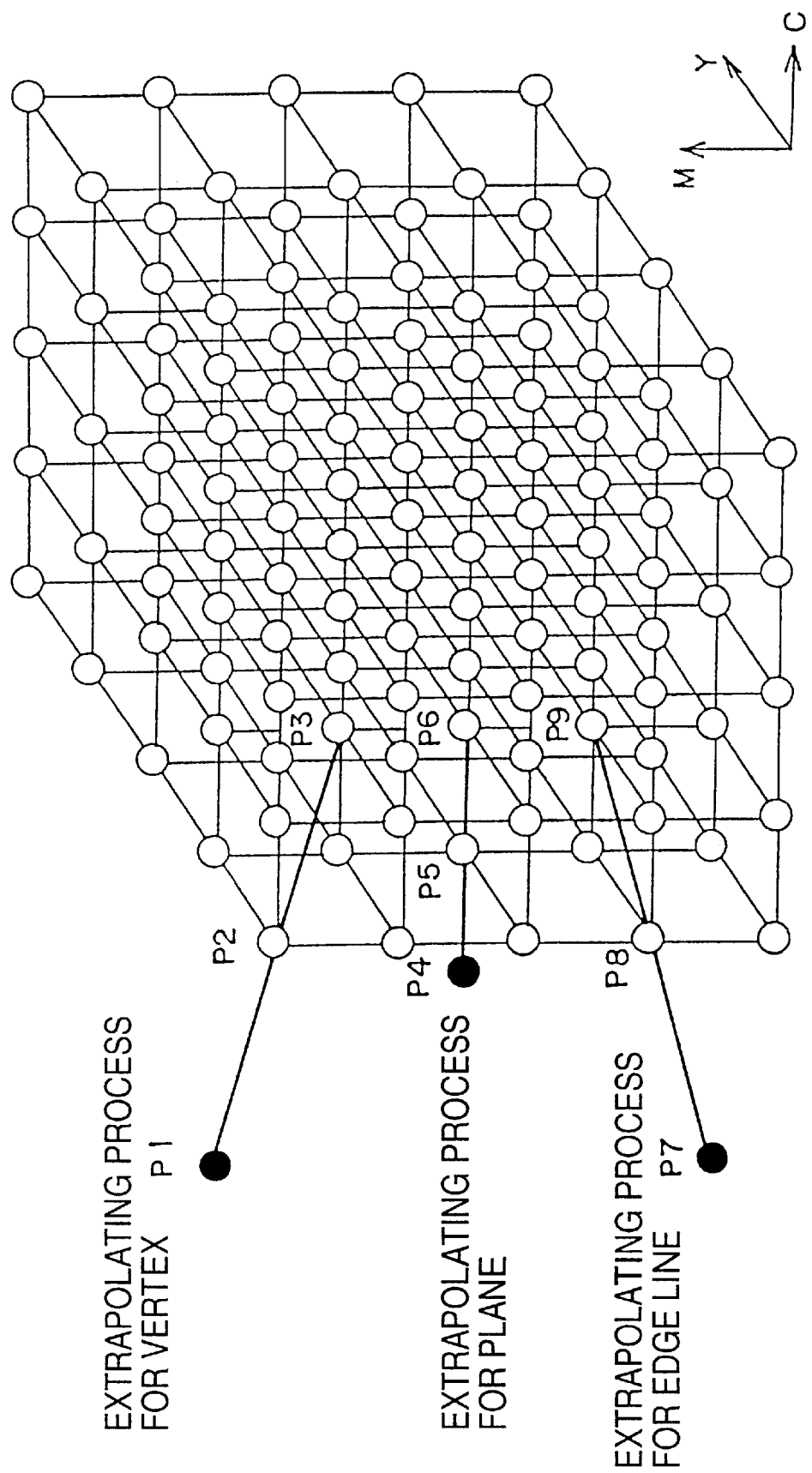
FIG. 19 is a schematic diagram showing a direction of the extrapolating process in the color signal generating method according to the second embodiment of the present invention.

FIG. 19 is a schematic diagram showing the direction of the extrapolating process.

As shown in FIG. 19, CMY values that have been color-measured are distributed at grid points of a 5×5×5 cube. There are three types of directions of the extrapolating process. The first type is the direction perpendicular to each plane of the cube, called a plane extrapolating process. The second type is the direction that is perpendicular to each edge line of the cube and has an equal angle with two planes using data of edge lines, called an edge line extrapolating process. The third type is the direction with an equal angle to three planes of the cube using data of vertexes, called a vertex extrapolating process.

When the extrapolating process is performed in each of these directions for 5×5×5 grid points, data distributed at the 5×5×5 grid points becomes data distributed at 7×7×7 grid points. (3) In the process for selecting an inner grid point for the extrapolating process, data is generated outside of the outer limit of the color reproducible range corresponding to the relation between data of the outer limit of the color reproducible range and data that is internally just adjacent thereto. For example, in FIG. 19, in the vertex extrapolating process, data at a point P1 outside a vertex P2 is generated with data at a vertex P2 of the cube and data at a point P3 inside thereof. In the plane extrapolating process, data at a point P4 outside a point P5 is generated with data at the point P5 on a plane of the cube and data at a point P6 inside thereof. In the edge line extrapolating process, data at a point P7 outside a point P8 is generated with data at the point P8 on an edge line of the cube and data at a point P9 inside thereof.

However, more inner data other than inner data by one position may be exceptionally used. Thus, when the tone or hue of a color is insufficient (namely, the difference of colors on a color sheet generated is small), such data is used so as to improve the accuracy.

In each direction of the extrapolating process shown in FIG. 19, an inner grid point by one position is selected. In this case, it is assumed that array arguments at the outermost grid point are denoted by (C0, M0, Y0) and the array arguments of a grid member inside thereof are denoted by (C1, M1, Y1).

When the following conditions are not satisfied for the selected inner grid point, a more inner grid point is selected. With such a selecting process, a grid point that satisfies the conditions is selected and thereby the array arguments (C1, M1, Y1) are updated.

It is assumed that the limit of the selecting range of inner grid points is the half of the number of colors of each of CMY colors (numerals to the right of the decimal point are rounded off). For example, since the number of colors composed of 5×5×5 grid points is 5, up to two inner grid points are selected. When there is no grid point that satisfies the conditions, the innermost grid point in the limit of the selecting range is selected.

Figure 20:
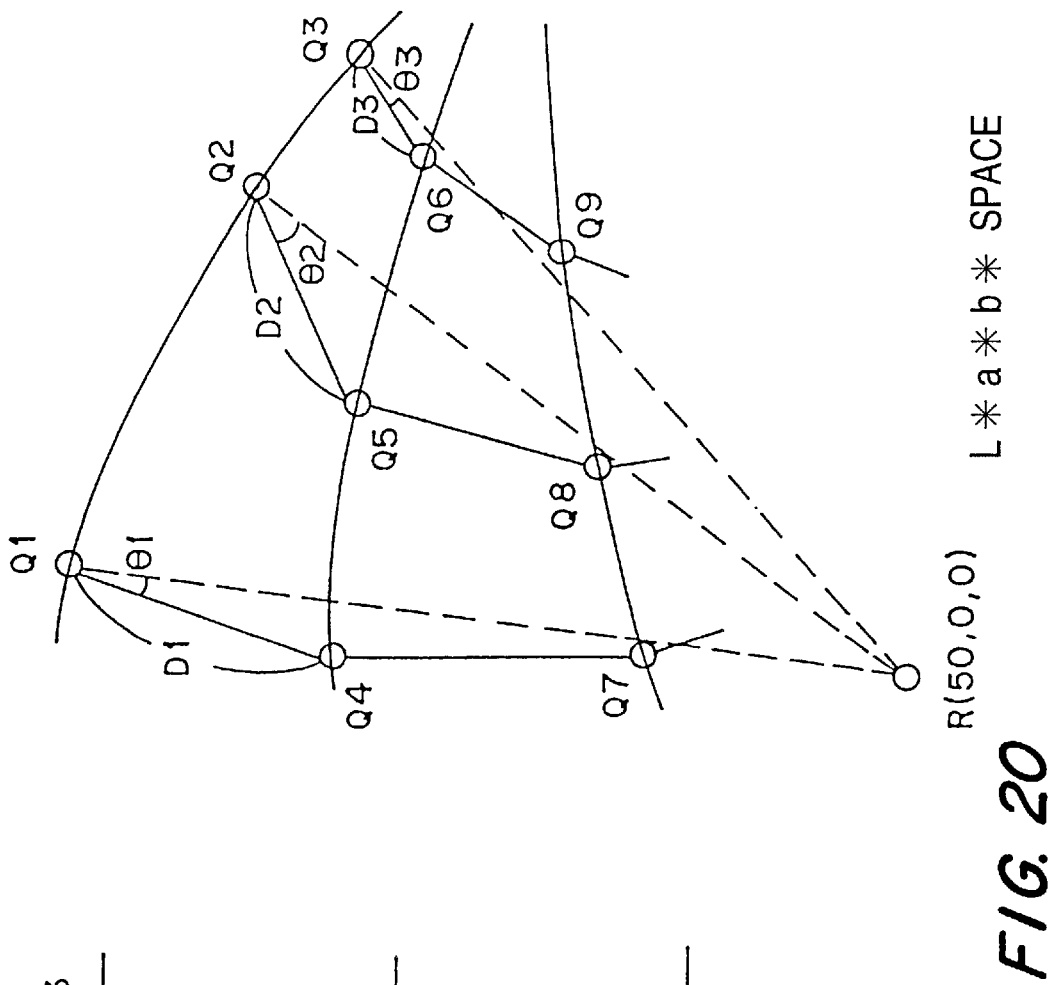
FIG. 20 is a schematic diagram showing a method for calculating adjacent points used in the color signal generating method according to the second embodiment of the present invention.
Figure 20:
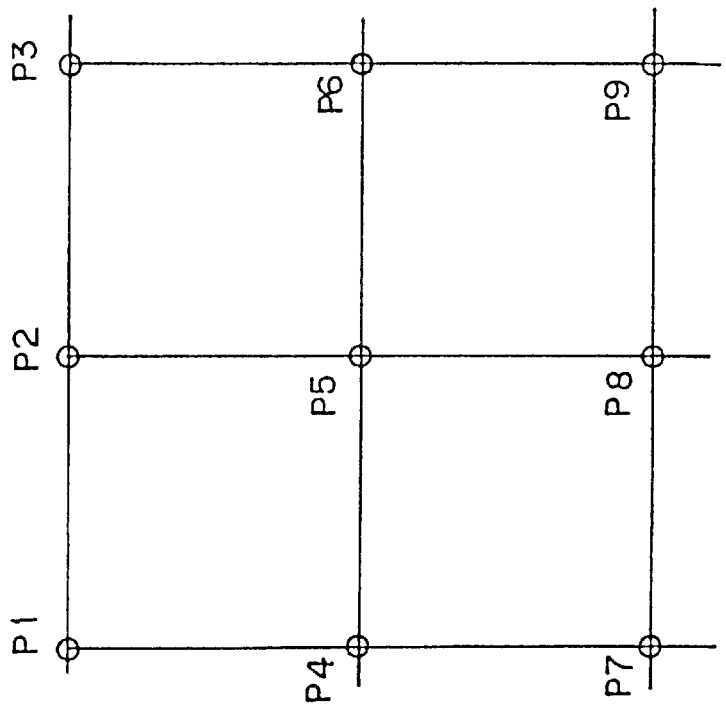

FIG. 20 is a schematic diagram for explaining a method for selecting an inner grid point.

As shown in FIG. 20, it is assumed that grid points P1 to P9 in the CMY space correspond to points Q1 to Q9 in the L*a*b* space and that the grid points P1 to P3 are at the boundary of the color reproducible range. In this case, the grid point P4 is selected as an inner point of the grid point P1. A distance D1 between the points Q1 and Q4 in the L*a*b* space corresponding to the grid points P1 and P4 and an angle θ1 between the straight line that connects the points Q1 and Q4 and the straight line that connects the points Q1 and R (50, 0, 0) are obtained. When the distance D1 between the points Q1 and Q4 is equal to or larger than a threshold value TH1 and the angle θ1 between the straight line that connects the points Q1 and Q4 and the straight line that connects the points Q1 and R (50, 0, 0) is equal to or less than a threshold value TH2, an extrapolating process is performed with the points Q1 and Q4.

In addition, as an inner point of the grid point P2, the grid point P5 is selected. A distance D2 between the points Q2 and Q5 in the L*a*b* space corresponding to the grid points P2 and P5 and an angle θ2 between the straight line that connects the points Q2 and Q5 and the straight line that connects the points Q2 and R (50, 0, 0) are obtained. When the angle θ2 between the straight line that connects the points Q2 and Q5 and the straight line that connects the points Q2 and R (50, 0, 0) is larger than the threshold value TH2, as an inner point of the grid point P2, the grid point P8 inside the grid point P5 is selected.

Next, the distance between the points Q2 and Q8 in the L*a*b* space corresponding to the grid points P2 and P8 and the angle between the straight line that connects the points Q2 and Q8 and the straight line that connects the points Q2 and R (50, 0, 0) are obtained. When the distance between the points Q2 and Q8 is equal to or larger than the threshold value TH1 and the angle between the straight line that connects the points Q2 and Q8 and the straight line that connects the points Q2 and R (50, 0, 0) is equal to or less than the threshold value TH2, the extrapolation process is performed with the points Q2 and Q8.

In addition, as an inner point of the grid point P3, the grid point P6 is selected. A distance D3 between the points Q3 and Q6 in the L*a*b* space corresponding to the grid points P3 and P6 and an angle θ3 between the straight line that connects the points Q3 and Q6 and the straight line that connects the points Q3 and R (50, 0, 0) are obtained. When the distance D3 between the points Q3 and Q6 is smaller than the threshold value TH1, as an inner point of the grid point P3, the grid point P9 inside the grid point P6 is selected. In addition, the distance between the points Q3 and Q9 in the L*a*b* space corresponding to the grid points P3 and P9 and the angle between the straight line that connects the points Q3 and Q9 and the straight line that connects the points Q3 and R (50, 0, 0) are obtained. As the result, when the distance between the points Q3 and Q9 is equal to or larger than the threshold value TH1 and the angle between the straight line that connects the points Q3 and Q9 and the straight line that connects the points Q3 and R (50, 0, 0) is equal to or less than the threshold value TH2, the extrapolation process is performed with the points Q3 and Q9.

The point R (50, 0, 0) in the L*a*b* space is a point that is an achromatic and a gray color point. The reason the angle between the direction of the selected point and the direction of the point R (50, 0, 0) is obtained is that a point that orients inwardly tends to be a point that is an achromatic and gray color point. Thus, when the direction to the selected point deviates from the direction to the point R (50, 0, 0), it is supposed there is a large error.

The reason the extrapolating process is not performed with two points whose distance is small is that when the extrapolating process is performed with two points close together, the distance for the extrapolating process should be increased. Thus, the error becomes large.

A method for selecting an inner grid point will now be described using mathematical expressions.

In the L*a*b* space, dist, dist', and angle are calculated. [D]ist and dist' are distances of L*a*b* values comprising two pieces of data.[A]ngle is an inner product of a vector that connects a point (L0, a0, b0) and a point (50, 0, 0) and a vector that connects a point (L0, a0, b0) and a point (L1, a1, b1). The value is reversely proportional to the angle between the two vectors. In this case, (L0, a0, b0) and (L1, a1, b1) are expressed as follows.

$$L0=L[C0][M0][Y0] \quad (43)$$

$$a0=a[C0][M0][Y0] \quad (44)$$

$$b0=b[C0][M0][Y0] \quad (45)$$

$$L1=L[C1][M1][Y1] \quad (46)$$

$$a1=a[C1][M1][Y1] \quad (47)$$

$$b1=b[C1][M1][Y1] \quad (48)$$

In addition, dist, dist1, and angle are expressed as follows.

$$dist=sqrt((L0-L1)^2+(a0-a1)^2+(b0-b1)^2) \quad (49)$$

$$dist'=sqrt((L0-50)^2+(a0)^2+(b0)^2) \quad (50)$$

if (dist==0.0 or dist'==0.0)

$$angle=0.0 \quad (51)$$

else $$angle=((L0-L1)\cdot(L0-50)+(a0-a1)\cdot a0+(b0-b1)\cdot b0)/(dist\cdot dist1) \quad (52)$$

Next, it is determined whether or not the following conditions are satisfied.

$$\text{dist} > TH1 \text{ and angle} > TH2 \qquad (53)$$

Thus,

1. A CMY number (C1, M1, Y1) at an inner grid point can be obtained.
2. L*a*b* values corresponding to two grid points in the CMY space can be obtained.
3. A value w2 that represents the inner position of the CMY number (C1, M1, Y1) to the CMY number (C0, M0, Y0) is obtained (basically, w2 is 1).
4. The distance dist between two points in the L*a*b* space can be obtained.

(4) In the process for calculating the distance for the extrapolating process, an extrapolating point is determined by a multiple of the distance dist between two points in the L*a*b* space. When the extrapolating process is performed with the distance dist between two points, if the distance dist is small, since extrapolating points concentrate to the boundary of the color reproducible range of the L*a*b* space, data that perfectly surrounds the color reproducible range may not be registered to the color conversion table.

Figure 21:
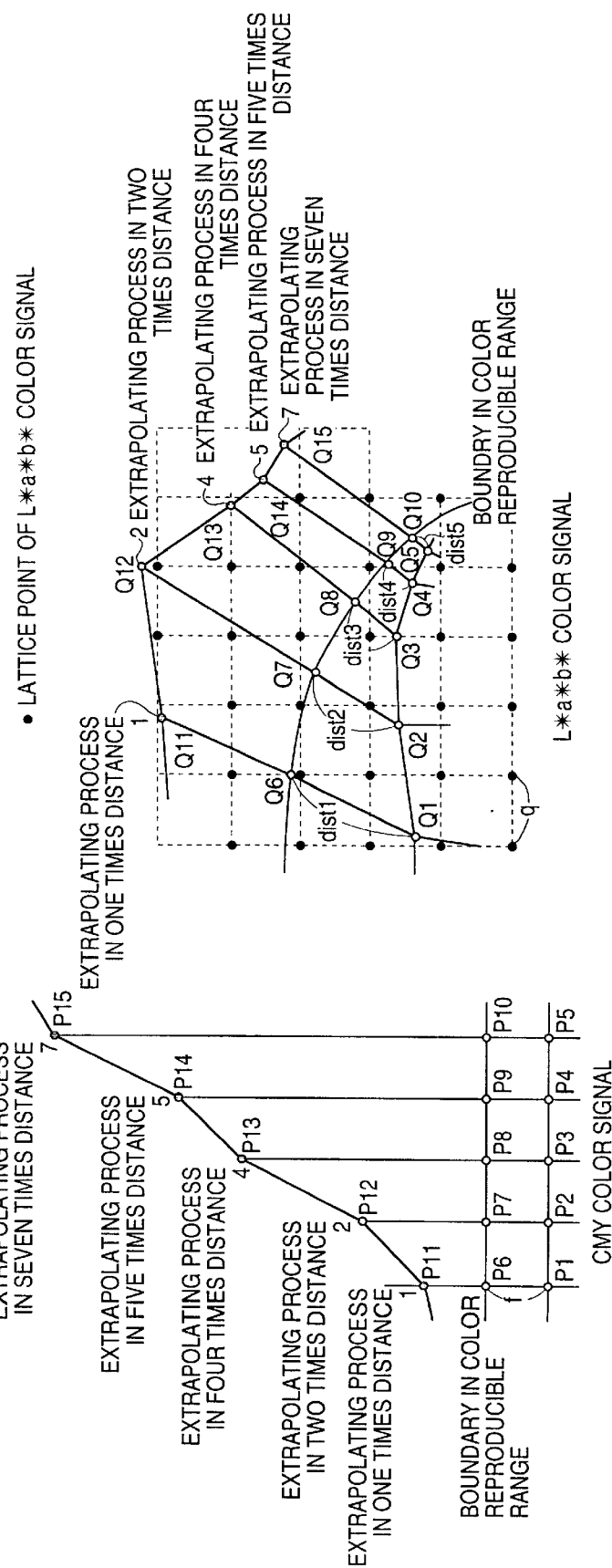
FIG. 21 is a schematic diagram showing a method for calculating a distance for the extrapolating process in the color signal generating method according to the embodiment of the present invention.

FIG. 21 is a schematic diagram for explaining a method for calculating a multiple of the distance dist between two points to be extrapolated.

As shown in FIG. 21, it is assumed that grid points P1 to P10 in a CMY space correspond to points Q1 to Q10 in an L*a*b* space and that the grid points P6 to P10 in the CMY space are present at the boundary of the color reproducible range. In addition, the grid point P1 is selected as an inner grid point of the grid point P6. The grid point P2 is selected as an inner grid point of the grid point P7. The grid point P3 is selected as an inner grid point of the grid point P8. The grid point P4 is selected as an inner grid point of the grid point P9. The grid point P5 is selected as an inner grid point of the grid point P10. By applying Formula (49) distances can be obtained as follows: a distance dist1 between the points Q1 and Q6 in the L*a*b* space corresponding to the grid points P1 and P6; a distance dist2 between the points Q2 and Q7 in the L*a*b* space corresponding to the grid points P2 and P7; a distance dist3 between the points Q3 and Q8 in the L*a*b* space corresponding to the grid points P3 and P8; a distance dist4 between the points Q4 and Q9 in the L*a*b* space corresponding to the grid points P4 and P9; and a distance dist5 between the points Q5 and Q10 in the L* a*b* space corresponding to the grid points P5 and P10.

Each extrapolation distance is basically the same as the distance dist. However, when the distance dist is small, a multiple of dist is extrapolated. In other words, a multiple w1 of the distance dist to be extrapolated is expressed as follows.

$$w1 = (\text{int})(g \cdot gex/dist) + 1 \qquad (54)$$

where g is an interval of grid points; and gex is a predetermined constant.

Assuming that the distance dist1 between the points Q1 and Q2 is almost equal to the value of g·gex, the multiple w1 is 1. Thus, the point Q11 outwardly separate from the point Q6 by the dist1 is designated as an extrapolating point.

Assuming that the distance dist2 between the points Q2 and Q7 is almost equal to the value of ½ of g·gex, the multiple w1 is 2. Thus, the point Q12 outwardly apart from the point Q7 by double the distance from the point Q7 to the dist2 is designated as an extrapolation point.

Assuming that the distance dist3 between the points Q3 and Q8 is almost equal to the value of ¼ of g·gex, the multiple w1 is 4. Thus, the point Q13 outwardly apart from the point Q8 by four-times the distance from the point Q8 to the dist3 is designated as an extrapolation point.

Assuming that the distance dist4 between the points Q4 and Q9 is almost equal to the value of ⅕ of g·gex, the multiple w1 is 5. Thus, the point Q14 outwardly apart from the point Q9 by five-times the distance from the point Q9 to the dist4 is designated as an extrapolating point.

Assuming that the distance dist5 between the points Q5 and Q10 is almost equal to the value of ⅐ of g·gex, the multiple w1 is 7. Thus, the point Q15 outwardly apart from the point Q10 by seven-times the distance from the point Q10 to the dist5 is designated as an extrapolation point.

A point in the CMY space corresponding to the point Q11 in the L*a*b* space is correlated with the grid point P11 outwardly separate from the grid interval f in the CMY space because the point Q11 is present outside the point in the L*a*b* space by the distance dist1.

A point in the CMY space corresponding to the point Q12 in the L*a*b* space is correlated with the grid point P12 outwardly separate from two times the grid interval f in the CMY space because the point Q12 is present outside the point in the L*a*b* space by two times the distance dist2.

A point in the CMY space corresponding to the point Q13 in the L*a*b* space is correlated with the grid point P13 outwardly separate from four times the grid interval f in the CMY space because the point Q13 is present outside the point in the L*a*b* space by four times the distance dist3.

A point in the CMY space corresponding to the point Q14 in the L*a*b* space is correlated with the grid point P14 outwardly separate from five times the grid interval f in the CMY space because the point Q14 is present outside the point in the L*a*b* space by five times the distance dist4.

A point in the CMY space corresponding to the point Q15 in the L*a*b* space is correlated with the grid point P15 outwardly separate from seven times the grid interval f in the CMY space because the point Q15 is present outside the point in the L*a*b* space by seven times the distance dist5.

(5) In the extrapolating calculations, with a grid point at the boundary of the color reproducible range of the CMY space and a grid point inside thereof, an L*a*b* value corresponding to a point outwardly apart from w1 times the distance dist between two points in the L*a*b* space.

In order to simplify matters, it is assumed that a CMY number represents the position of a grid point outwardly separate from a grid point denoted by a CMY number (C0, M0, Y0) by one position is denoted by (C2, M2, Y2) and that a CMY number that represents the position of a grid point outwardly apart by w2 from a grid point denoted by the CMY number (C0, M0, Y0) is denoted by (C3, M3, Y3). For example, in the case where the CMY number (C0, M0, Y0) is (1, 3, 3), the CMY number (C1, M1, Y1) is (3,3, 3) (w2 is 2), and that w1 is 3, the CMY number (C2, M2, Y2) is (0, 3, 3) and the CMY number (C3, M3, Y3) is (−2, 3, 3).

In this case, the CMY number (C2, M2, Y2) and the CMY number (C3, M3, Y3) are expressed as follows.

$$C2 = C0 - (C1 - C0)/w2 \qquad (55)$$

$$M2 = M0 - (M1 - M0)/w2 \qquad (56)$$

$$Y2 = Y0 - (Y1 - Y0)/w2 \qquad (57)$$

$$C3 = C0 - (C2 - C0)/w1 \qquad (58)$$

$$M3 = M0 - (M2 - M0)/w1 \qquad (59)$$

$$Y3 = Y0 - (Y2 - Y0)/w1 \qquad (60)$$

In addition, assuming that $$L0 = L[C0][M0][Y0] \qquad (61)$$

$$a0 = a[C0][M0][Y0] \qquad (62)$$

$$b0 = b[C0][M0][Y0] \qquad (63)$$

$$L1=L[C1][M1][Y1] \tag{64}$$

$$a1=a[C1][M1][Y1] \tag{65}$$

$$b1=b[C1][M1][Y1] \tag{66}$$

Also, an L*a*b* value corresponding to the CMY number (C2, M2, Y2) is expressed as follows.

$$L[C2][M2][Y2]=L0-w1\cdot(L1-L0) \tag{67}$$

$$a[C2][M2][Y2]=a0-w1\cdot(a1-a0) \tag{68}$$

$$b[C2][M2][Y2]=b0-w1\cdot(b1-b0) \tag{69}$$

The position of a grid point outwardly apart by w2 is expressed as follows.

$$C3[C2][M2][Y2]=C3 \tag{70}$$

$$M3[C2][M2][Y2]=M3 \tag{71}$$

$$Y3[C2][M2][Y2]=Y3 \tag{72}$$

Thus, data outside the color range by the extrapolating process is generated. However, since L*a*b* values in the L*a*b* space are irregularly distributed, they are converted so that they are distributed in a grid shape by an interpolating process. This process is basically the same as the process shown in FIG. 9. L*a*b* values are interpolated corresponding to the relation between CMY numbers distributed in a grid shape and L*a*b* values irregularly distributed. Thus, the relationship between CMY values and L*a*b* values is improved. For example, a unit cube generated with eight grid points in the CMY space is divided into 64×64×64 portions. The L*a*b* values corresponding to CMY values at the divided points are obtained by weighing calculations of L*a*b* values corresponding to eight grid points that surround the dividing points.

A grid point having an L*a*b* value close to the L*a*b value obtained by the weighing calculations is next detected from the L*a*b* space. An L*a*b* number corresponding to the detected grid point is calculated.

Thereafter, the square of the distance between the L*a*b* value obtained by the weighing calculations and the L*a*b* value at a grid point in the vicinity thereof is calculated.

Next, for all the divided points of the unit cube, the obtained squares are compared and thereby a divided point that has an L*a*b* value that is the closest to an L*a*b* value at a grid point is detected. The CMY value at the divided point is registered as a value corresponding to the L*a*b* value at the grid point.

Using mathematical expressions, the process will be more specifically described.

Since data to be generated is a CMY value corresponding to an L*a*b* number (Lnum, anum, bnum) at a grid point in the L*a*b* space, the format of the data to be generated is the following three-dimensional array.

C[Lnum][anum][bnum],

M[Lnum][anum][bnum],

Y[Lnum][anum][bnum].

Assuming that 5×5×5 grid points in the CMY space are extrapolated to 7×7×7 grid points, grid points of CMY numbers (Cnum, Mnum, Ynum) of all combinations of $0 \leq Cnum \leq 6, 0 \leq Mnum \leq 6$, and $\leq 0\, Ynum \leq 6$ (where Cnum, Mnum, and Ynum are any integers within the respective ranges) are successively selected.

Next, colors (Lnew, anew, bnew) are generated by the interpolating process in the ranges of $0 \leq Cw \leq W$, $0 \leq Mw < W$, and $0 \leq Yw \leq W$ (where Cw, Mw, and Yw are any integers within their respective ranges).

$$\begin{aligned}Lnew=&(L[Cnum][Mnum][Ynum]\cdot V(0,0,0)+L[Cnum+1][Mnum]\\&[Ynum]\cdot V(1,0,0)+\end{aligned}$$

$$L[Cnum][Mnum+1][Ynum]\cdot V(0,1,0)+L[Cnum][Mnum][Ynum+1]\\\cdot V(0,0,1)+$$

$$L[Cnum][Mnum+1][Ynum+1]\cdot V(0,1,1)+L[Cnum+1][Mnum]\\[Ynum+1]\cdot V(1,0,1)+$$

$$L[Cnum+1][Mnum+1][Ynum]\cdot V(1,1,0)+L[Cnum+1][Mnum+1]\\[Ynum+1]\cdot V(1,1,1))/(W\cdot W\cdot W) \tag{73}$$

$$anew=(a[Cnum][Mnum][Ynum]\cdot V(0,0,0)+a[Cnum+1][Mnum]\\[Ynum]\cdot V(1,0,0)+a[Cnum][Mnum+1][Ynum]\cdot V(0,1,0)+$$

$$a[Cnum][Mnum][Ynum+1]\cdot V(0,0,1)+a[Cnum][Mnum+1][Ynum+\\1]\cdot V(0,1,1)+a[Cnum+1][Mnum][Ynum+1]\cdot V(1,0,1)+$$

$$a[Cnum+1][Mnum+1][Ynum]\cdot V(1,1,0)+a[Cnum+1][Mnum+1]\\[Ynum+1]\cdot V(1,1,1))/(W\cdot W\cdot W) \tag{74}$$

$$bnew=(b[Cnum][Mnum][Ynum]\cdot V(0,0,0)+b[Cnum+1][Mnum]\\[Ynum]\cdot V(1,0,0)+b[Cnum][Mnum+1][Ynum]\cdot V(0,1,0)+$$

$$b[Cnum][Mnum][Ynum+1]\cdot V(0,0,1)+b[Cnum][Mnum+1][Ynum+\\1]\cdot V(0,1,1)+b[Cnum+1][Mnum][Ynum+1]\cdot V(1,0,1)+$$

$$b[Cnum+1][Mnum+1][Ynum]\cdot V(1,1,0)+b[Cnum+1][Mnum+1]\\[Ynum+1]\cdot V(1,1,1))/(W\cdot W\cdot W) \tag{75}$$

where $$V(0,0,0)=(W-Cw)\cdot(W-Mw)\cdot(W-Yw) \tag{76}$$

$$V(1,0,0)=Cw\cdot(W-Mw)\cdot(W-Yw) \tag{77}$$

$$V(0,1,0)=(W-Cw)\cdot Mw\cdot(W-Yw) \tag{78}$$

$$V(0,0,1)=(W-Cw)\cdot(W-Mw)\cdot Yw \tag{79}$$

$$V(0,1,1)=(W-Cw)\cdot Mw\cdot Yw \tag{80}$$

$$V(1,0,1)=Cw\cdot(W-Mw)\cdot Yw \tag{81}$$

$$V(1,1,0)=Cw\cdot Mw\cdot(W-Yw) \tag{82}$$

$$V(1,1,1)=Cw\cdot Mw\cdot Yw \tag{83}$$

Where W is a predetermined value (in this example, W=64); and V(0, 0, 0), V(1, 0, 0), V(0, 1, 0), V(0, 0, 1), V(0, 1, 1), V(1, 0, 1), V(1, 1, 0), and V(1, 1, 1) represent volumes of eight rectangular parallelepipeds of which a cube whose side has a length of W is divided by planes that traverse a point (Cw, Mw, and Yw) and are perpendicular to individual axes of CMY. Formulas (73) to (75) are equivalent to values of which weighing coefficients of Formulas (76) to (83) are multiplied by L*a*b* values corresponding to eight vertexes of the unit cube in the CMY space, respectively.

Next, a grid number in the vicinity of an interpolated color (Lnew, anew, bnew) is selected with the following expressions.

In the following expressions, G is a grid interval in the L*a*b* space.

$$anew+=128$$

$$bnew+=128$$

$$Lnum=(Lnew/G>0.0?(int)(Lnew/G+0.5):(int)(Lnew/G-0.5)), \tag{85}$$

$$anum=(anew/G>0.0?(int)(anew/G+0.5):(int)(anew/G-0.5)), \tag{86}$$

$$bnum=(bnew/G>0.0?(int)(bnew/G+0.5):(int)(bnew/G-0.5)), \tag{87}$$

When Lnum, anum, and bnum satisfy all the following conditions, the distance with the grid point is calculated.

$$0 \leq \text{Lnum} \leq (\text{int})(100/G)+2 \quad (88)$$

$$0 \leq \text{anum} \leq (\text{int})(256/G)+1 \quad (89)$$

$$0 \leq \text{bnum} \leq (\text{int})(256/G)+1 \quad (90)$$

Next, the square of the distance between the interpolated color (Lnew, anew, bnew) and the selected grid point is calculated by the following expression.

$$\text{diff}=(\text{Lnum}-\text{Lnew}/G)^2+(\text{anum}-\text{anew}/G)^2+(\text{bnum}-\text{bnew}/G)^2 \quad (91)$$

Only when diff satisfies the following condition, data corresponding to the distance is designated.

$$\text{diff} \leq D \quad (92)$$

where D is a predetermined value.

When data has not been designated at a grid point (Lnum, anum, bnum) or when diff is smaller than diff [Lnum] [anum] [bnum] already designated at the grid point (Lnum, anum, bnum), a CMY value corresponding to the grid point (Lnum, anum, bnum) is calculated and data is designated thereto.

When Cnum, Mnum, and Ynum are neither 0 nor 6 (in the color range), since a cube is formed of eight vertexes that surrounds a divided point in the CMY space, a CMY value can be obtained by the following expressions.

$$C[\text{Lnum}][\text{anum}][\text{bnum}]=(\text{Cnum}-1)\cdot G+Cw\cdot G/W \quad (93)$$

$$M[\text{Lnum}][\text{anum}][\text{bnum}]=(\text{Mnum}-1)\cdot G+Mw\cdot G/W \quad (94)$$

$$Y[\text{Lnum}][\text{anum}][\text{bnum}]=(\text{Ynum}-1)\cdot G+Yw\cdot G/W \quad (95)$$

In addition, diff is designated as follows.

$$\text{diff}[\text{Lnum}][\text{anum}][\text{bnum}]=\text{diff}$$

However, when at least one of C, M, and Y is 0 or 6 (out of the color range), since a cube may not be formed of eight vertexes that surround a divided point in the CMY space, CMY values are obtained by an interpolating process.

In other words, CMY grid numbers of eight colors used in the interpolation process are calculated by the following expressions.

$$Cn[0]=\text{Cnum} \quad (96)$$

$$Mn[0]=\text{Mnum} \quad (97)$$

$$Yn[0]=\text{Ynum} \quad (98)$$

$$Cn[1]=Cn[0]+1 \quad (99)$$

$$Mn[1]=Mn[0] \quad (100)$$

$$Yn[1]=Yn[0] \quad (101)$$

$$Cn[2]=Cn[0] \quad (102)$$

$$Mn[2]=Mn[0]+1 \quad (103)$$

$$Yn[2]=Yn[0] \quad (104)$$

$$Cn[3]=Cn[0] \quad (105)$$

$$Mn[3]=Mn[0] \quad (106)$$

$$Yn[3]=Yn[0]+1 \quad (107)$$

$$Cn[4]=Cn[0] \quad (108)$$

$$Mn[4]=Mn[0]+1 \quad (109)$$

$$Yn[4]=Yn[0]+1 \quad (110)$$

$$Cn[5]=Cn[0]+1 \quad (111)$$

$$Mn[5]=Mn[0] \quad (112)$$

$$Yn[5]=Yn[0]+1 \quad (113)$$

$$Cn[6]=Cn[0]+1 \quad (114)$$

$$Mn[6]=Mn[0]+1 \quad (115)$$

$$Yn[6]=Yn[0] \quad (116)$$

$$Cn[7]=Cn[0]+1 \quad (117)$$

$$Mn[7]=Mn[0]+1 \quad (118)$$

$$Yn[7]=Yn[0]+1$$

When a grid point (Cn [x], Mn [x], Yn [x]) obtained by Formulas (96) through (118) is a grid point generated by an extrapolating process, it is substituted with a grid point outwardly separate therefrom by w2. The following process is executed for x=0 to x=7.

if (Cn[x]=0, or Cn[x]=6, or Mn[x]=0, or Mn[x]=6, or Yn[x]=0, or Yn[x]=6)

$$Cn[x]=C3[Cn[x]] \quad (119)$$

$$Mn[x]=M3[Mn[x]] \quad (120)$$

$$Yn[x]=Y3[Yn[x]] \quad (121)$$

Next, with weighing coefficients of Formulas (76) to (83), as expressed by the following Formulas (122) through (124), a CMY value is generated by an interpolating process.

$$\begin{aligned}C[Lnum][anum][bnum] = &(Cn[0]\cdot V(0,0,0)+Cn[1]\cdot V(1,0,0)+ \\ &Cn[2]\cdot V(0,1,0)+Cn[3]\cdot V(0,0,1)+ \\ &Cn[4]\cdot V(0,1,1)+Cn[5]\cdot V(1,0,1)+ \\ &Cn[6]\cdot V(1,1,0)+Cn[7]\cdot V(1,1,1))/ \\ &(W\cdot W\cdot W)\end{aligned} \quad (122)$$

$$\begin{aligned}M[Lnum][anum][bnum] = &(Mn[0]\cdot V(0,0,0)+Mn[1]\cdot V(1,0,0)+ \\ &Mn[2]\cdot V(0,1,0)+Mn[3]\cdot V(0,0,1)+ \\ &Mn[4]\cdot V(0,1,1)+Mn[5]\cdot V(1,0,1)+ \\ &Mn[6]\cdot V(1,1,0)+Mn[7]\cdot V(1,1,1))/ \\ &(W\cdot W\cdot W)\end{aligned} \quad (123)$$

$$\begin{aligned}Y[Lnum][anum][bnum] = &(Yn[0]\cdot V(0,0,0)+Yn[1]\cdot V(1,0,0)+ \\ &Yn[2]\cdot V(0,1,0)+Yn[3]\cdot V(0,0,1)+ \\ &Yn[4]\cdot V(0,1,1)+Yn[5]\cdot V(1,0,1)+ \\ &Yn[6]\cdot V(1,1,0)+Yn[7]\cdot V(1,1,1))/ \\ &(W\cdot W\cdot W)\end{aligned} \quad (124)$$

With the above-described process, a color conversion table that has data out of the color range and in which L*a*b* values are distributed in a grid shape is generated. Since CMY values of data out of the color range have numeric values in the range from 0 to 255, even if a color signal is converted between the out-of-color range and the in-color-range, the color signal can be accurately converted up to the limit of the color range.

When data at a point that is far apart from the color range is generated, it should be extrapolated for a long distance. When the extrapolating distance is large, the error becomes large. Thus, data may not be generated at a point far apart from the color range so as to prevent an error of the data from becoming large. However, when the extrapolating process is performed for a long distance, data can be designated to all grid points.

Figure 22:
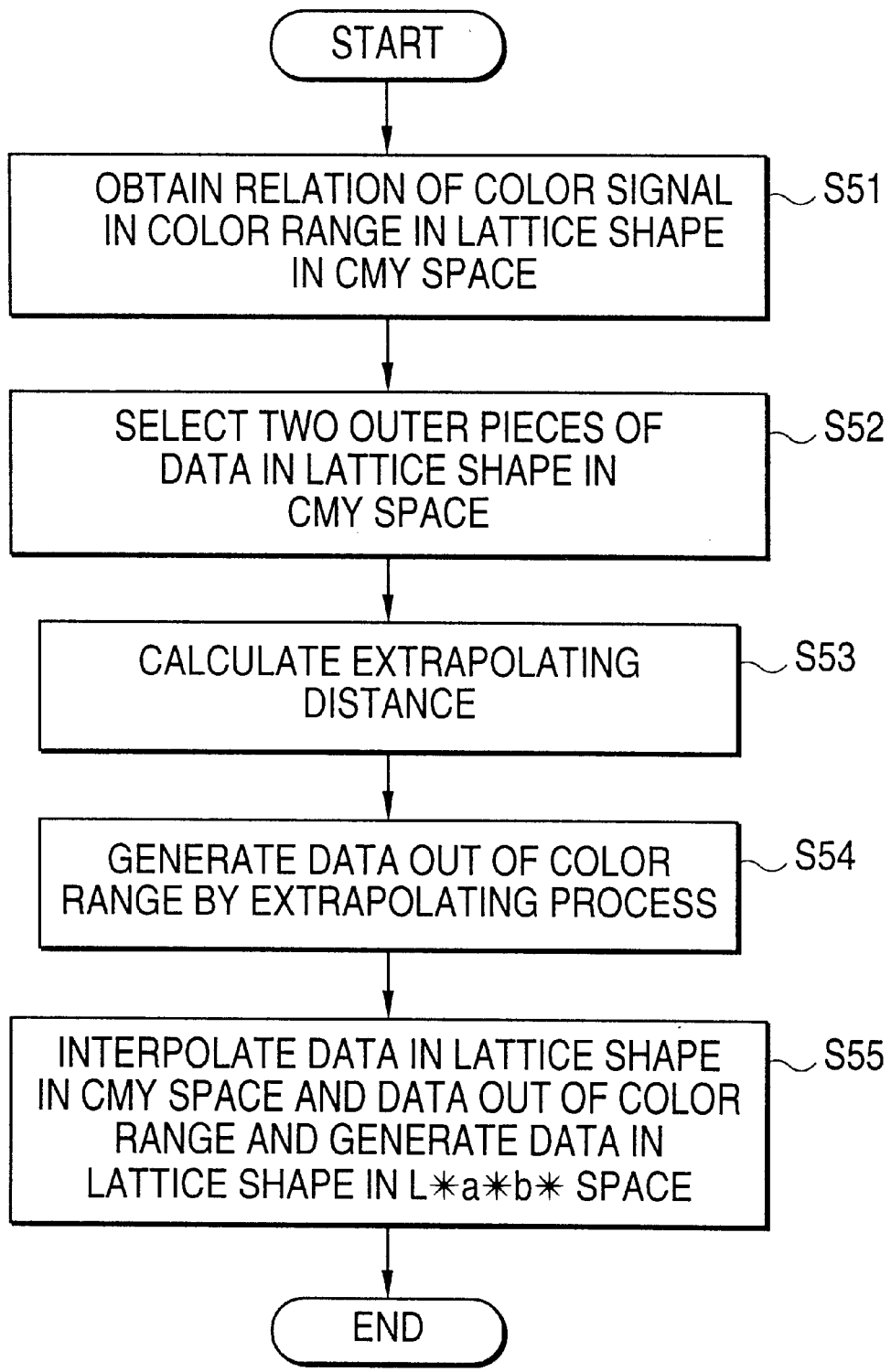
FIG. 22 is a flow chart showing the color signal generating method according to the second embodiment of the present invention.

FIG. 22 is a flow chart showing the process of a method for generating a color conversion table according to the second embodiment.

As shown in FIG. 22, the relationship between color signals in the color range distributed at grid points in the CMY space and color signals in the L*a*b* space is obtained at step S51 of FIG. 22. The outer two color signals are selected from those in the color range distributed at the grid points in the CMY space at step S52 of FIG. 22.

Corresponding to the two signals that have been selected, the extrapolating distance in the L*a*b* space is calculated at step S53 of FIG. 22. A color signal separated from the selected color signals by the distance calculated at step S53 is generated out of the color range at step S54 of FIG. 22. Next, a color signal in the color range distributed at grid points in the CMY space and a color signal out of the color range are interpolated. Thus, a color signal distributed at a grid point in the L*a*b* space is generated at step S55 of FIG.22.

Figure 23:
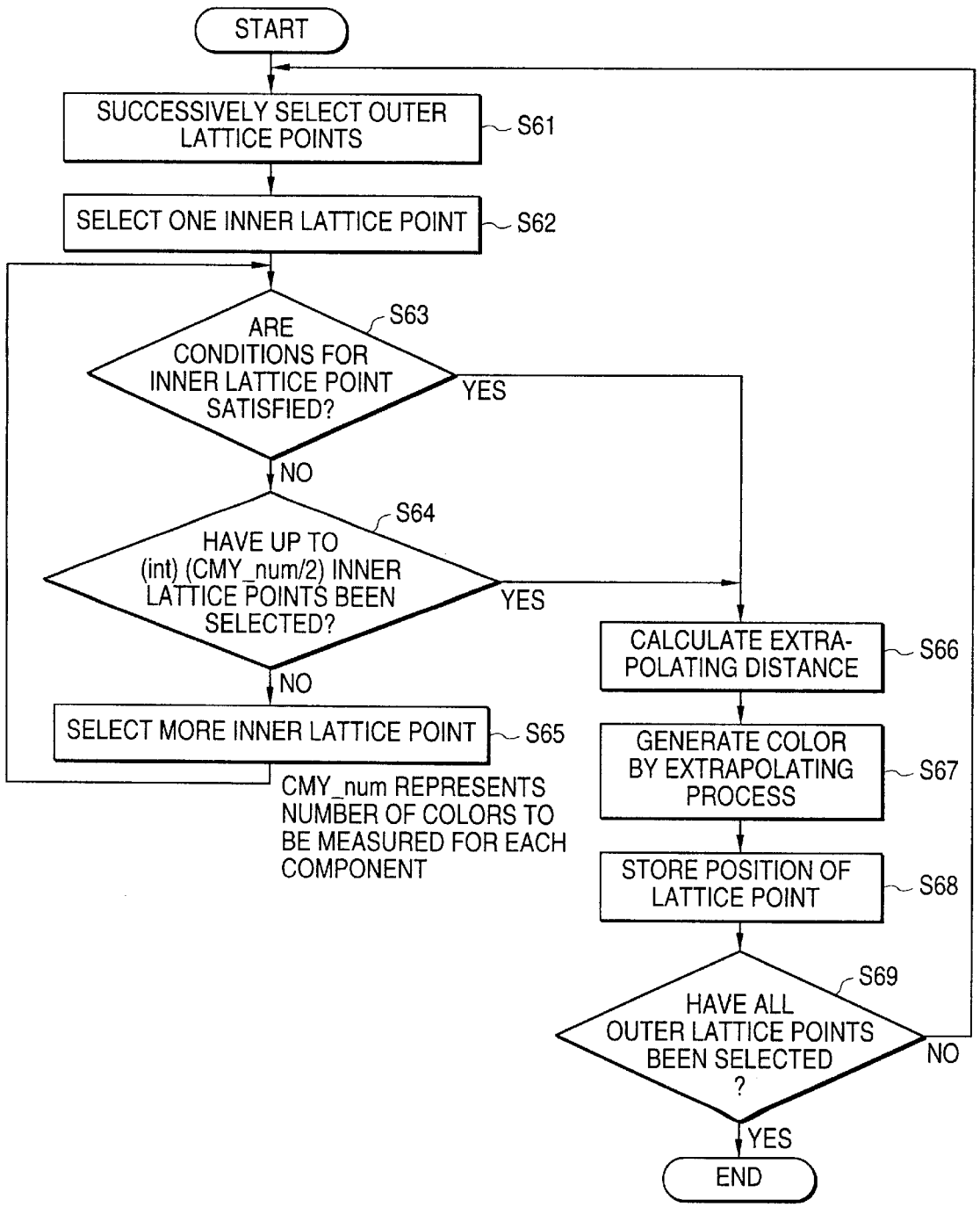
FIG. 23 is a flow chart showing a method for generating a color signal out of a color range according to the second embodiment of the present invention.

FIG. 23 is a flow chart showing a process for generating a color signal out of the color range.

As shown in FIG. 23, outer grid points are successively selected from those in the color range in the CMY space at step S61. One inner grid point from the selected outer grid points is selected at step S62 of FIG. 23.

A determination is then made whether the selected grid point satisfies the conditions of an inner grid point expressed by Formula (53) at step S63 of FIG. 23. When (int) (CMYnum/2) inner grid points have not been selected at step S64, a more inner and closer grid point is selected at step S65 of FIG. 23. In this case, CMYnum is the number of colors to be measured for each CMY component. In the example shown in FIG. 19, CMYnum is 5.

When the conditions of the inner grid point expressed by Formula (53) are satisfied, corresponding to a color signal at an outer grid point in the color range in the CMY space and the color signal at the selected inner grid point, the extrapolating distance in the L*a*b* space is calculated at step S66 of FIG. 23.

Using Formulas (67) to (69), a color signal separated from the color range by the distance calculated at step S66 is generated at step S67 of FIG. 23. With Formulas (70) to (72), the position of the grid point in the CMY space corresponding to the color signal generated in the L*a*b* space by the extrapolation process is stored.

The above-described process is performed for all outer grid points in the color range in the CMY space. When all the outer grid points have been selected, the process for generating a color signal out of the color range is completed.

Figure 24:
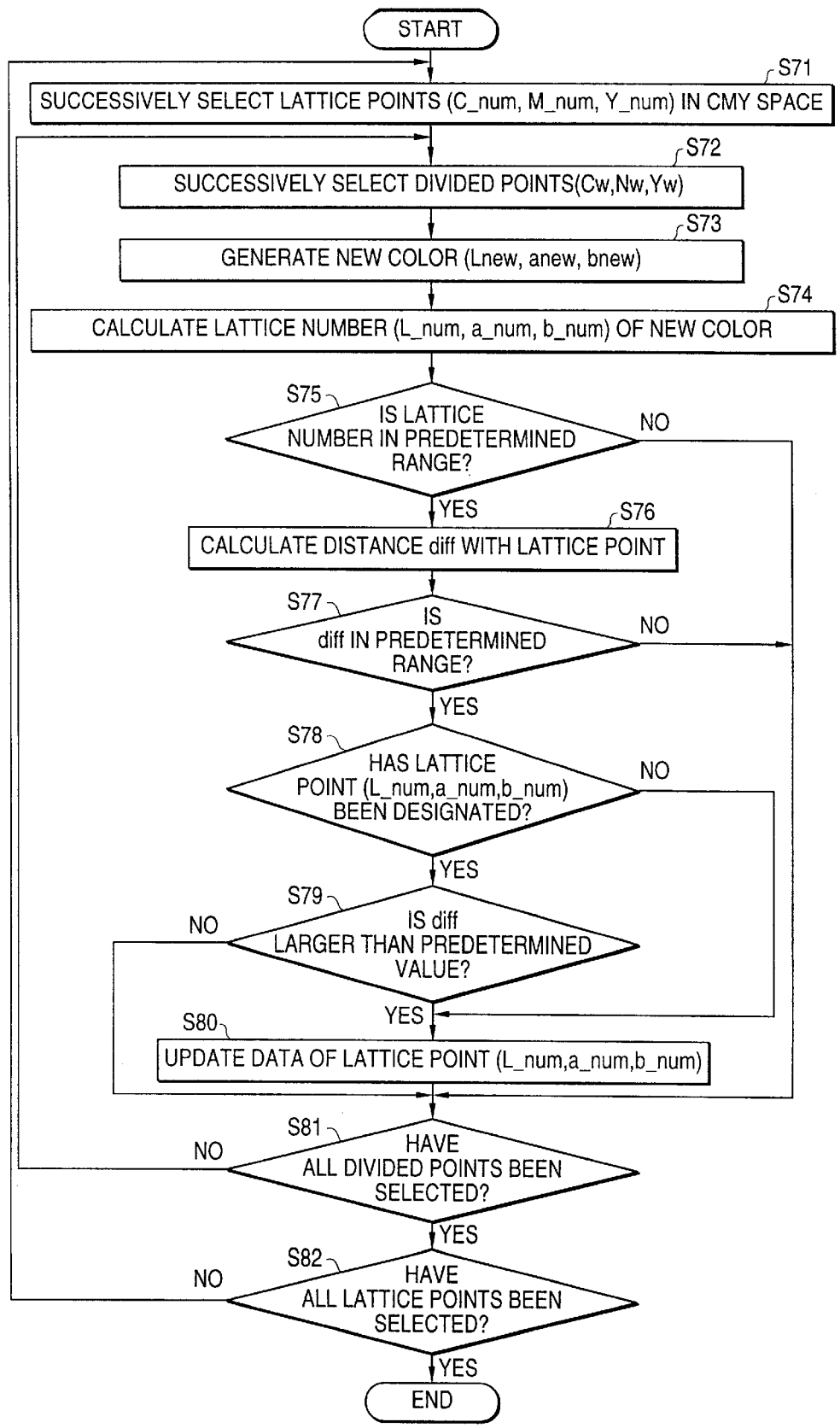
FIG. 24 is a flow chart showing a method for generating a color signal corresponding to an L*a*b* grid point according to the second embodiment of the present invention.

FIG. 24 is a flow chart showing a process for generating a color signal at a grid point in the L*a*b* space.

As shown in FIG. 24, a CMY number (Cnum, Mnum, Ynum) is designated so as to successively select grid points in the CMY space at step S71 and select divided points (Cw, Mw, Yw) in the CMY space at step S72 of FIG. 24.

A unit cube that contains a divided point (Cw, Mw, Yw) is divided by planes that traverse the divided point (Cw, Mw, Yw) and that are perpendicular to individual axes of the CMY space. With Formulas (76) through (83), the volumes of the eight rectangular parallelepipeds are obtained as weighing coefficients. Thereafter, with Formulas (73) through (75) for L*a*b* values corresponding to the eight vertexes of the unit cube that contains the divided point (Cw, Mw, Yw), a new color signal (Lnew, anew, bnew) is generated at step S73 of FIG. 24.

Using Formulas (85) through (87), an L*a*b* number (Lnum, anum, bnum) at a grid point in the vicinity of the new color signal (Lnew, anew, bnew) is calculated at step S74 of FIG. 24. When the L*a*b* number (Lnum, anum, bnum) is in the predetermined ranges of Formulas (88) through (90) at step S75, with Formula (91), the distance diff between the new color signal (Lnew, anew, bnew) and the grid point of the L*a*b* number (Lnum, anum, bnum) is calculated at step S76 of FIG. 24.

When the distance diff is in the predetermined range at step S77 of FIG. 24, it is determined whether the distance diff of the grid point corresponding to the L*a*b* number (Lnum, anum, bnum) has been designated at step S78. When the distance diff at the grid point corresponding to the L*a*b* number (Lnum, anum, bnum) has not been designated, the data of the grid point correspond to the L*a*b* number (Lnum, anum, bnum) is updated at step S80 of FIG. 24. When the distance diff at the grid point corresponding to the L*a*b* number (Lnum, anum, bnum) has been designated, it is determined whether or not the calculated distance diff is smaller than the predetermined value at step S79 of FIG. 24.

When the calculated distance diff is smaller than the predetermined value, the data at the grid point according to the L*a*b* number (Lnum, anum, bnum) is updated. When the calculated distance diff is equal to or larger than the predetermined value, the data at the grid point according to the L*a*b* number remains unchanged.

The above-described process is repeated for all divided points in the unit cube being selected at step S81 of FIG. 24. When the process has been completed for all the divided points of the unit cube being selected, the next CMY number (Cnum, Mnum, Ynum) is designated. Thereby, the next unit cube is selected. After all CMY numbers (Cnum, Mnum, Ynum) have been selected, the process for generating a color signal at a grid point in the L*a*b* space is completed at step S82 of FIG. 24.

A method for converting a color signal with a color conversion table that has registered color signals out of the color reproducible range will be described. The color conversion table has registered CMY values corresponding to L*a*b* grid points out of the color range. Eight points (registered in the color conversion table) around an L*a*b* value to be converted are selected. A CMY value corresponding to the selected L*a*b* value is interpolated and thereby a converted CMY value is obtained.

Using the color conversion table, a color signal in the vicinity of the boundary of the color reproducible range can be accurately obtained by an interpolating process. However, an interpolated value may be out of the color reproducible range. At this point, a color outside of the color reproducible range cannot be printed by the printer. Thus, the printer cannot determine a color corresponding to the input L*a*b* value. Consequently, it is determined whether the value obtained by the interpolating process is in the color range or out of the color range. When the value is out of the color range, the value is substituted with a value in the color range and then output to the printer.

Figure 25:
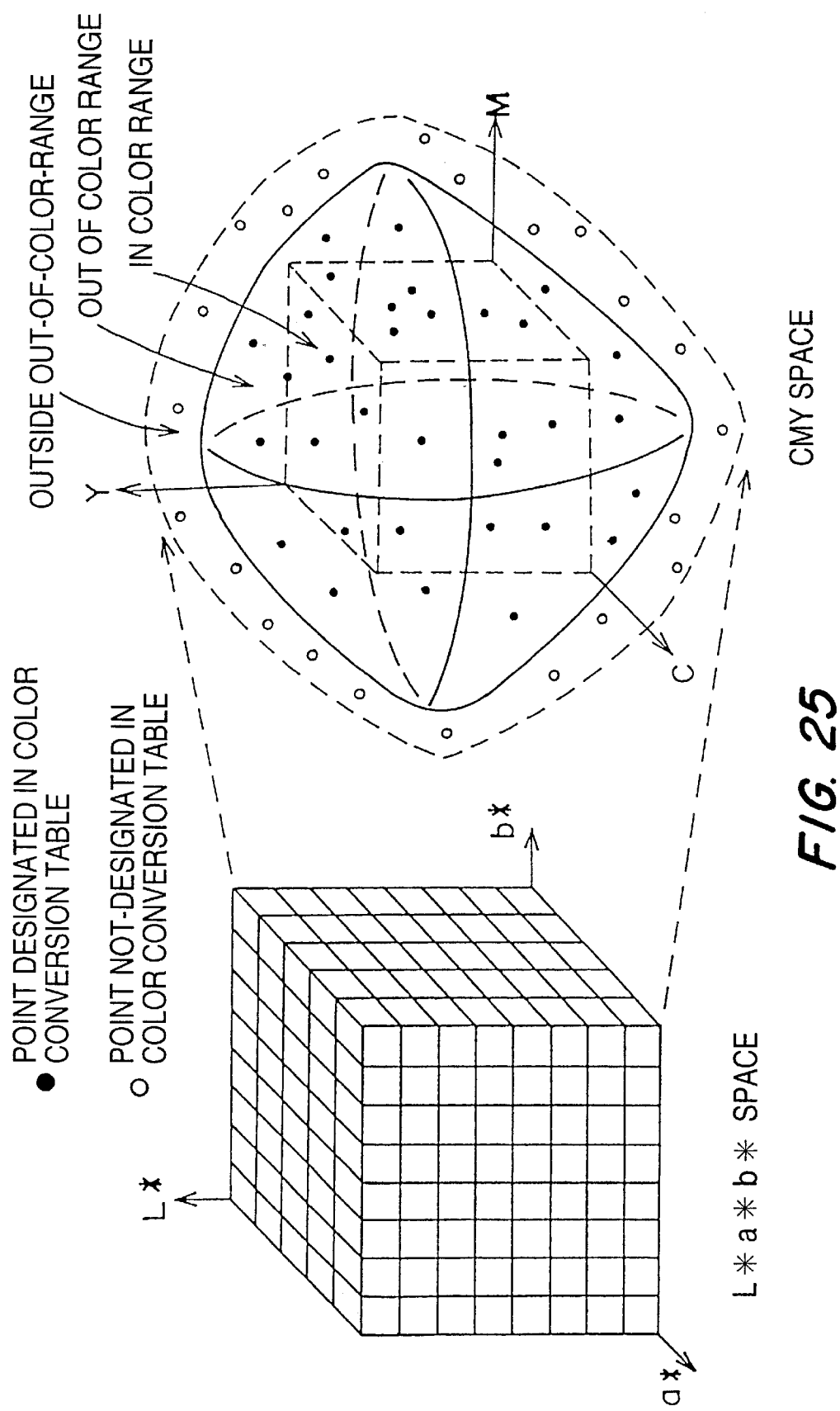
FIG. 25 is a schematic diagram showing points that have not been designated in a color conversion table in a color space according to an embodiment of the present invention.

FIG. 25 is a schematic diagram showing the range in a color space of points registered in a color conversion table.

As shown in FIG. 25, as CMY values registered in the color conversion table, there are points in the color reproducible range and points outside the color reproducible range. In this example, points that are significantly distant from the color range are not registered in the color conversion table. The region significantly distant and outside of color range is referred to as outside out-of-color-range.

Figure 26:
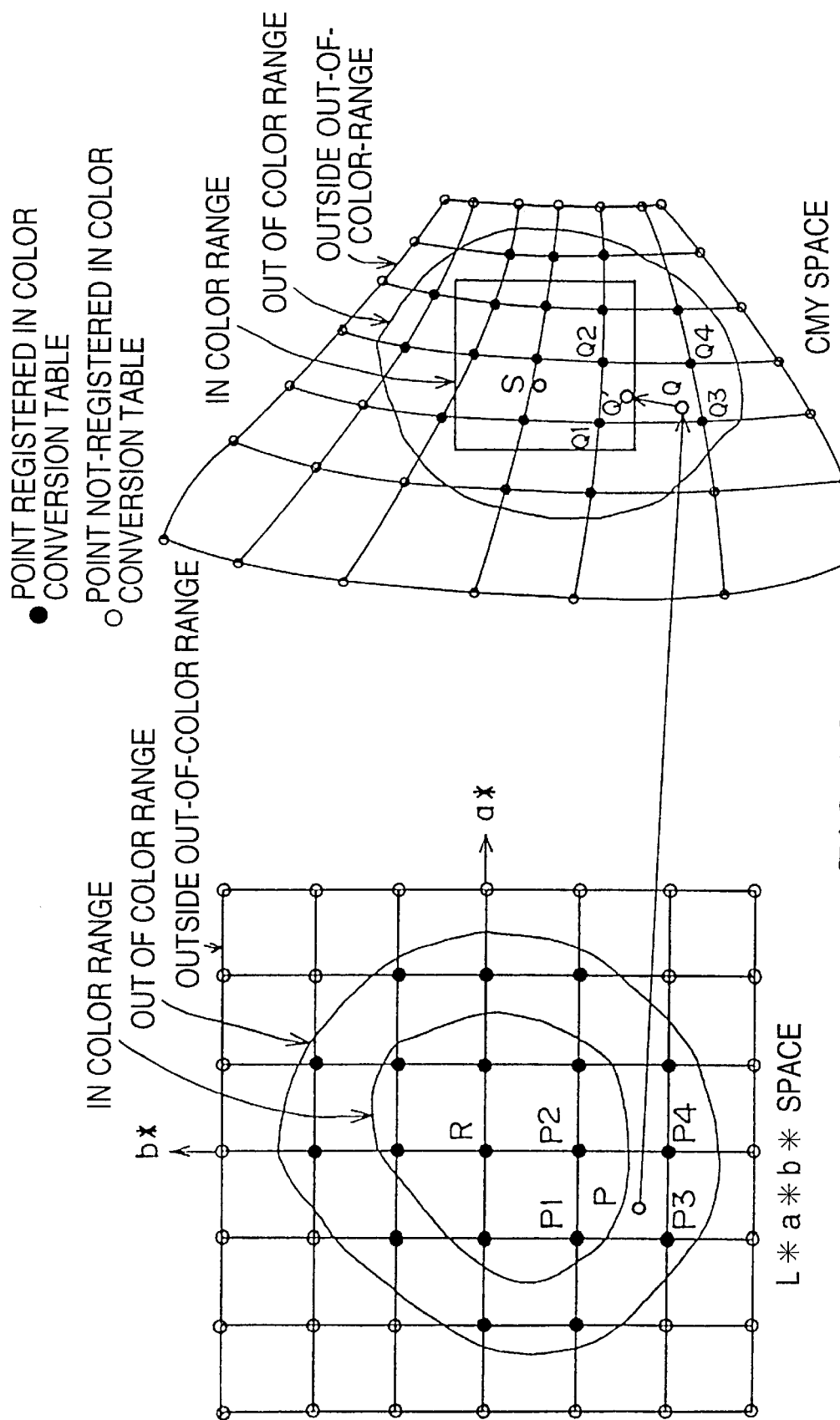
FIG. 26 is a schematic diagram showing a method for interpolating a color signal out of a color range in a two-dimensional color space according to an embodiment of the present invention.

FIG. 26 is a schematic diagram showing in a two-dimensional color space a method for converting a point out of a color range generated by an interpolating process into a point in the color range.

As shown in FIG. 26, it is assumed that points (black points) in the color range and outside of the color range have been registered in a color conversion table and that points (white points) outside out-of-color-range have not been registered in the color conversion table. Assuming that an L*a*b* value at a point P is input as an L*a*b* value to be converted, it is determined whether the L*a*b* value at the point P is in the color range or out of the color range. To do that, points P1 to P4 that surround the point P are extracted. These points P1 to P4 can be easily extracted because L*a*b* values registered in the color conversion table are distributed in a grid shape.

After the points P1 to P4 have been extracted, it is determined whether they are in the color range. Since the color range in the L*a*b* space is irregularly distributed, it is difficult to determine whether these points are in the color range or out of the color range in the L*a*b* space. Thus, after color signals at the points P1 to P4 are converted into color signals at points Q1 to Q4 in the CMY space with reference to the color conversion table, it is determined whether the points P1 to P4 are in the color range or outside of the color range. In the CMY space, since the color range is distributed in the range of a cube, it can be easily determined whether they are in the color range or outside of the color range.

Thus, as the determined results, the points P1 and P2 are in the color range and the points P3 and P4 are outside of the color range. When the points P1 and P2 are in the color range and the points P3 and P4 are outside of the color range, it is difficult to determine whether the point P is in the color range or out of the range only with the determined results of the points P1 to P4.

Thus, by an interpolation process, a color signal in the CMY space corresponding to a color signal in the L*a*b* space is calculated. As a result, assuming that a point Q is obtained corresponding to the point P, since the color range in the CMY space is distributed in the range of a cube, it can be easily determined whether the point Q is in the color range or out of the range.

Assuming that as the determined result the point Q is outside of the color range, the point Q corresponds to a color outside of the color reproducible range of the printer. Thus, when the color signal at the point Q is output to the printer as it is, it cannot be printed by the printer. Therefore, the color signal at the point Q is converted into a color signal in the color range of the printer and then output to the printer.

In the substituting process for the color signal, a point S in the CMY space corresponding to a point R with the same luminance and achromatic color as the point P is obtained and then substituted with a color signal at a point Q' at the boundary of the color range in color signals that orient from the point Q to the point S.

Figure 27:
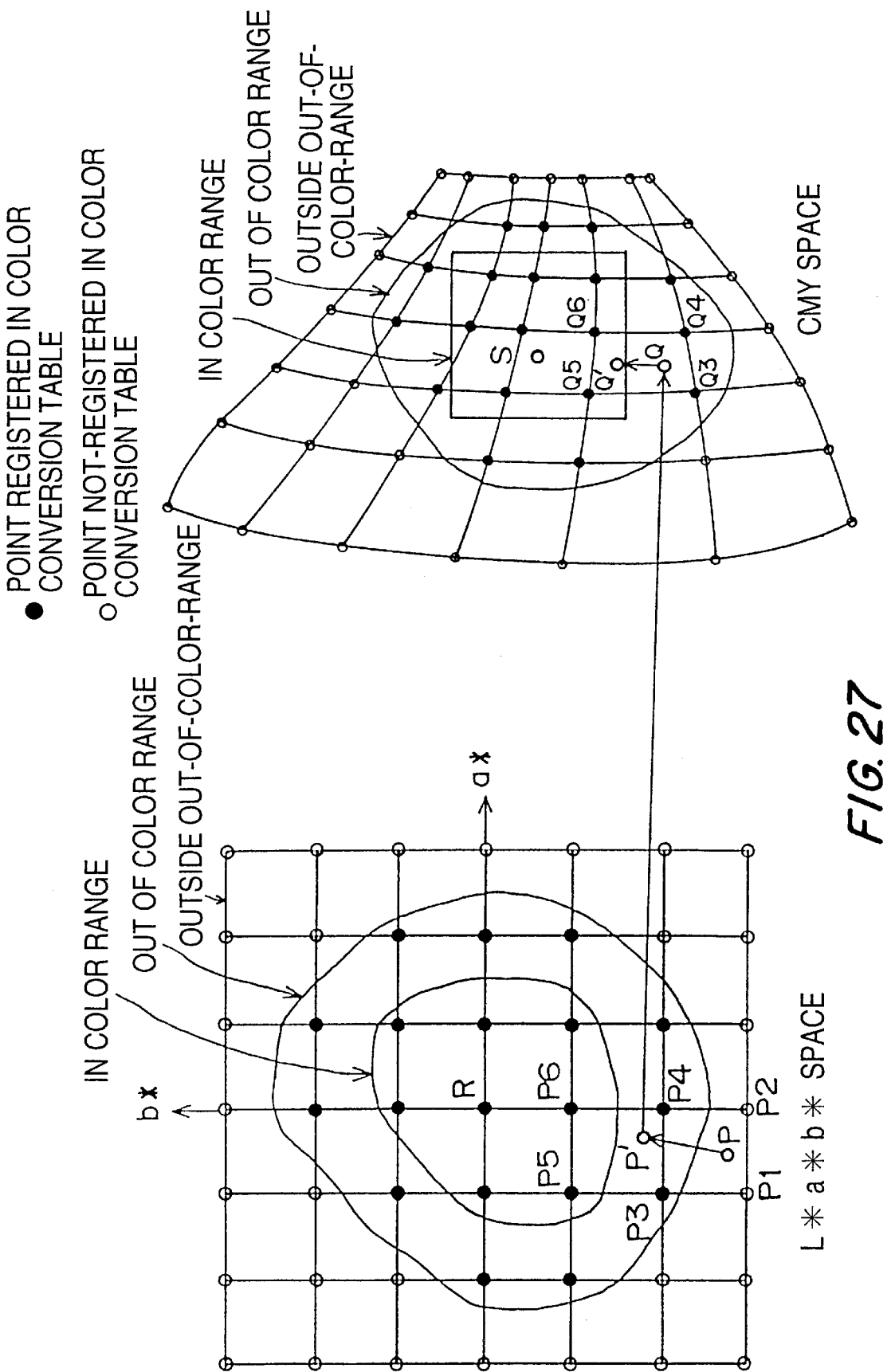
FIG. 27 is a schematic diagram showing a method for interpolating a color signal outside out-of-color-range in a two-dimensional color space according to an embodiment of the present invention.

FIG. 27 is a schematic diagram showing in a two-dimensional color space a method for converting a point outside out-of-color-range as a grid point used for an interpolating process into a point in the color range.

As shown in FIG. 27, it is assumed that points (black points) in the color range and out of the color range have been registered in the color conversion table and that points (white points) outside out-of-color-range have not been registered in the color conversion table. Assuming that an L*a*b* value at a point P is input as an L*a*b* value to be converted, it is determined whether the L*a*b* value at the point P is in the color range or out of the range. To do that, points P1 to P4 that surround the point P are extracted. Since L*a*b* values registered in the color conversion table are distributed in the grid shape, the points P1 to P4 can be easily extracted.

After the points P1 to P4 have been extracted, it is determined whether they are in the color range. Since the color range in the L*a*b* space is irregularly distributed, it is difficult to determine whether these points are in the color range or outside of the color range in the L*a*b* space. Thus, after color signals at the points P1 to P4 are converted into color signals at points Q1 to Q4 in the CMY space with reference to the color conversion table, it is determined whether the points P1 to P4 are in the color range or outside of the color range. In the CMY space, since the color range is distributed in the range of a cube, it can be easily determined whether they are in the color range or outside of the color range.

As a result, it is clear that the CMY values at the points P3 and P4 have been registered in the color conversion table and that the CMY values at the points P1 and P2 have not been registered in the color conversion table as shown in FIG. 27. Unless the CMY values at the points P1 and P2 have been registered in the color conversion table, it is difficult to obtain the CMY value corresponding to the point P by the interpolating process.

Thus, the chromaticity of the color signal at the point P is decreased so as to move the point P to a point P'. Therefore, points P3 to P6 that surround the point P' are extracted. Next, it is determined whether the CMY values at the points Q3 to Q6 corresponding to the points P3 to P6 have been registered in the color conversion table. When the CMY values at the points Q3 to Q6 have been registered in the color conversion table, by interpolating the CMY values at the points Q3 to Q6, the CMY value at the point Q corresponding to the point P' is calculated.

As a result, when the CMY value at the point Q is out of the color range, a point S in the CMY space corresponding to the point R with the same luminance and achromatic color as the point P is obtained. The CMY value at the point Q is substituted with a CMY value at a point Q' at the boundary of the color range in color signals that orient from the point Q to the point S. Thereafter, the color signal is output to the printer.

Figure 28:
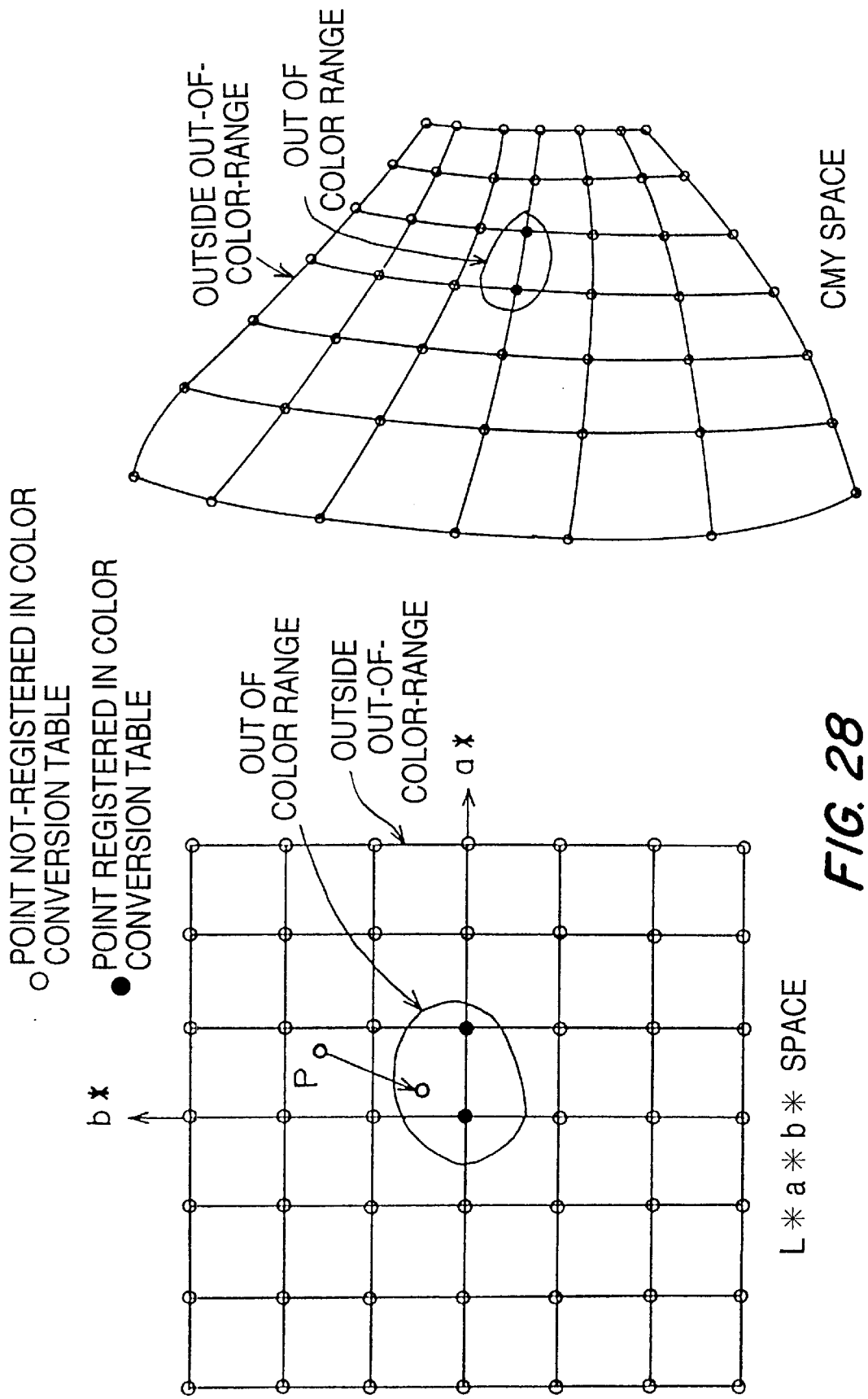
FIG. 28 is a schematic diagram for explaining an exceptional process for a color signal outside out-of-color-range in a two-dimensional color space according to an embodiment of the present invention.

FIG. 28 is a schematic diagram for explaining an exceptional process in the method shown in FIG. 27.

As shown in FIG. 28, it is assumed that an L*a*b* value at a point P outside out-of-color-range has been input as an L*a*b* value to be converted. When the luminance of the color signal at the point P to be converted is very large or very small, since the color reproducible range is narrow, even if the chromaticity of the color signal at the point P is largely decreased, a moving point surrounded by grid points registered in the color conversion table cannot be detected. Thus, for a point of which a color signal cannot be converted by decreasing the chromaticity, the luminance of the color signal is approached to the intermediate value. Thereafter, the color signal is converted. When the luminance becomes an intermediate value, since the region of the color reproducible range becomes wide, even if a point outside out-of-color-range where the luminance is very large is input as a point to be converted, the color signal can be converted in the color range.

Figure 29:
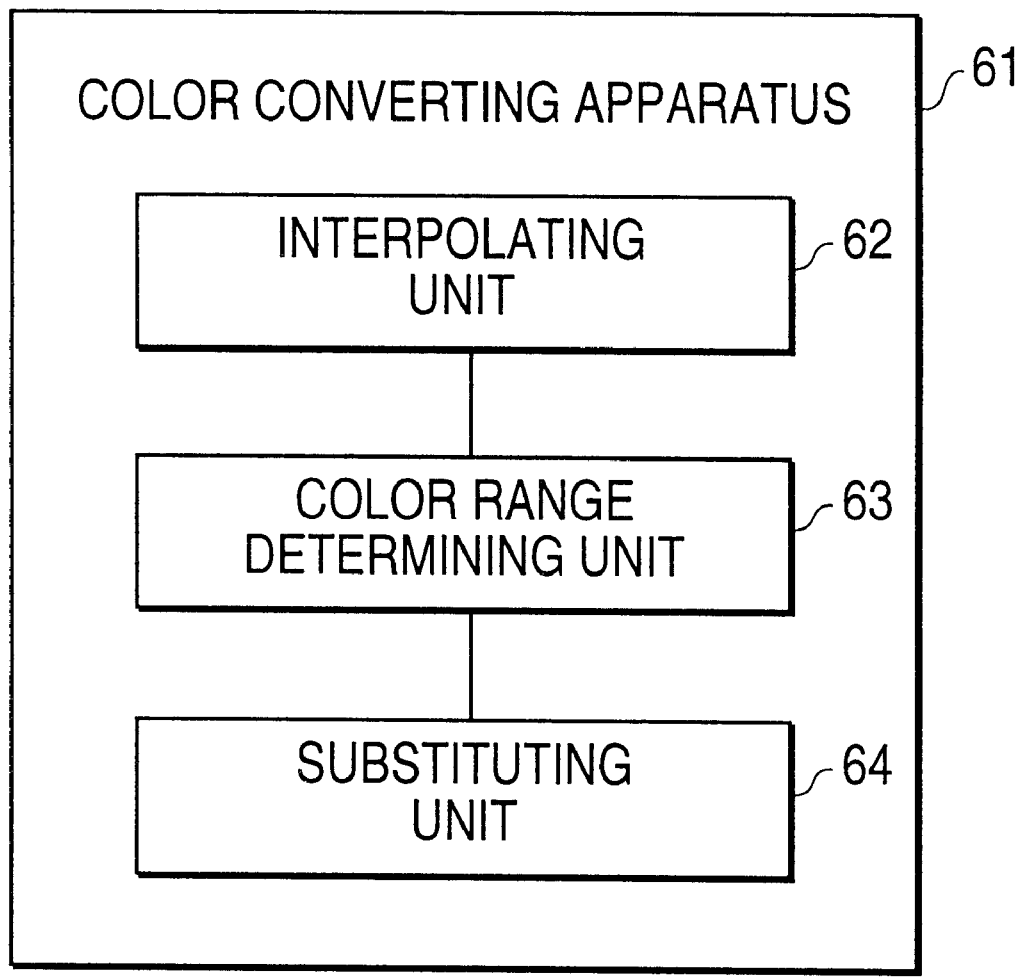
FIG. 29 is a block diagram showing the structure of a color converting apparatus according to the first embodiment of the present invention.

FIG. 29 is a block diagram showing the structure of a color converting apparatus according to the first embodiment of the present invention.

As shown in FIG. 29, a color converting apparatus 61 comprises an interpolating unit 62, a color range determining unit 63, and a substituting unit 64. The interpolating unit 62 interpolates a color signal to be converted and outputs the converted result. The color range determining unit 63 determines whether the converted result is in the color range or out of the color range. When the converted result of the color signal is out of the color range, the substituting means 64 substitutes the color signal out of the color range with a color signal in the color range.

Thus, a converted color signal that is out of the color range can be prevented from being output as it is. Thereby, the situation of which the printer cannot print the color signal can be prevented.

Figure 30:
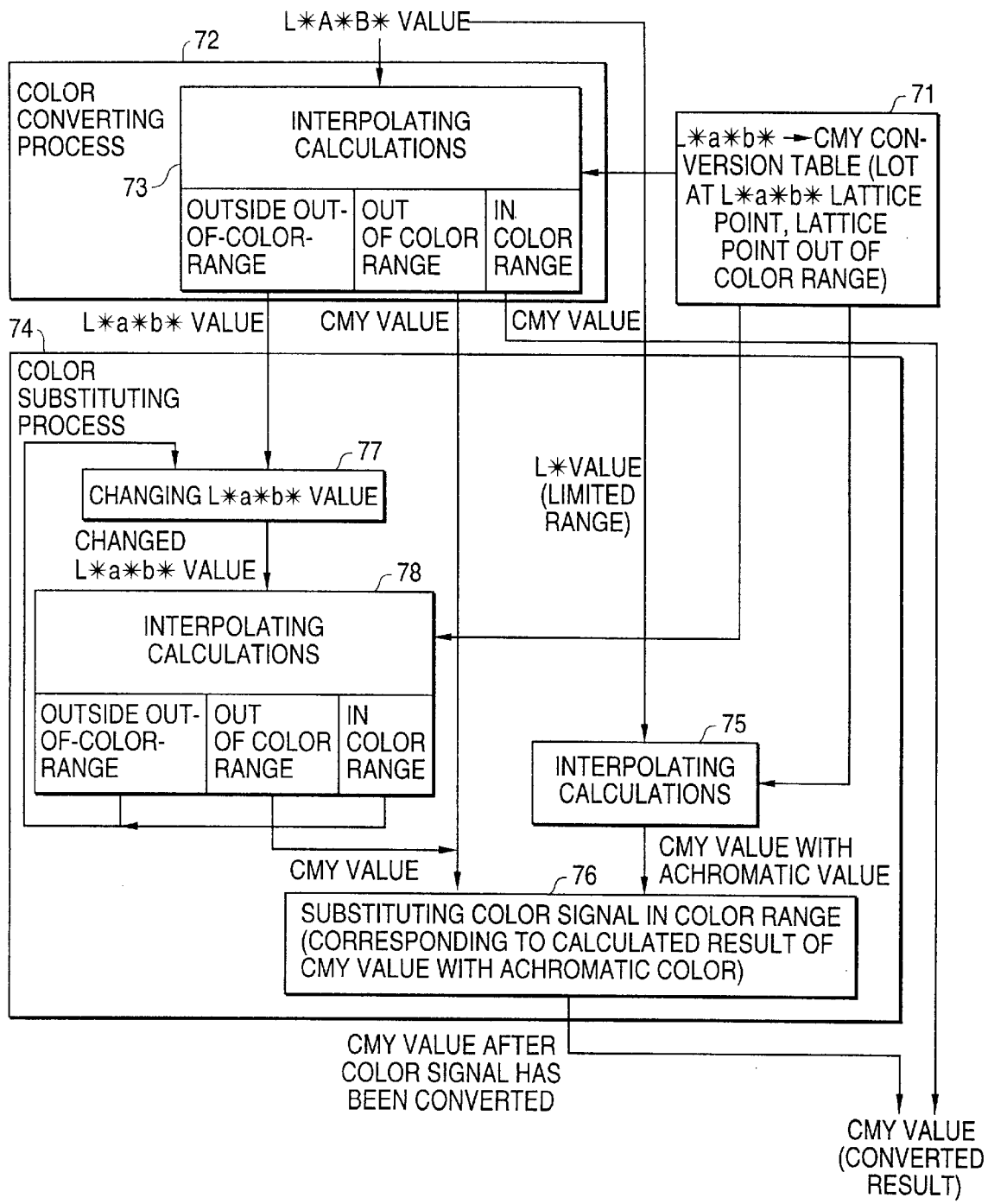
FIG. 30 is a block diagram showing the structure of a color converting apparatus according to the second embodiment of the present invention.

FIG. 30 is a block diagram showing the structure of a color converting apparatus according to the second embodiment of the present invention.

As shown in FIG. 30, there are three types of L*a*b* grid points in the color conversion table 71. In the color conversion table 71, CMY values are registered in the following manner:

1) Lattice points in color range (all CMY values are in the range from 0 to 255);
2) Lattice points out of color range (any of CMY values is out of the range of 0 to 255);
3) Lattice points outside out-of-color-range (points at which CMY values have not been designated);

With reference to a color conversion table 71, an interpolating calculating unit 73 interpolates an input L*a*b* value with data at an L*a*b* grid point. A color conversion processing unit 72 outputs the following three types of data corresponding to the interpolated result.

4) In color range (all CMY values as interpolated results are in the range from 0 to 255);
5) Out of color range (any of CMY values as interpolated results is out of the range of 0 to 255);
6) Outside out-of-color-range (an interpolating calculation cannot be performed for a point in the vicinity of a point at which a CMY value has not been designated (this situation usually does not take place in a normal picture);

A color substitution processing unit 74 performs the following process corresponding to the three types of data.

7) In the color range: The color substitution processing unit 74 does not perform an additional process. A CMY value obtained by the interpolation calculating unit 73 is output as it is;
8) Outside of the color range: A CMY value out of the color range is output to the color substituting unit 76. The color substituting unit 76 changes the CMY value to a CMY value at the boundary of the color range (at the limit of the color range) and the color substituting process is performed. In the color substituting process, the luminance and hue are kept with a CMY color signal. Thus, with reference to the color conversion table 71, an interpolation calculating unit 75 obtains a CMY value corresponding to a value (L, 0, 0) with the same luminance and achromatic color as an L*a*b* value to be converted and outputs an achromatic color CMY value corresponding to the value (L, 0, 0) to the color substituting unit 76; and
9) Outside out-of-color-range: The L*a*b* value supplied to the interpolation calculating unit 73 is input to an L*a*b* value changing unit 77. The L*a*b* value changing unit 77 changes the L*a*b* value while the luminance and hue of the L*a*b* value that is input to the interpolation calculating unit 73 are kept. The L*a*b* value changing unit 77 outputs the changed L*a*b* value to the interpolation calculating unit 78.

With reference to the color conversion table 71, the interpolation calculating unit 78 performs an interpolating process and thereby outputs a CMY value corresponding to the L*a*b* value changed by the L*a*b* value changing unit 77. In this interpolation process, when data that represents that an L*a*b* value is in the color range or outside out-of-color-range, the L*a*b* value changing unit 77 changes the L*a*b* value and outputs the changed L*a*b* value to the interpolation calculating unit 78. When the interpolated result is out of the color range, the CMY value is output to the color reproducing unit 76.

In the process dealing with colors outside out-of-color-range, since the calculations should be performed until a value outside of the color range is obtained, it takes some processing time. However, it is not necessary to accurately obtain a value (because a value outside of color range has a width or amount of color to some extent). Thus, the process can be coarsely performed. Consequently, the process can be performed at high speed in comparison with the case in which a CMY value of a color at the limit of the color range is obtained by repeating the process.

Using mathematical expressions, the interpolation process will now be described in detail.

In this example, it is assumed that the input L*a*b* value is (Li, ai, bi). In addition, since a CMY value at a grid point corresponding to an L*a*b* number (L, a, b) is registered to the color conversion table, the format of the actual data is a three-dimensional array of C[L][a][b], M[L][a][b], Y[L][a][b]. Next, the interpolation process corresponding to a cube interpolating method will be described.

Lattice points used for the interpolating process (namely, eight points that surround an L*a*b* value to be converted) are selected by the following expressions.

$$L*=(int)(Li/g) \tag{125}$$

$$a*=(int)((ai+128.0)/g) \tag{126}$$

$$b*=(int)((bi+128.0)/g) \tag{127}$$

where g represents a grid size; and (int) represents that the value below the decimal point is rounded off.

Assuming that the length w of each side of the cube is 1, the position (Lw, aw, bw) in the cube of an L*a*b* value is calculated by the following expressions.

$$Lw=(Li/g-L) \tag{128}$$

$$aw=((ai+128.0)/g-a) \tag{129}$$

$$bw=((bi+128.0)/g-b) \tag{130}$$

Weighing coefficients used in the cube interpolating method (volumes (V(0, 0, 0) to V(1, 1, 1) of rectangular parallelepipeds generated by dividing the cube) are calculated. In this case, the volumes V(0, 0, 0) to V(1, 1, 1) of rectangular parallelepipeds can be obtained from the position (Lw, aw, bw) in the cube of the L*a*b* value.

Figure 31:
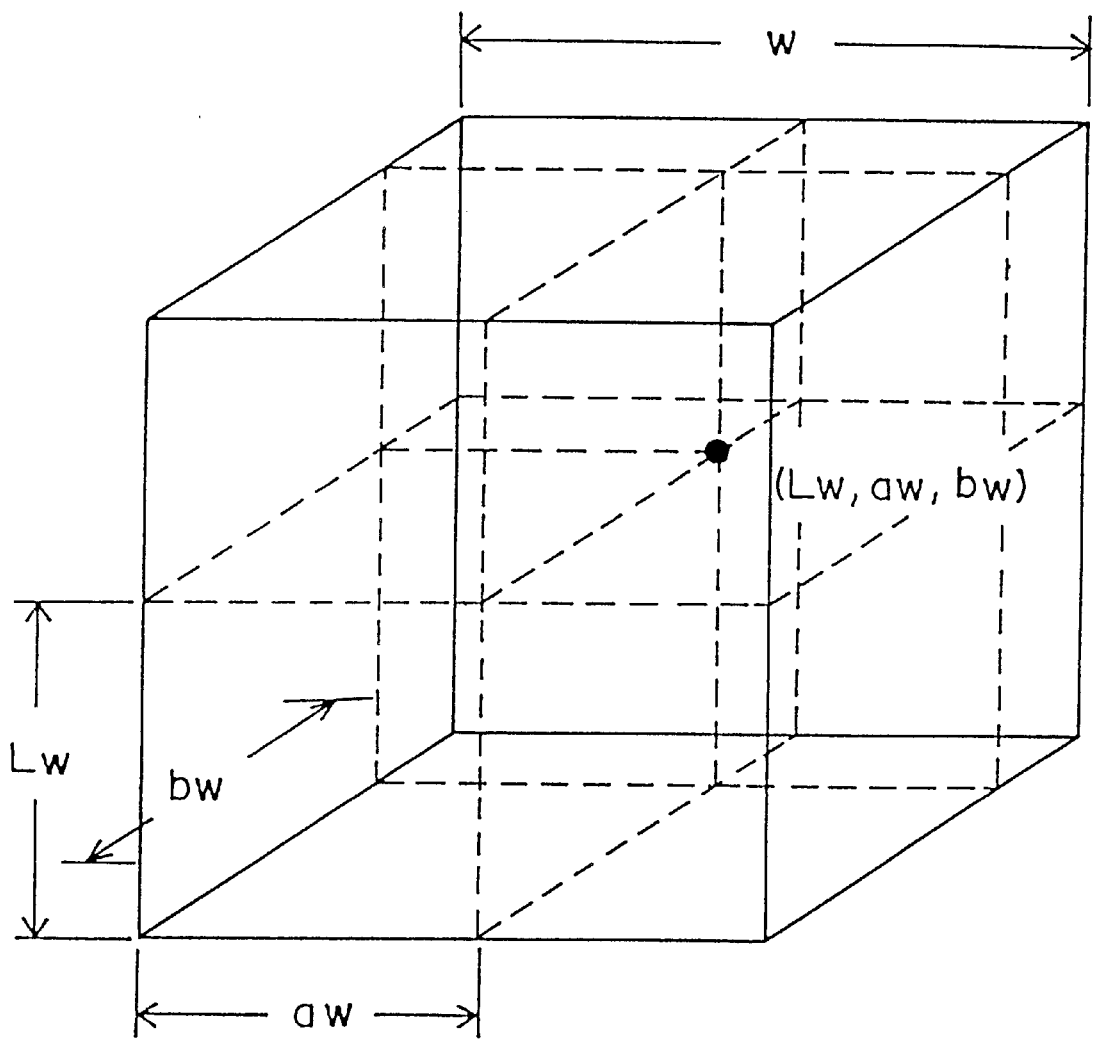
FIG. 31 is a schematic diagram for explaining a method for calculating weighing coefficients used in a cube interpolating method according to an embodiment of the present invention.

FIG. 31 is a schematic diagram showing an example of eight rectangular parallelepipeds divided at a position (Lw, aw, bw) in a cube. Referring to FIG. 31, the volumes (V(0, 0, 0) to V(1, 1, 1)) of the rectangular parallelepipeds can be easily calculated by the following expressions.

$$V(0,0,0)=(1-Lw)\cdot(1-aw)\cdot(1-bw) \tag{131}$$

$$V(1,0,0)=Lw\cdot(1-aw)\cdot(1-bw) \tag{132}$$

$$V(0,1,0)=(1-Lw)\cdot aw\cdot(1-bw) \tag{133}$$

$$V(0,0,1) = (1-Lw) \cdot (1-aw) \cdot bw \quad (134)$$

$$V(0,1,1) = (1-Lw) \cdot aw \cdot bw \quad (135)$$

$$V(1,0,1) = Lw \cdot (1-aw) \cdot bw \quad (136)$$

$$V(1,1,0) = Lw \cdot aw \cdot (1-bw) \quad (137)$$

$$V(1,1,1) = Lw \cdot aw \cdot bw \quad (138)$$

A determination is made whether there is a point to which data has not been designated in eight points that surround a position (Lw, aw, bw) in a cube. When there is a point to which data has not been designated, the point is treated as outside of the out-of-color-range. Thus, the interpolating process is not performed for the point. In the case that the following conditions are satisfied, it is assumed that there is a point to which data has not been designated.

(a) L, a, b, L+1, a+1, and b+1 are outside of the range of the color conversion table (out of the range of the three-dimensional array of the color conversion tale).

(b) Any of Lw, aw, and bw is negative.

(c) Data has not been designated to grid points with L*a*b* numbers (L, a, b), (L+1, a, b), (L, a+1, b), (L, a, b+1), (L, a+1, b+1), (L+1, a, b+1), (L+1, a+1, b), and (L+1, a+1, b+1)

By calculating the average of the weighing coefficients V(0, 0, 0) to V(1, 1, 1) of CMY values at grid points with the L*a*b* numbers (L, a, b), (L+1, a, b), (L, a+1, b), (L, a, b+1), (L, a+1, b+1), (L+1, a, b+1), (L+1, a+1, b), and (L+1, a+1, b+1), the interpolating process is executed.

Assuming that C [L] [a] [b], M [L] [a] [b], Y [L] [a] [b] represent a CMY value at a grid point (L, a, b), a CMY value to be interpolated can be calculated by the following expressions.

$$\begin{aligned}C = (&C[L][a][b] \cdot V(0,0,0) + C[L+1][a][b] \cdot V(1,0,0) + \\ &C[L][a+1][b] \cdot V(0,1,0) + C[L][a][b+1] \cdot V(0,0,1) + \\ &C[L][a+1][b+1] \cdot V(0,1,1) + C[L+1][a][b+1] \cdot V(1,0,1) + \\ &C[L+1][a+1][b] \cdot V(1,1,0) + \\ &C[L+1][a+1][b+1] \cdot V(1,1,1))\end{aligned} \quad (139)$$

$$\begin{aligned}M = (&M[L][a][b] \cdot V(0,0,0) + M[L+1][a][b] \cdot V(1,0,0) + \\ &M[L][a+1][b] \cdot V(0,1,0) + M[L][a][b+1] \cdot V(0,0,1) + \\ &M[L][a+1][b+1] \cdot V(0,1,1) + \\ &M[L+1][a][b+1] \cdot V(1,0,1) + \\ &M[L+1][a+1][b] \cdot V(1,1,0) + \\ &M[L+1][a+1][b+1] \cdot V(1,1,1))\end{aligned} \quad (140)$$

$$\begin{aligned}Y = (&Y[L][a][b] \cdot V(0,0,0) + Y[L+1][a][b] \cdot V(1,0,0) + \\ &Y[L][a+1][b] \cdot V(0,1,0) + Y[L][a][b+1] \cdot V(0,0,1) + \\ &Y[L][a+1][b+1] \cdot V(0,1,1) + \\ &Y[L+1][a][b+1] \cdot V(1,0,1) + \\ &Y[L+1][a+1][b] \cdot V(1,1,0) + \\ &Y[L+1][a+1][b+1] \cdot V(1,1,1))\end{aligned} \quad (141)$$

Next, a CMY value calculated by Formulas (139) through (141) are output. When one of elements of the CMY value is not in the range from 0 to 255, it is treated as a CMY value outside of the color range.

Using mathematical expressions, the color substituting process will be more practically described.

Before the color substituting process is executed, the maximum value Lmax of the luminance of an achromatic color and the minimum value Lmin thereof are calculated beforehand.

To calculate the maximum value Lmax of the luminance of an achromatic color, while L* of an L*a*b* value is incremented from (50, 0, 0), a color signal is converted into a CMY value. The maximum value Lmax is a value that is smaller by 1 than an L* value of which the color converted result is out of the color range or outside out-of-color-range.

To calculate the minimum value Lmin of the luminance of an achromatic color, while L* of an L*a*b* value is decremented from (50, 0, 0), a color signal is converted into a CMY value. The minimum value Lmin is a value that is larger by 1 than an L* value of which the color converted result is out of the color range or outside out-of-color-range.

It is then determined whether the interpolated result is outside out-of-color-range or outside of the color range. The case when the interpolated result is out of color range will now be described.

By the interpolation calculating process, a CMY value (Cn, Mn, Yn) with the same luminance and achromatic color (Li, 0, 0) is calculated.

In the interpolation calculating process, an Li value is clipped in the range from (Lmax−Lmargin) to (Lmin+Lmargin). In other words, when Li>Lmax−Lmin, Li=Lmax−Lmargin is obtained,
when Li<Lmin+Lmargin, Li=Lmin+Lmargin is obtained,
where Lmargin is a predetermined constant.

The reason the Li value is clipped in the range from (Lmax−Lmargin) to (Lmin+Lmargin) is that the color range on the plane a*b* may be very narrow in the vicinity of the minimum value Lmin of the luminance and the maximum value Lmax thereof.

In the following process, a CMY value in the limit of the color range between a CMY value with the same luminance and achromatic color and a CMY value out of the color range is obtained. However, when the color range on the plane a*b* is narrow (only colors close to achromatic colors are present), the obtained CMY value deviates to a color close to an achromatic color. Thus, as an Li value of the same luminance and achromatic color, a value very close to the minimum value Lmin of the luminance and the maximum value Lmax thereof is not used.

The farthest component is then determined in CMY values outside of the color reproducible range and the excess level D is calculated.

Figure 32:
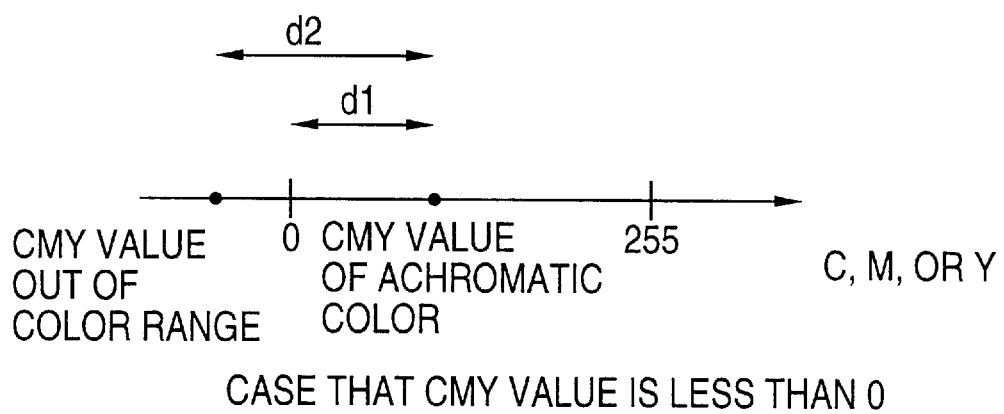
FIG. 32 is a schematic diagram for explaining an excess level of a CMY signal out of a color range according to an embodiment of the present invention.
Figure 32:
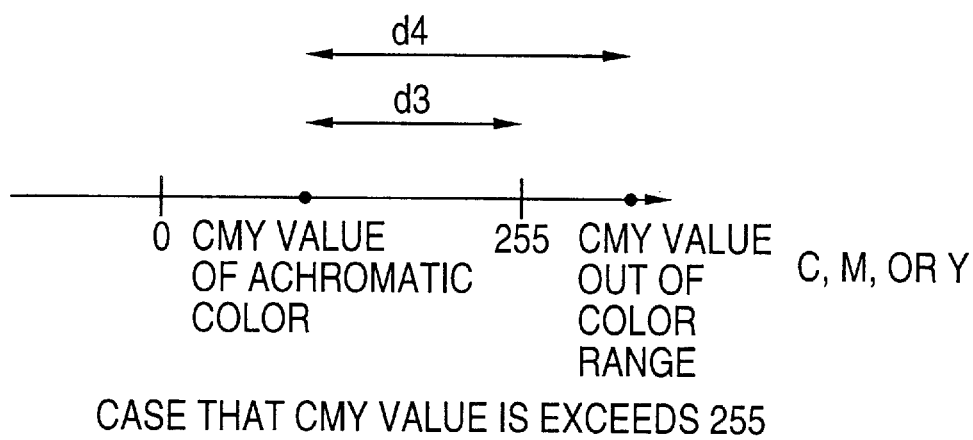

FIG. 32 is a schematic diagram for explaining an excess level of a CMY component that exceeds the color reproducing range.

As shown In FIG. 32, when a CMY value is less than 0, a difference d1 between a CMY value with an achromatic color and a CMY value 0 and a difference d2 between the CMY value with the achromatic color and a CMY value outside of the color range are obtained. The excess level is evaluated as d2/d1.

When a CMY value exceeds 255, a difference d3 between the CMY value with the achromatic color and a CMY value 255 and a difference between the CMY value with the achromatic color and a CMY value outside of the color range are obtained. The excess level is evaluated as d4/d3.

At this point, an excess level (Cd, Md, Yd) is calculated by the following expressions.

Cd=0, Md=0, Yd=0(initialized)

if (C<0)Cd=(C−Cn)/(0−Cn)  (142)

if (C>255)Cd=(Cn−C)/(Cn−255)  (143)

if (M<0) Md=(M−Mn)/(0−Mn)  (144)

if (M>255)Md=(Mn−M)/(Mn−255)  (145)

if (Y<0)Yd=(Y−Yn)/(0−Yn)  (146)

if (Y>255)Yd=(Yn−Y)/(Yn−255)  (147)

The maximum value of the excess level (Md, Cd, Yd) is referred to as excess level D.

The CMY value (Cb, Mb, Yb) at the limit of the color reproducible range is calculated by the following expressions.

Cb=Cn−(Cn−C)/D  (148)

Mb=Mn−(Mn−M)/D  (149)

Yb=Yn−(Yn−Y)/ID  (150)

The case where the interpolated result is "outside out-of-color-range" will now be described. In this case, while the same luminance and same hue are satisfied, the input L*a*b* value is moved from the "outside out-of-color-range" to "out of color range". In other words, the chromaticity of the input L*a*b* value is decreased.

The initial values of the chromaticity crinit and gdiv of the input L*a*b* value (L1, ai, bi) are designated by the following expressions.

crinit=cr=sqrt(ai·ai+bi·bi)(designation of chromaticity)  (151)

gdiv=gdivinit(predetermined initial value)  (152)

The chromaticity crinit of the input L*a*b* value (Li, ai, bi) is decreased by the following expression. When the resultant chromaticity cr is smaller than 0, the exceptional process is performed.

cr=cr−g/gdiv  (153)

where g is a grid interval in the L*a*b* space.

Next, the a*b* value (anew, new) of which the chromaticity is decreased and obtained by the following expressions.

anew=ai·(cr/crinit)  (154)

bnew=bi·(cr/crinit)  (155)

It is now determined whether the resultant L*a*b* value (Li, anew, bnew) of which the chromaticity has been decreased is out of color range. When the L*a*b* value (Li, anew, bnew) is out of the color range, the color converting process for the L*a*b* value (Li, anew, bnew) is executed. When the L*a*b* value (Li, anew, bnew) is outside out-of-color-range, with Formula (153), the process for decreasing the chromaticity is further preformed. When the L*a*b* value (Li, anew, bnew) is in the color range, the process for increasing the chromaticity is performed with the following expressions.

gdiv=gdiv+gdiv(the recommended value of the maximum value of gdiv is 32)  (156)

cr=cr+g/gdiv  (157)

The a*b* value (anew, bnew) of which the chromaticity has been increased is obtained using Formulas (154) and (155). The chromaticity of the input L*a*b* value is continuously changed until the L*a*b* value (Li, anew, bnew) becomes out of the color range.

The exceptions process will now be described.

In the exceptions process, the L*a*b* value with the same luminance and achromatic color of the input L*a*b* value is moved from the "outside out-of-color-range" to "out of color range". In other words, a process for approaching the luminance of the input L*a*b* value to 50 is performed.

The L*a*b* value (Li, anew, bnew) with the same luminance and achromatic color as the input L*a*b* value (Li, ai, bi), the initial value of gdiv, and the initial value of Lref are designated with the following expressions.

gdiv=dgivint(recommended value=2)  (158)

Lrefinit=Lref=abs(Li−50)  (159)

anew=bnew=0  (160)

Where abs represents a calculation using an absolute value.

When the luminance of the input L*a*b* value is approached to 50 with the following expressions, a new L*a*b* value (Lnew, 0, 0) is generated.

Lref=Lref−g/gdiv  (161)

Lnew=50+(Li−50)·(Lref/Lrefinit)  (162)

Where g is a grid interval in the L*a*b* space.

It is then determined whether the new L*a*b* value (Lnew, 0, 0) is out of the color range. When the L*a*b* value (Lnew, 0, 0) is out of the color range, the color converting process is performed for the L*a*b* value (Lnew, 0, 0). When the L*a*b* value (Lnew, 0, 0) is outside out-of-color-range, with Formula (162), the process for approaching the luminance to 50 is further performed. When the L*a*b* value (Lnew, 0, 0) is in the color range, with the following expressions, the process for departing the luminance from 50 is performed.

gdiv=gdiv+gdiv(recommended value of maximum value of giv=32)  (163)

Lref=Lref+g/gdiv  (164)

Lnew=50+(Li−50)·(Lref/Lrefinit)  (165)

The L* value Lnew of which the luminance has been departed from 50 is obtained with Formula (162). The luminance is continuously changed until the L*a*b* value (Lnew, 0, 0) is in the color range.

Figure 33:
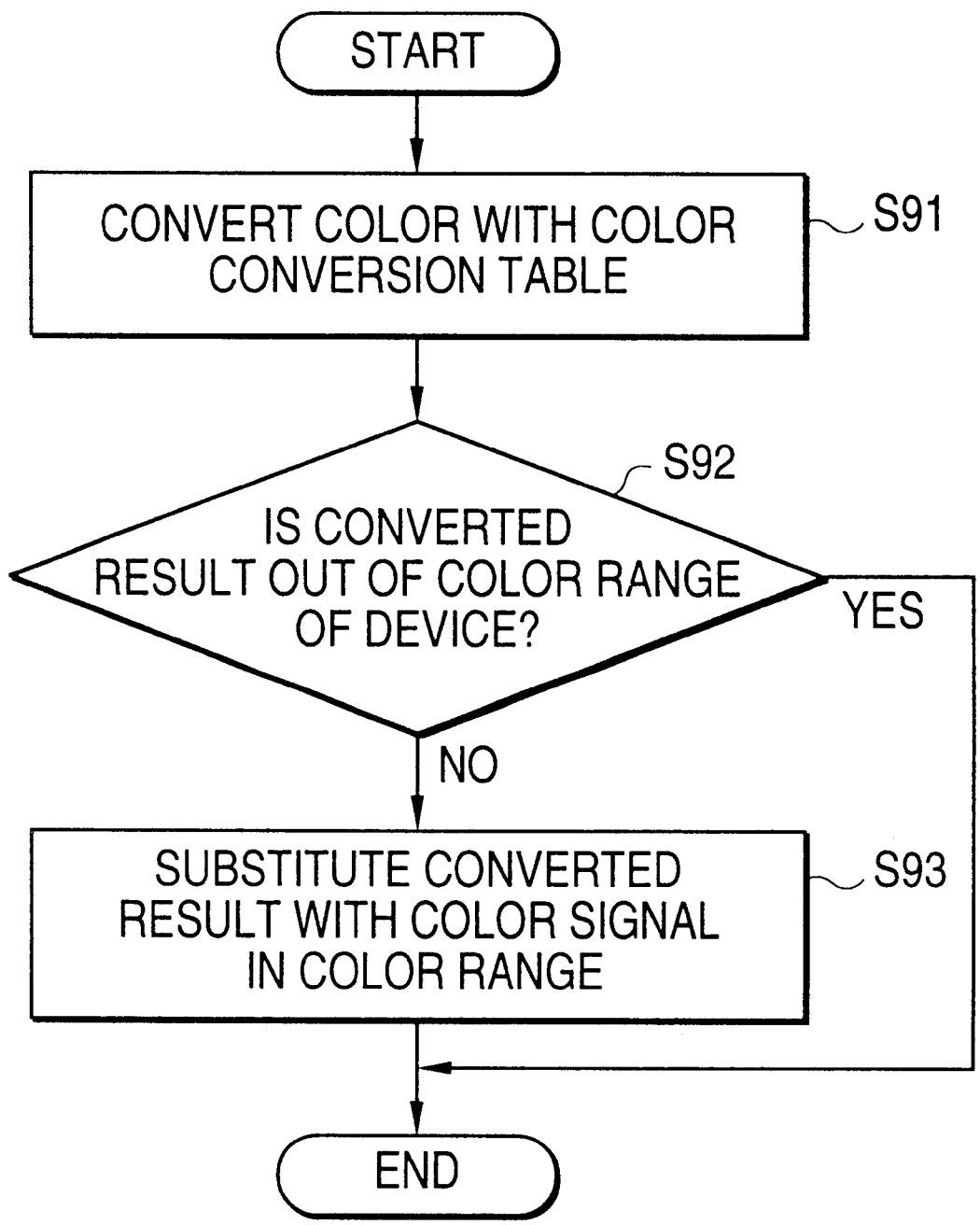
FIG. 33 is a flow chart showing a color converting method according to an embodiment of the present invention.

FIG. 33 is a flow chart showing a color converting process according to an embodiment of the present invention.

As shown in FIG. 33, a color signal to be converted is interpolated with a color signal registered in a color conversion table. Thus, the color signal is converted into a color signal in a different color space at step S91.

It is then determined whether the converted result is in the color range of a color reproducing device at step S92 of FIG. 33. When the converted result is not in the color range of the color reproducing device, the converted result is substituted for a color signal in the color range of the color reproducing device at step S93 of FIG. 33.

Figure 34:
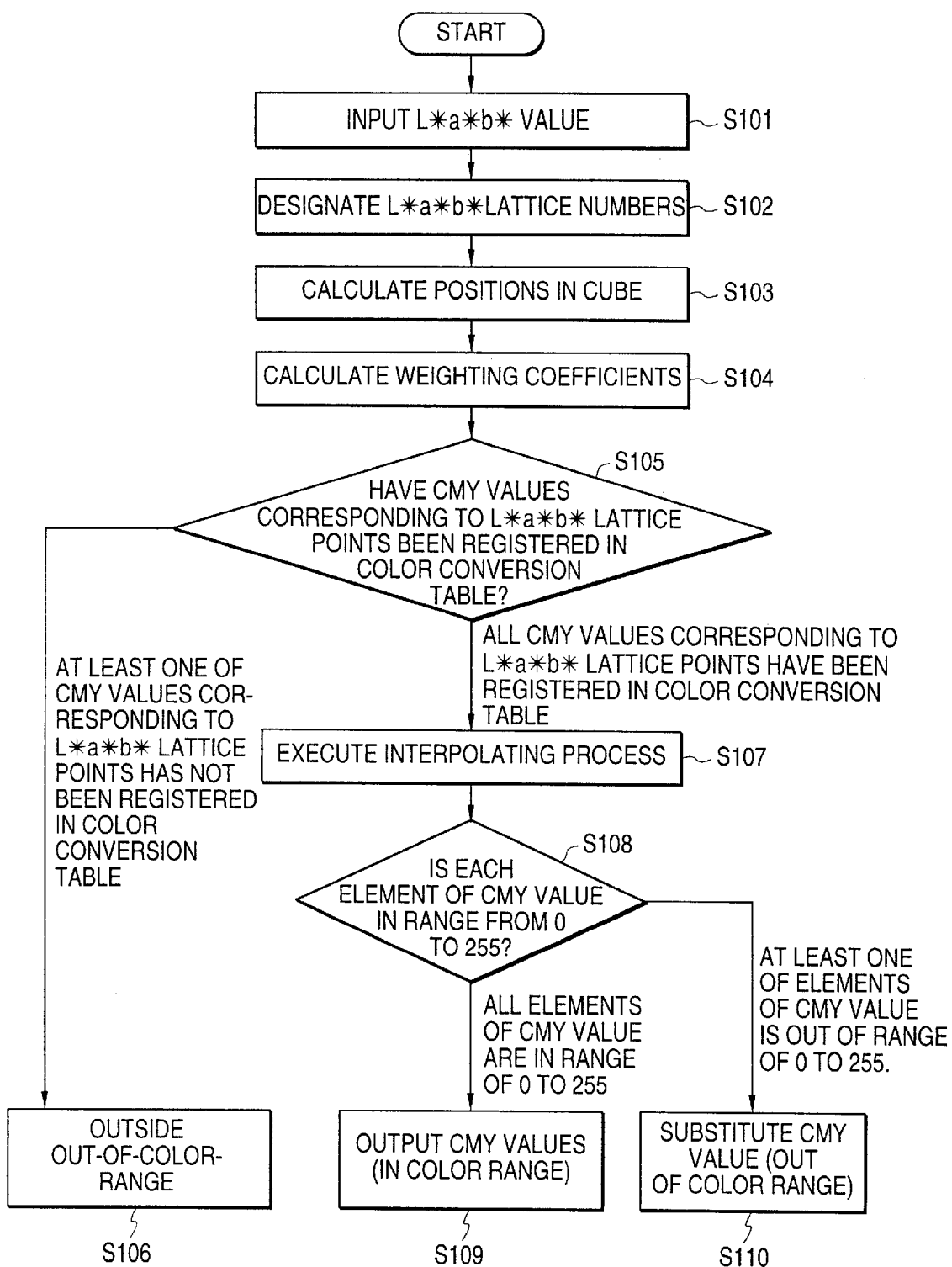
FIG. 34 is a flow chart showing a color range determining method according to an embodiment of the present invention.

FIG. 34 is a flow chart showing an interpolation process according to an embodiment of the present invention.

As shown in FIG. 34, when an L*a*b* value to be converted is input at step S101, L*a*b* numbers at grid points (eight points that surround the L*a*b* value to be converted) used for the interpolating process are designated at step S102.

The positions in a rectangular parallelepiped having as vertexes the grid points used for interpolating the L*a*b* value to be converted at step S103 of FIG. 34 are computed. Volumes of rectangular parallelepipeds of which the cube is divided by the calculated points are obtained as weighing coefficients used for the interpolating process at step S104 of FIG. 34.

Referring to the color conversion table, it is determined whether CMY values corresponding to the L*a*b* grid points used for the interpolating process have been registered in the color conversion table at step S105 of FIG. 24. When at least one of the CMY values has not been designated to the eight L*a*b* grid points used for the interpolating process, it is determined that the L*a*b* value to be converted is outside out-of-color-range at step S106 of FIG. 34.

When all the CMY values have been designated to all the eight L*a*b* grid points used for the interpolating process in the color conversion table, the weighing coefficients calculated at step S104 are multiplied by the CMY values so as to perform the interpolating calculations at step S107 of FIG. 34.

It is then determined in what range of the CMY space the CMY value obtained in the interpolating process is present at step S108 of FIG. 34. When all the elements of the CMY value obtained as the interpolated result are in the range from 0 to 255, it is determined that the CMY value is in the color range and the CMY value is output at step S109 of FIG. 34.

When at least one of the elements of the CMY value obtained as the interpolated result is outside of the range of 0 to 255, it is determined that the CMY value is outside of the color range and the CMY value is substituted for a CMY value within the color range at step S110 of FIG. 34.

Figure 35:
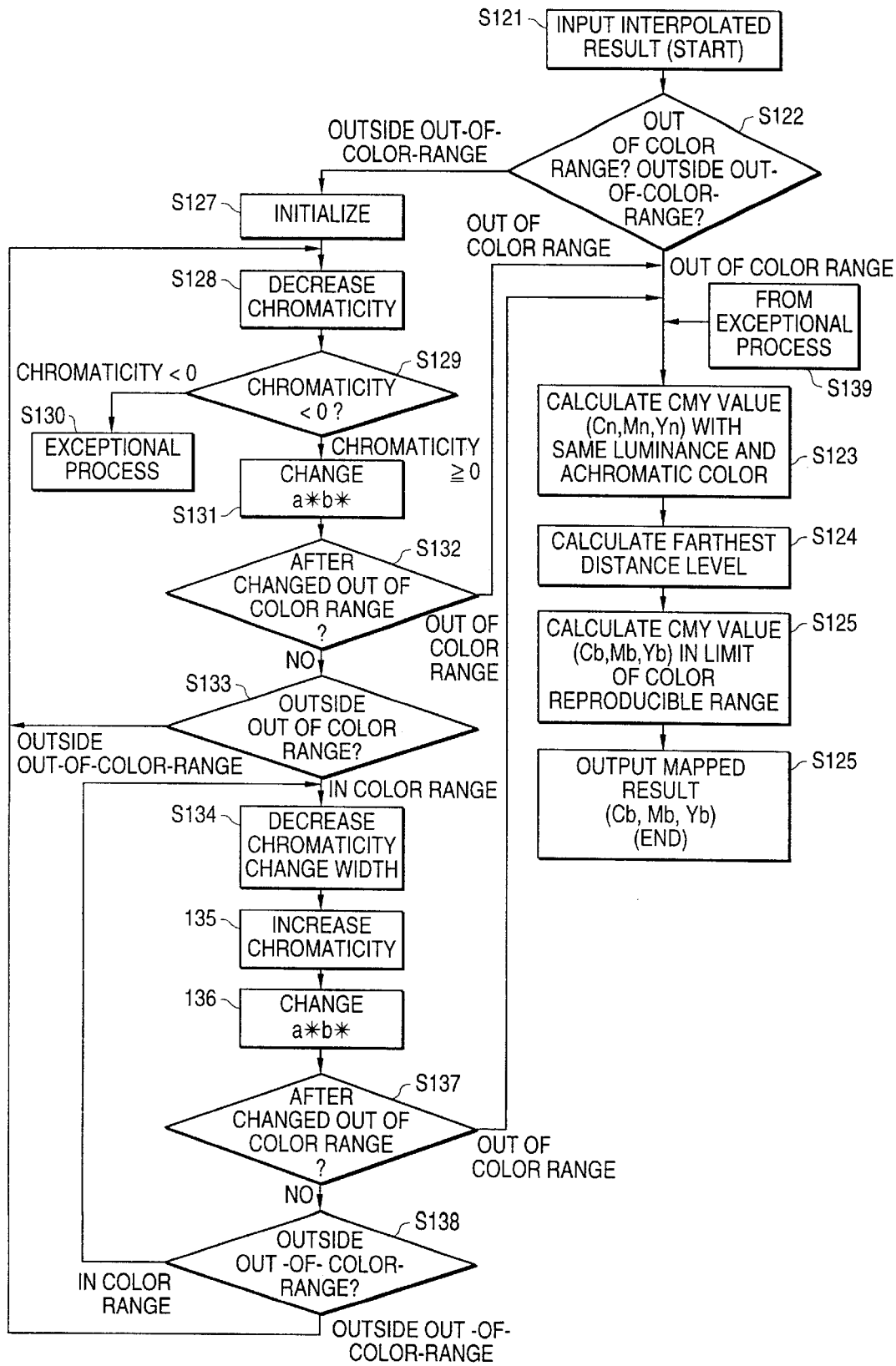
FIG. 35 is a flow chart showing a color substituting process according to an embodiment of the present invention.

FIG. 35 is a flow chart showing a color substituting process according to an embodiment of the present invention.

As shown in FIG. 35, when an interpolated result is input at step S121, it is determined whether the interpolated result is outside of the color range or outside out-of-color-range at step S122.

When the interpolated result is outside of the color range, a CMY value (Cn, Mn, Yn) with the same luminance and achromatic color as the CMY value out of the color range is calculated at step S123 of FIG. 35. Using Formulas (142) through (147), an excess level that represents how far a CMY value out of the color range is apart from the boundary of the color range can be computed at step S124 of FIG. 35.

The CMY value outside of the color range is moved in the direction of the CMY value (Cn, Mn, Yn) with the same luminance and achromatic color by the excess level. Thus, a CMY value (Cb, Mb, Yb) at the boundary of the color range (the limit of the color range) is calculated at step S125 of FIG. 35. The resultant CMY value (Cb, Mb, Yb) is output as a mapped result at step S126 of FIG. 35.

At step S122 of FIG. 35, when the interpolated result is out of the color range, after the chromaticity of the input L*a*b* value and the chromaticity change width and amount are designated at step S127 of FIG. 35, the chromaticity of the input L*a*b* value is decreased (at step S128). As a result, when the chromaticity becomes less than 0 at step S129 of FIG. 35, an exceptions process is performed at step S130 of FIG. 35.

However, as the result of which the chromaticity is decreased, when the chromaticity is 0 or more, the a*b* value is changed at step S131 of FIG. 35. With respect to an L*a*b* value of which the a*b* value has been changed, it is determined whether or not CMY values at vertexes of a cube that contains the L*a*b* value have been registered in the color conversion table. Thus, it is determined whether the L*a*b* value that has been changed is out of the color range at step S132 of FIG. 35. When the resultant L*a*b* value is outside of the color range, processing proceeds to step S123 of FIG. 35. At step S123, the CMY value outside of the color range is substituted with a CMY value in the color range.

When the resultant L*a*b* value is not outside of the color range, it is determined whether the resultant L*a*b* value is outside out-of-color-range at step S133 of FIG. 35. When the resultant L*a*b* value is outside out-of-color-range, processing returns to step S128 of FIG. 35. At step S128, the chromaticity of the L* a*b* value is further decreased.

When the resultant L*a*b* value is in the color range, after the chromaticity change width designated at step S127 is decreased at step S134 of FIG. 35, the chromaticity of the L*a*b* value is increased at step S135 of FIG. 35. Thereafter, the a*b* value is changed at step S136 of FIG. 35. With the L*a*b* value of which the a*b* value has been changed, it is determined whether all CMY value at vertexes of a cube that contains the L*a*b* value have been registered in the color conversion table. Thus, it is determined whether the resultant L*a*b* value is outside of the color range at step S137 of FIG. 35. Consequently, when the resultant L*a*b* value is out of the color range, processing advances to step S123 of FIG. 35. At step S123, the CMY value outside of the color range is substituted with a CMY value in the color range.

However, when the resultant L*a*b* value is not outside of the color range, it is determined whether the resultant L*a*b* value is outside out-of-color-range at step S138 of FIG. 35. When the resultant L*a*b* value is outside out-of-color range, processing returns to step S128 of FIG. 35. At step S128, the chromaticity of the L*a*b* value is decreased. When the resultant L*a*b* value is in the color range, processing returns to step S134. At step S134, the chromaticity change width and amount is further decreased.

Figure 36:
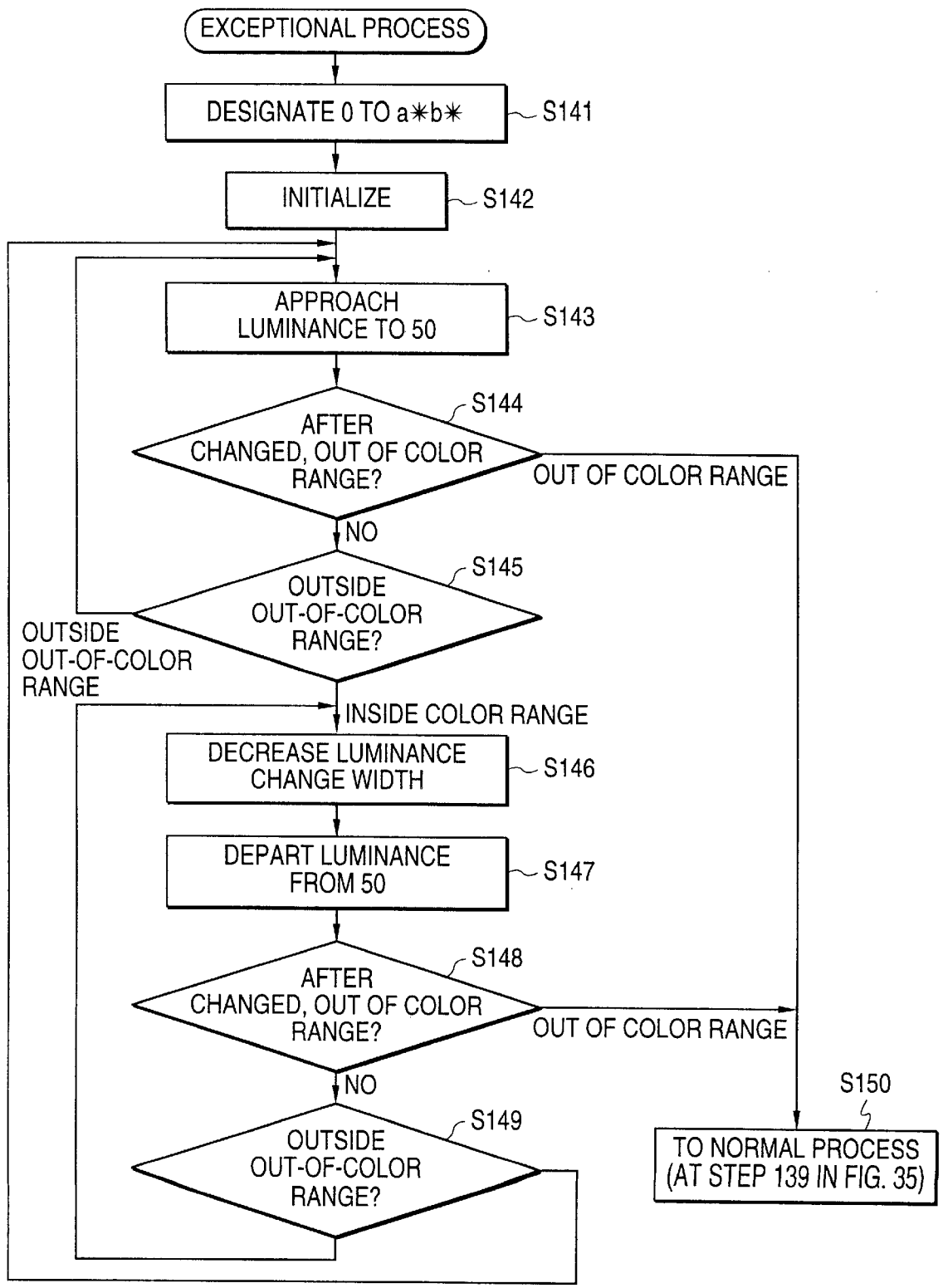
FIG. 36 is a flow chart showing an exceptional process according to an embodiment of the present invention.
Figure 38:
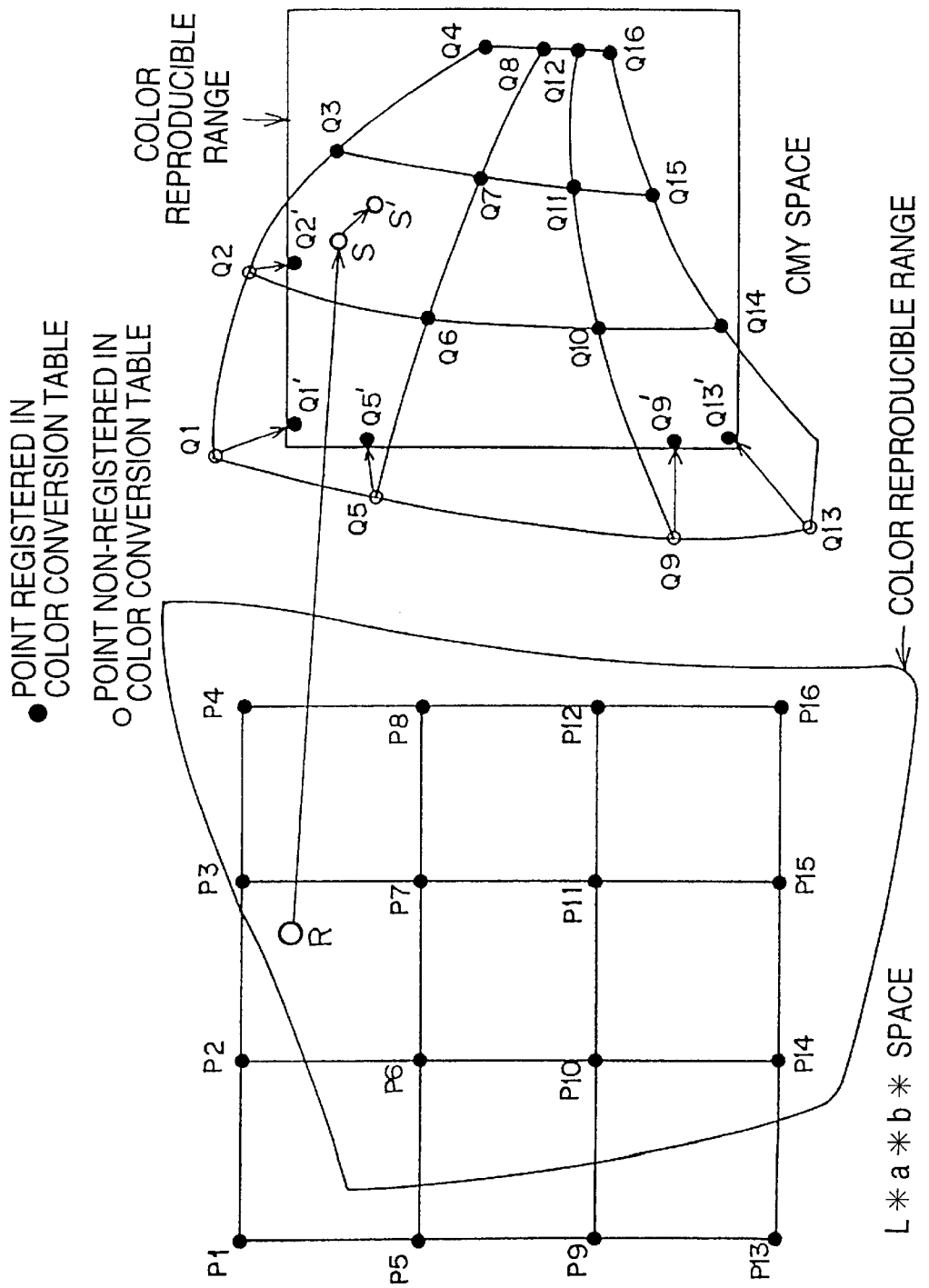
FIG. 38 is a schematic diagram showing the relation between a conventional L*a*b* signal and a CMY signal in a two-dimensional color space.

FIG. 36 is a flow chart showing an exceptional process according to an embodiment of the present invention.

In FIG. 36, 0 is designated to the a*b* value of the input L*a*b* value so as to designate an L*a*b* value with the same luminance and achromatic color as the input L*a*b* value at step S141.

The luminance change width of the L*a*b* value is designated at step S142 of FIG. 36. The luminance is approached to 50 at step S143 of FIG. 36 and thereby the L*a*b* value is changed.

It is then determined whether the resultant L*a*b* value is outside of the color range at step S144. When the resultant L*a*b* value is outside of the color range, the flow advances to step Si 39 of the flow chart shown in FIG. 35 at step S150 of FIG. 36.

However, when the resultant L*a*b* value is not outside of the color range, it is determined whether the resultant L*a*b* value is outside out-of-color-range at step S145 of FIG. 36. When the resultant L*a*b* value is outside out-of-color-range, the flow returns to step S143 of FIG. 36. At step S143, the luminance of the resultant L*a*b* value is further approached to 50.

However, when the resultant L*a*b* value is in the color range, the luminance change width designated at step S142 is decreased at step S146 of FIG. 36. Thereafter, the luminance of the resultant L*a*b* value is departed from 50 at step S147 of FIG. 36. Next, with respect to the L*a*b* value of which the luminance has been departed from 50, it is determined whether all CMY values at vertexes of a cube that contains the L*a*b* value have been registered in the color conversion table. Thus, it is determined whether the resultant L*a*b* value is outside of the color range at step S148 of FIG. 36. Consequently, when the resultant L*a*b* value is out of the color range, processing proceeds to step S150. Thus, the process after step S139 of FIG. 35 is repeated.

However, when the resultant L*a*b* value is not outside of the color range, it is determined whether the resultant L*a*b* values is outside out-of-color-range at step S149 of FIG. 36. When the resultant L*a*b* value is outside out-of-color-range, processing returns to step S143 of FIG. 36. At step S143 of FIG. 36, the luminance of the L*a*b* value is further approached to 50. When the resultant L*a*b* value is in the color range, and processing returns to step S146 of FIG. 36. At step S146, the luminance change width or amount of the L*a*b* value is further decreased.

Since a color signal outside of the color range is substituted with a color signal in the color range, when the color signal is converted, a value outside of the color reproducible range of the device can be prevented from being output. In addition, a color signal to be substituted can be calculated at high speed.

In the embodiment shown in FIG. 30, the color converting apparatus was described. However, the present invention can be also applied to a color range determining apparatus that determines whether an input L*a*b* value is within the color range of the device with a calculated result (CMY value) of an interpolation calculating unit 73.

In particular, when interpolation calculations are performed for determining whether an L*a*b* value is inside the color range of the device or outside of the color range thereof, an identifier that represents the boundary of the color range, an identifier that represents the inside of the color range, and an identifier that represents the outside of the color range may be added to the color conversion table.

When all L*a*b* grid points that are a particular L*a*b* grid point (L, a, b) and adjacent grid points thereof (L+1, a, b), (L, a+1, b), (L, a, b+1), (L, a+1, b+1), (L+1, a, b+1), (L+1, a+1, b), and (L+1, a+1, b+1) correspond to CMY values in the color range of the device, the identifier that represents the inside of the color range is added to the L*a*b* grid points.

When a particular L*a*b* grid point and all adjacent L*a*b* grid points correspond to CMY values outside of the color range of the device (or not designated), the identifier that represents the outside of the color range is added to the L*a*b* grid points.

When a particular L*a*b* grid point and a part of adjacent L*a*b* grid point correspond to CMY values outside of the color range of the device (or not designated), the identifier that represents the boundary of the color range is designated to the L*a*b* grid points.

In the case that such identifiers have been registered in the color conversion table, when an L*a*b* value to be converted is input, before the interpolating calculations for the L*a*b* value is performed, it can be determined whether the L*a*b* value to be converted is inside the color range or outside of the color range at a high speed of processing. When the interpolating calculation is performed for only L*a*b* values with the identifier that represents that the boundary of the color range, it can be determined whether an L*a*b* value to be converted is inside the color range or outside of the color range.

In particular, when the color conversion table is used only for determining whether a particular L*a*b* value is inside the color range or outside of the range, it is not necessary to designate a CMY value to an L*a*b* grid point with an identifier representing the inside or outside of the color range.

Alternatively, the identifier that represents the inside or outside of a color range can be added corresponding to a CMY value at a particular grid point (L, a, b).

FIG. 37 is a schematic diagram showing an example of the content of a color conversion table in which identifiers that represent whether an L*a*b* value is in the color range.

As shown in FIG. 37, assuming that a CMY value that is color-reproducible in the printer is in the range from 0 to 255, an identifier that represents the outside of the color range is added to L*a*b* grid points with L*a*b* values (0, 0, 0), (48, 0,−96), and (48, 0,−80). In addition, an identifier that represents the inside of the color range is added to L*a*b* grid points with L*a*b* values (16, 0, 0), (32, 0, 0), (48, 0,−64), (48, 0, 48), and (48, 0, −32).

When an L*a*b* value to be converted is input, before interpolating calculations for the L*a*b* value are performed, the identifiers of the following L*a*b* grid points are referenced.

(L, a, b), (L+1, a, b), (L, a+1, b),
(L, a, b+1), (L, a+1, b+1), (L+1, a, b+1),
(L+1, a+1, b), (L+1, a+1, b+1)

When all the identifiers added to the L*a*b* grid points represent the inside of the color range, it is determined that the L*a*b* value to be converted is in the color range. In contrast, when the identifiers added to the L*a*b* values represent the outside of the color range, it is determined that L*a*b* value to be converted is out of the color range. When the identifiers added to the L*a*b* grid points represent both the inside and outside of the color range, the interpolation process is actually performed. Thus, it is determined whether the L*a*b* value to be converted is in the color range or out of the color range.

In such a color range determining process, when a color conversion table in which identifiers have not been added is used, CMY values at the following L*a*b* grid points are determined in advance.

(L, a, b), (L+1, a, b), (L, a+1, b),
(L, a, b+1), (L, a+1, b+1), (L+1, a, b+1),
(L+1, a+1, b), (L+1, a+1, b+1)

When all the CMY values at these L*a*b* grid points are in the range from 0 to 255, it is determined that the L*a*b* value to be converted is in the color range. When all the CMY values at these L*a*b* grid points are less than 0 or larger than 255, it is determined that the L*a*b* value to be converted is outside of the color range. When part of the CMY values at these L*a*b* grid points is less than 0 or larger than 255, the interpolation calculating process is performed. Thus, it is determined whether the L*a*b* value to be converted is inside the color range or outside of the color range.

Although a few preferred embodiments of the present invention have been shown and described, it will be appreciated by those skilled in the art that changes may be made in these embodiments without departing from the principles and spirit of the invention, the scope of which is defined in the claims and their equivalents.

Using the above described embodiments, a person of ordinary skill in the art would realize the following aspects, features and benefits of the present invention.

Using the present invention, as described above, the relationship between color signals in a first color space and color signals in a second color space is registered in a color conversion table out of a color reproducible range.

Thereby, even if a color represented with a color signal in the first color space is outside of the color reproducible range, while the color represented with the color signal in the first color space is being kept, it can be registered as a color signal in the second color space to the color conversion table. Thus, when the relationship of color signals that have not been registered in the color conversion table is obtained, even if the relationship of color signals that are outside of the color reproducible range is used, the accuracy of the resultant color can be prevented from deteriorating.

According to an aspect of the present invention, the first color space is a machine-independent color space and the second color space is a machine-dependent color space.

Thus, when a color signal is sent or received between devices that have different color reproducibility, the reproducibility of these devices can be matched.

In addition, according to another aspect of the present invention, the values of the color signals in the first color space are regularly distributed.

Therefore, when the relationship of color signals that have not been registered in the color conversion table is obtained by an interpolating process, color signals used in the interpolating process can be easily selected and thereby the interpolating process can be easily performed. Thus, a color signal can be converted at a high speed of processing.

In addition, according to a still further aspect of the present invention, an identifier for representing a color signal outside of the color reproducible range by greater than a predetermined value is registered in a color conversion table.

Thus, in the case that a color signal outside of the color reproducible range is generated by an extrapolating process with a measured value, when the extrapolating distance becomes significantly large, the influence of an error becomes significantly large also. Consequently, when a color signal is largely outside of a color range, it can be easily determined that there may be a situation in which the accuracy of the resultant color signal is low.

In addition, according to a still further aspect of the present invention, an identifier for representing whether a color signal is in the color reproducible range or outside thereof is registered in the color conversion table.

Thus, with reference to only the color conversion table, the color range of a color signal can be determined. Consequently, the color range of a color signal can be determined at a high processing speed.

According to a still further aspect of the present invention, a third identifier for representing whether or not a color signal is present in the vicinity of the boundary of the color reproducible range is registered in the color conversion table.

Therefore, the color range of a color signal can be determined by actually converting the color only when the identifier is contained in the color conversion table. Consequently, the color range of a color signal can be determined at a high processing speed.

In addition, according to another aspect of the present invention, a color signal interpolating unit for interpolating a color signal corresponding to a color signal in a second color space that is not color-reproducible is provided.

Thereby, a color signal can be interpolated regardless of the color reproducible range of the device. Consequently, when a color signal is interpolated, the accuracy of the resultant color signal can be prevented from deteriorating.

Further, according to an aspect of the present invention, a substituting unit for substituting the interpolated result with a color signal in the second color space that is color-reproducible when the interpolated result is not in the color reproducible range is provided. Thus, a color signal that cannot be handled by a device can be prevented from being output to the device to process the color signal.

In addition, according to an aspect of the present invention, with reference to a color conversion table in which the relationship between color signals in a first color space and color signals in a second color space has been registered outside of a color reproducible range of a device, the relationship of color signals that have not been registered in the color conversion table is obtained by an interpolation process.

Therefore, when a color signal in the first color space that has not been registered in the color conversion table is input and the color signal in the first color space is in the vicinity of the boundary of the color reproducible range, with a color signal outside of the color reproducible range of the device, a color signal in the vicinity of the boundary of the color reproducible range can be interpolated. Consequently, when a color signal is interpolated, the accuracy of the resultant color signal can be prevented from deteriorating.

In addition, according to another aspect of the present invention, a color signal out of a color reproducible range is moved in the direction of a color signal with the same luminance and achromatic color for an excess level from the color reproducible range.

Thus, when a color signal is obtained by an interpolation process, even if the color signal is outside of a color reproducible range of a device, the color signal can be substituted with a color signal that is the closest to the interpolated color signal in the color reproducible range. Consequently, the color reproducibility of the interpolated color signal can be almost matched with the color reproducibility of the substituted color signal. In addition, since a color signal present between a color signal outside of the color reproducible range and a color signal with the same luminance and achromatic color is a color signal at the boundary of the color reproducible range, the color signal can be calculated by a method such as a linear interpolation calculating method.

In addition, according to an aspect of the present invention, when the luminance of a color signal to be converted as a color signal in a color range of a device is high, a color signal with a luminance equal to or lower than that of the color signal to be converted is selected in the color range of the device. When the luminance of the color signal to be converted is low, a color signal with a luminance that is equal to or higher than that of the color signal to be converted is selected.

Since the color reproducible range is wide at a portion with intermediate luminance, a color signal to be converted can be substituted with a color signal close thereto by a method such as a linear interpolation calculating method.

In addition, according to a still further aspect of the present invention, when a color signal to be interpolated has not been registered in a color conversion table, the chromaticity of the color signal to be converted is decreased.

Therefore, even if a color signal to be converted cannot be interpolated, while the luminance and hue of the color signal to be converted are kept, the color signal can be changed to a color signal that can be interpolated. Consequently, while the color reproducibility is nearly kept, a color signal can be converted.

Still further, according to an aspect of the present invention, even if the chromaticity of a color signal to be converted is 0, when a color signal used in an interpolating process has not been registered in a color conversion table, the luminance of the color signal to be converted can be changed from the inside thereof.

Thus, since a color signal used in the interpolating process is detected from the color conversion table at a wide portion of the color reproducible range, the color signal used in the interpolating process can be found.

In addition, according to another aspect of the present invention, a color signal selecting unit for selecting a color signal that is color-reproducible and a color signal extrapolating unit for extrapolating the selected color signal are provided.

Whereby, a color signal that cannot be measured can be calculated. Consequently, a color signal out of a color reproducible range of a device can be generated.

Still further, according to an aspect of the present invention, the relation of color signals out of a color reproducible range of a device is obtained corresponding to the relationship of color signals in the color reproducible range of the device.

Therefore, the relationship of color signals that are not color-reproducible can be calculated. Consequently, the relationship of color signals outside of the color reproducible range of the device can be registered to the color conversion table.

In addition, according to another aspect of the present invention, a first point adjacent to the outside boundary of the color reproducible range of the device in the first color space is selected. A second point adjacent and inside of the first point in the first color space is selected. A third point inside the second point by one position in the first color space is selected. A fourth point in the second color space corresponding to the second point corresponding to the first relationship is obtained. A fifth point in the second color space corresponding to the third point corresponding to the first relation is obtained. A color signal at a sixth point that is point-symmetrical to the fifth point with respect to the fourth point in the second color space is obtained. The color signal at the sixth point to the color conversion table corresponding to the color signal at the first point is registered.

Thus, with a color signal in a color range in the vicinity of a color signal to be generated, a color signal outside of the color range can be generated. Thus, a color signal with high accuracy can be generated outside of the color range. Since a color signal to be generated outside of the color range can be obtained by a simple calculation with color signals at two points in the color range, the color signal outside of the color range can be calculated at high speed.

In addition, according to an aspect of the present invention, an extrapolating position is changed corresponding to the distance of two points used in the extrapolating process.

Therefore, the position of a color signal outside of a color range can be designated. Consequently, intervals of color signals outside of the color range and the designating range of color signals outside of the color range can be widened or narrowed. Thus, the distribution of color signals outside of the color range can be controlled. Consequently, a color signal outside of the color range can be effectively designated.

In addition, according to another aspect of the present invention, a point generated by an extrapolation process is designated on a line that connects two points used in the extrapolating process.

Thus, the relationship of color signals outside of a color range can be generated corresponding to the relationship of a color signal in the color range by linearly extrapolating a color signal in the color range. Consequently, the relation of color signals outside of the color range can be easily generated.

Further, according to a still further aspect of the present invention, by evaluating the distance of two points used in an extrapolating process and/or a straight line that connects the two points, the two points are changed to inner points of the color range.

Therefore, in the case that the color reproduced by a device does not change when the value of a color signal in the vicinity of the boundary of the color range is changed because of a small difference in hue or tone of the color thereof, even if these points are not suitable in the extrapolating process, since there is almost no difference of colors at two points used in an extrapolating process, points used in the extrapolating process can be changed to points where the difference of colors is large. Consequently, when a color signal outside of the color range is generated, the accuracy thereof can be kept.

In addition, according to a still further aspect of the present invention, a first relation between color signals in a first color space and color signals in a second color signal in a color reproducible range of a device is obtained. A second relationship between color signals in the first color space and color signals in the second color signal out of the color reproducible range of the device corresponding to the first relation is obtained. A third relation between color signals in the first color space and color signals in the second color space corresponding to the first relation and the second relation is obtained. The third relation is registered to the color conversion table.

Thus, the relationship of a new color signal can be obtained corresponding to the relationship of a color signal in the color range and a generated color signal outside of the color range. Consequently, the number of color signals registered to the color conversion table can be increased. In addition, a color signal can be substituted with a convenient color signal. Moreover, the relation of a color signal outside the generated color range can be generated. Furthermore, the distribution of color signals in a color range and color signals outside a generated color range can be changed.

Still further, according to another aspect of the present invention, a first relation between color signals irregularly distributed in a first color space and color signals distributed at grid points in a second color space in a color reproducible range of a device is obtained. The first relation is interpolated so as to obtain a second relation between color signals distributed at grid points in the first color space and color signals irregularly distributed in the second color signal in the color reproducible range of the device. The second relation is extrapolated so as to obtain a third relation between color signals distributed at grid points in the first color space and color signals irregularly distributed in the second color space. The second relation and the third relation is registered to a color conversion table.

Thereby, color signals distributed in the first color space can be directly registered to the color conversion table. In addition, since color signals in the first color space are distributed at grid points, when the color signals in the first color space are successively selected and extrapolated, extrapolating points of the color signals in the first color space are generated at equal intervals. Consequently, a color conversion table that allows color signals to be effectively converted outside of the color reproducible range of the device can be generated at high processing speed.

In addition, according to another aspect of the present invention, a first relation between color signals irregularly distributed in a first color space and color signals distributed at grid points in a second color space in a color reproducible range of a device is obtained. The first relation is extrapolated so as to obtain a second relation between color signals irregularly distributed in the first color space and color signals distributed at grid points in the second color space out of the color reproducible range of the device. The first relation and the second relation are interpolated so as to obtain a third relation between color signals distributed at grid points in the first color space and color signals irregularly distributed in the second color signal in the color reproducible range of the device and out of the color reproducible range of the device. The third relation is registered to a color conversion table.

Thus, the second relation outside of the color reproducible range of the device can be obtained by directly extrapolating the first relation. Consequently, the first relation can be accurately measured. Thus, when the second relation out of the color reproducible range of the device is obtained, an error can be prevented from accumulating. After the second relation is obtained and then the interpolating process is performed, color signals distributed in the first color space can be distributed to grid points. Thus, a color conversion table that allows a color signal to be effectively converted out of the color reproducible range of the device can be accurately generated.

Further, according to an aspect of the present invention, a unit cube surrounded by grid points in the second color space is divided into a plurality of cubes. Color signals at the vertexes of the divided cubes are calculated corresponding to the positions of the vertexes. Color signals in the first color space corresponding to the vertexes of the divided cubes are calculated by an interpolation calculating process. Color signals in the second color space at the vertexes of the divided cubes are selected corresponding to the color signals at the grid points in the first color space when the values of the color signals calculated by the interpolation calculating process are in a predetermined range from the values at the grid points in the first color space.

Thus, with the relationship between color signals irregularly distributed in the first color space and color signals in the second color space, the relationship between color signals distributed at grid points in the first color space and the color signals in the second color space can be approximately obtained. In addition, when the number of divided portions of the unit cube is increased, the value of a color signal calculated by an interpolating process can approach a value at a grid point in the first color space. Consequently, the accuracy of the relation between the color signals distributed at grid points in the first color space and the color signals in the second color space can be improved.

In addition, according to another aspect of the present invention, the volumes of rectangular parallelepipeds of which the unit cube is divided at vertexes of the divided cubes are calculated in a second color space. The volumes of the rectangle parallelepipeds calculated in the second color space are used as weighing coefficients in an interpolating process so as to obtain a color signal in the first color space.

Thus, since the color signals are regularly distributed in the second color space, the volumes of rectangular parallelepipeds can be easily obtained. When the volumes of rectangular parallelepipeds obtained in the second color space are used as weighing coefficients in the first color space, a color signal in the first color space can be effectively obtained in an interpolation calculating process.

Still further, according to an aspect of the present invention, a first color signal is input. A second color signal in the vicinity of the first color signal is selected. A color conversion table that has registered the relation of color signals outside of a color reproducible range of a device is referenced. The relationship between the second color signal and a third color signal is detected. The first color signal is converted into a forth color signal corresponding to the relation between the second color signal and the third color signal.

Thus, in the case that because the first color signal has not been registered in the color conversion table, the second color signal in the vicinity of the first color signal is selected from the color conversion table and then converted when the first color signal is converted to the fourth color signal, the relation of the second color signal is not restricted by the color reproducible range of the device. Consequently, the first color signal can be accurately converted into the fourth color signal.

In addition, according to another aspect of the present invention, a second color signal in the vicinity of a first color signal is selected. The second color signal is converted into a third color signal containing a value out of a color reproducible range of a device. It is determined whether the third color signal is in the color reproducible range of the device. Thus, it is determined whether the first color signal is in the color reproducible range of the device.

Therefore, in the case that since the boundary of the color reproducible range of the device is irregular, it is difficult to obtain the color reproducible range of the device in a color space of the first color signal that has not been registered in the color conversion table, the color range of the second color signal registered in the color conversion table can be evaluated in the color space of the third color signal of which the boundary of the color reproducible range of the device is regular and thereby the color reproducible range of the device can be easily obtained. In addition, since the color range of the second color signal can be treated as the color range of the first color signal, the color range of the first color signal that has not been registered in the color conversion table can be effectively determined.

Further, according to a still further aspect of the present invention, a second color signal in the vicinity of the first color signal is selected. The second color signal is converted into a third color signal containing a value out of a color reproducible range of a device. The first color signal is converted into a fourth color signal corresponding to the third color signal. It is determined whether the fourth color signal is in the color reproducible range of the device. It is determining whether the first color signal is in the color reproducible range of the device corresponding to the determined result of the fourth color signal.

Thus, in the case that since the boundary of the color reproducible range of the device is irregular, it is difficult to obtain the color reproducible range of the device in a color space of the first color signal that has not been registered in the color conversion table, the first color signal can be interpolated corresponding to the second color signal registered in the color conversion table. In addition, since the color range can be determined in a color space of which the boundary of the color reproducible range of the device is regular and thereby the color reproducible range of the device can be easily obtained, the color range of the first color signal that has not been registered in the color conversion table can be effectively determined.

Still further, according to another aspect of the present invention, it is determined that the first color signal is in the color reproducible range when the third color signal contains only a value in the color reproducible range of the device. It is determined that the first color signal is outside of the color reproducible range of the device when the third color signal contains only a value out of the color reproducible range of the device.

Thus, even if the first color signal that has not been registered in the color conversion table is input, it can be determined whether the first color signal is in the color reproducible range of the device or out thereof without need to interpolating the first color signal. Consequently, the color range can be determined at high speed.

In the case that an L*a*b* signal is converted into a CMY signal was described. However, the present invention can be applied to an RGB signal, L*u*v* signal, and an XYZ signal. In addition, the present invention can be applied to a CMYK (cyan, magenta, yellow, black) signal.

As described above, according to the present invention, the relationship among color signals is registered in the color conversion table out of the color reproducible range. Thus, when the relation of a color signal that has not been registered in the color conversion table is obtained by an interpolation process, even if the relation of the color signal out of the color reproducible range is used, the accuracy of the resultant signal in the interpolating process can be prevented from deteriorating.

According to an aspect of the present invention, the relationship between an independent color space that is independent from a device and a device dependent space that is dependent on the device is registered in a color conversion table outside of the color reproducible range of the device. Thus, even if a color signal is sent or received between devices that have different color reproducibility, the color reproducibility of each device can be matched.

According to another aspect of the present invention, values of color signals in the independent color space that is independent from a device are regularly distributed. Thus, when the relationship between color signals that have not been registered in a color conversion table is obtained by an interpolating process, color signals used in the interpolating process and interpolating calculations can be easily performed. Consequently, a color signal can be converted at high speed.

According to a still further aspect of the present invention, an identifier for a color signal apart from a color reproducible range by a predetermined value is registered in a color conversion table. Thus, in the case that a color signal outside of the color reproducible range is generated by for example an extrapolating process or the like with measured values, when the extrapolating distance becomes large, the influence against an error becomes large. Consequently, when a color signal is largely separate from a color range, it can be easily determined that there may be a situation of which the accuracy of the resultant color signal is low.

According to another aspect of the present invention, an identifier that represents whether a color signal is in a color reproducible range is registered in a color conversion table. Thus, when the color range of a color signal is determined, only with reference to the color conversion table, the color range of the color signal can be determined. Consequently, the color range of the color signal can be determined at high processing speed.

According to a still further aspect of the present invention, an identifier that represents whether a color signal is present in the vicinity of the boundary of a color reproducible range is registered in a color conversion table. Thus, when the color range of a color signal is determined, the necessity for converting a color signal can be easily determined. Consequently, the determination of the color range of a color signal can be effectively performed.

According to another aspect of the present invention, a color signal is interpolated corresponding to a color signal that is not color-reproducible. Thus, without an influence of the color reproducible range of a device, a color signal can be interpolated. Consequently, the accuracy for the resultant color signal in the interpolating process can be prevented from deteriorating.

According to a further aspect of the present invention, when an interpolated result is outside of a color reproducible range, the interpolated result is substituted with a color signal that is color-reproducible. Thus, a color signal that a device cannot handle can be prevented from being output to the device to process the color signal without fail.

According to a still further aspect of the present invention, a color signal that is out of a color reproducible range is substituted with a color signal at the boundary of the color reproducible range in color signals with the same luminance and achromatic color. Thus, with a simple method such as a linear interpolation calculating method, a substituting calculation can be performed.

According to another aspect of the present invention, a color signal that is color-reproducible is extrapolated. Thus, a color signal that is not color-reproducible can be calculated. Consequently, a color signal outside of the color reproducible range of a device can be generated.

According to a further aspect of the present invention, color signals in a color range adjacent to a color signal to be generated are extrapolated. Thus, a color signal can be accurately generated out of the color range. In addition, a color signal to be generated out of the color range can be calculated with simple calculations using color signals at two points in the color range. Consequently, a color signal out of the color range can be calculated at high speed.

According to another aspect of the present invention, an extrapolating position is changed corresponding to the distance between two points used in the extrapolating process. Thus, the distribution of color signals out of the color range can be controlled. Consequently, a color signal outside of the color range can be effectively designated.

According to a still further aspect of the present invention, by linearly extrapolating a color signal in a color range, a color signal outside of the color range can be easily generated.

According to a further aspect of the present invention, because there is almost no difference between colors at two points used in an extrapolating process, when it is determined that there is a large error at the points generated by the extrapolating process, the points used in the extrapolating process are changed to points with colors that are largely different. Consequently, a color signal out of the color range can be accurately generated.

According to another aspect of the present invention, the relation for a new color signal is generated corresponding to the relation between a color signal in a color range and a generated color signal outside of the color range. Thus, a number of color signals to be registered in a color conversion table can be increased. Moreover, a color signal can be substituted with a convenient color signal. Furthermore, the relation between an input color signal and a color signal outside the generated color range can be generated. In addition, the distribution of color signals in the color range or out of the generated color range can be changed.

According to a still further aspect of the present invention, a grid point in a color space that is independent from a device is extrapolated and thereby the relationship of a color signal outside of a color reproducible range of the device is generated. Thus, extrapolating points in a color space that is independent from the device can be generated at equal intervals. Consequently, a color conversion table that allows a color to be effectively converted out of the color reproducible range of the device can be generated at high speed.

According to another aspect of the present invention, after the relationship of a color signal outside of a color reproducible range of a device is obtained, an interpolation process is performed so that color signals in a color space that is independent from the device are distributed at grid points. Thus, a color conversion table that allows a color to be effectively converted out of the color reproducible range of the device can be accurately generated.

According to a still further aspect of the present invention, the relation of color signals regularly distributed in a second color space is improved by an interpolating process. In addition, a color signal that is the closest to a grid point in a first color space is detected from these color signals. Thus, the relationship between color signals distributed at grid points in the first color space and color signals in the second color space can be approximately obtained corresponding to the relationship between color signals irregularly distributed in the first color space and color signals in the second color space. Moreover, when the number of interpolating points is increased, the accuracy of the relation between the color signals distributed at grid points in the first color space and the color signals in the second space can be improved.

According to another aspect of the present invention, weighing coefficients calculated in a second color space in which color signals are regularly distributed are used for obtaining color signals irregularly distributed in a first color space. Thus, even if it is difficult to calculate weighing coefficients in the first color space, a color signal in the first color space can be effectively obtained by an interpolation calculating process.

According to a still further aspect of the present invention, with reference to a color conversion table registering the relationship of color signals outside of a color reproducible range of a device, because the first color signal has not been registered in the color conversion table, even if a second color signal in the vicinity of the first color signal is selected from the color conversion table and converted when a first color signal is converted into a fourth color signal, the relation of the second color signal is not restricted by the color reproducible range of the device. Thus, the first color signal can be accurately converted into the fourth color signal.

According to a further aspect of the present invention, when a first color signal that has not been registered in a color conversion table is input, the color range of a second color signal that has been registered in the color conversion table is evaluated in a color space of a third color signal of which the boundary of the color reproducible range of a device is regular and the color reproducible range of the device can be obtained. The color range of the second color signal is determined as the color range of the first color signal. Thus, since the boundary of the color reproducible range of the device is irregular, even if it is difficult to obtain the color reproducible range of the device, the determination of the color range of the first color signal that has not been registered in the color conversion table can be effectively performed.

According to a still further aspect of the present invention, when a first color signal that has not been registered in a color conversion table is input, the first color signal is interpolated corresponding to a second color signal registered in the color conversion table. The color range of a fourth color signal as the interpolated result is determined in a color space of which the boundary of the color reproducible range of the device is regular and thereby can be easily obtained. Thus, even if it is difficult to obtain the color reproducible range of the device in the color space of the first color signal, because of an irregular boundary of the color reproducible range of the device, the determination of the color range of the first color signal that has not been registered in the color conversion table can be effectively performed.

What is claimed is:

1. A color signal conversion device converting a color signal between a first color space and a second color space, comprising:

a color conversion table comprising a relation between color signals in said first color space and color signals in said second color space represented out of a color reproducible range, the color conversion table comprising a result of a first color conversion converting an input color signal belonging to said first color space to a reproducible color signal belonging to said second color space and a result of a second color conversion converting the input color signal to an unreproducible color signal belonging to said second color space; and a color converting unit to convert said color signal using said result of the first color conversion and said result of the second color conversion to accurately reproduce a color image from said first color space on said second color space.

2. The color signal conversion device as recited in claim 1, wherein the first color space is a device-independent color space, and the second color space is a device-dependent color space.

3. The color signal conversion device as recited in claim 1, wherein values of the color signals in the first color space are regularly distributed.

4. The color signal conversion device as recited in claim 1, wherein said color conversion table further comprises a first identifier representing a color signal apart from the color reproducible range by larger than a predetermined value in the first color space.

5. The color signal conversion device as recited in claim 4, wherein said color conversion table further comprises a second identifier representing whether a color signal is inside the color reproducible range or outside of the color reproducible range in the first color space.

6. The color signal conversion device as recited in claim 5, wherein said color conversion table further comprises a third identifier to represent whether a color signal is present in a vicinity of a boundary of the color reproducible range in the first color space.

7. A color converting apparatus, comprising:

a color converting unit to convert a color signal of a first color space into a color signal of a second color space that is not color-reproducible, the color converting unit comprising a result of a first color conversion converting an input color signal belonging to said first color space to a reproducible color signal belonging to said second color space and a result of a second color conversion converting the input color signal to an unreproducible color signal belonging to said second color space; and a color interpolating unit to interpolate a color signal corresponding to a color signal in a second color space that is not color-reproducible.

8. The color converting apparatus as recited in claim 7, further comprising:

a color range determining unit to determine whether the interpolated result is in a color reproducible range; and a substituting unit to substitute the interpolated result with a color signal in the second color space that is color-reproducible when the interpolated result is not in the color reproducible range.

9. A color converting apparatus, comprising:
   color reproduction means to reproduce a color in a predetermined range of a first color space;
   a color converting unit to convert a color signal in a second color space into a color signal outside of the predetermined range in the first color space, the color converting unit comprising a result of a first color conversion converting an input color signal belonging to said first color space to a reproducible color signal belonging to said second color space and a result of a second color conversion converting the input color signal to an unreproducible color signal belonging to said second color space; and
   an interpolating unit to interpolate a color signal corresponding to a converted result into the color signal in the first color space.

10. The color converting apparatus as recited in claim 9, further comprising:
   a substituting unit to substitute said interpolated color signal with a color signal in said predetermined range when said interpolated color signal is outside of said predetermined range.

11. The color converting apparatus as recited in claim 10, wherein said first color space is one of a CMY space, a CMYK space and a RGB space, and said second color space is one of a L*a*b* space, L*u*v space and a XYZ space.

12. A color converting apparatus, comprising:
   input means to input a color signal in a first color space;
   a color signal selecting unit to select grid points that surround the color signal input in the first color space;
   a color conversion table comprising a relation between a color signal at a grid point in the first color space and a color signal in a second color space, the relation being a representation of both inside and outside of a color reproducible range of a color reproduction device, the color conversion table comprising a result of a first color conversion converting an input color signal belonging to said first color space to a reproducible color signal belonging to said second color space and a result of a second color conversion converting the input color signal to an unreproducible color signal belonging to said second color space;
   a proximity color detecting unit to detect a color signal in the second color space corresponding to the selected grid point by referencing said color conversion table;
   weight calculating means for calculating a weighing coefficient corresponding to the position of the input color signal in the first color space; and
   first color signal calculating means for calculating a color signal in the second color space corresponding to the color signal in the first color space input from said input means, corresponding to the color signal in the second color space detected from said color conversion table and the calculated weighing coefficient.

13. The color converting apparatus as recited in claim 12, further comprising:
   a first color range determining unit to determine whether the color signal calculated by said first color signal calculating means is in the color reproducible range of the color reproduction device; and
   a first color substituting unit to substitute the color signal calculated by said first color signal calculating means with a color signal in the color reproducible range of the color reproduction device when said first color range determining unit has determined that the color signal calculated by said first color signal calculating means is outside of the color reproducible range of the color reproduction device.

14. The color converting apparatus as recited in claim 13, wherein said first color substituting unit comprises:
   a second color signal calculating unit to calculate a color signal with the same luminance and achromatic color as the color signal calculated by said first color signal calculating unit;
   excess level calculating means for calculating an excess level that represents how far the color signal calculated by said first color signal calculating means is separated from the color reproducible range of the color reproduction device; and
   color signal moving means for moving the color signal calculated by said first color signal calculating means in the direction of the color signal with the same luminance and achromatic color by said excess level.

15. The color converting apparatus as recited in claim 14, further comprising:
   first luminance changing means for changing the luminance of the color signal with the same luminance and achromatic color to a value equal to or less than a first level when the luminance of the color signal with the same luminance and achromatic color exceeds the first level; and
   second luminance changing means for changing the luminance of the color signal with the same luminance and achromatic color to a value equal to or greater than a second level when the luminance of the color signal with the same luminance and achromatic color is less than the second level.

16. The color converting apparatus as recited in claim 12, further comprising:
   a second color range determining unit to determine whether a color signal in the second color space corresponding to the grid point selected by said color signal selecting unit has been registered in said color conversion table; and
   a second color substituting unit to move the color signal in the first color space that has been input by said input means toward the center of the color reproducible range of the device when the color signal in the second color space has not been registered in said color conversion table.

17. The color converting apparatus as recited in claim 16, wherein said second color substituting unit further comprises:
   chromaticity decreasing means for decreasing the chromaticity of the color signal in the first color space that has been input by said input means when the color signal in the second color space has not been registered in said color conversion table.

18. The color converting apparatus as recited in claim 17, further comprising:
   third luminance changing means for changing the luminance of the color signal in the first color space that has been input by said input means toward the center of the color reproducible space, when the color signal in the second color space registered in said color conversion table is not detected in the case that the chromaticity of the color signal in the first color space that has been input by said input means is 0.

19. A color signal generating apparatus, comprising:
color signal generating means for generating a color signal that is not color-reproducible corresponding to a color signal that is color-reproducible, the color signal generating means comprising a result of a first color conversion converting an input color signal belonging to a first color space to a reproducible color signal belonging to a second color space and a result of a second color conversion converting the input color signal to an unreproducible color signal belonging to the second color space.

20. The color signal generating apparatus as recited in claim 19, wherein said color signal generating means comprises:
a color signal selecting unit for selecting a color signal that is color-reproducible; and
a color signal extrapolating unit for extrapolating the selected color signal.

21. A method for converting a color signal between a first color space and a second color space, comprising the steps of:
generating a color conversion table, comprising the steps of:
obtaining a first relation between color signals in said first color space and color signals in said second color space in a color reproducible range of a device;
obtaining a second relation between color signals in the first color space and color signals in the second color space out of the color reproducible range of the device corresponding to the first relation; and
registering the first relation and the second relation to said color conversion table;
converting the color signal using the first relation and second relation stored in the color conversion table.

22. The method for converting a color signal between a first color space and a second color space as recited in claim 21, wherein the step of generating the color conversion table further comprising the steps of:
selecting a first point adjacent to a outside boundary of the color reproducible range of the device in the first color space;
selecting a second point adjacent the first point and toward the center of the first color space;
selecting a third point which is adjacent to the second point by one position and further toward the center of the first color space;
obtaining a fourth point in the second color space corresponding to the second point and corresponding to the first relation;
obtaining a fifth point in the second color space corresponding to the third point and corresponding to the first relation;
obtaining a color signal at a sixth point that is point-symmetrical to the fifth point with respect to the fourth point in the second color space; and
registering the color signal at the sixth point to the color conversion table corresponding to the color signal at the first point.

23. The method for converting a color signal between a first color space and a second color space as recited in claim 22, wherein the step of generating the color conversion table further comprising the steps of:
calculating the distance between the fourth point and the fifth point in the second color space;
generating a seventh point in the second color space corresponding to the distance between the fourth point and the fifth point in the second color space;
calculating a multiple of the distance between the forth point and the seventh point corresponding to the distance between the fourth point and the fifth point in the second color space;
calculating an eighth point outside the second point by the position represented by the multiple in the first color space; and
registering a color signal at the seventh point in the second color space to the color conversion table corresponding to a color signal at the eighth point in the first color space.

24. The method for converting a color signal between a first color space and a second color space as recited in claim 23, wherein the seventh point in the second color space is generated in the direction of which the fourth point faces the fifth point.

25. The method for converting a color signal between a first color space and a second color space as recited in claim 24, wherein the step of generating the color conversion table further comprising the steps of:
evaluating the distance between the fourth point and the fifth point in the second color space or the direction of which the fourth point in the second color space faces the fifth point;
determining whether the distance or direction satisfies a predetermined condition; and
selecting a ninth point inside the third point in the first color space by one position when the distance or the direction does not satisfy the predetermined condition.

26. The method for converting a color signal between a first color space and a second color space as recited in claim 24, wherein the step of generating the color conversion table further comprising the steps of:
evaluating the distance between the fourth point and the fifth point in the second color space and the direction of which the fourth point in the second color space faces the fifth point;
determining whether both the distance and direction satisfies a predetermined condition; and
selecting a ninth point inside the third point in the first color space by one position when both the distance and the direction does not satisfy the predetermined condition.

27. A method for converting a color signal between a first color space and a second color space, comprising the steps of:
generating a color conversion table, comprising the steps of:
obtaining a first relation between color signals in said first color space and color signals in said second color signal in a color reproducible range of a device;
obtaining a second relation between color signals in the first color space and color signals in the second color signal out of the color reproducible range of the device corresponding to the first relation;
obtaining a third relation between color signals in the first color space and color signals in the second color space corresponding to the first relation and the second relation;
registering the third relation to a color conversion table; and
converting the color signal using the third relation stored in the color conversion table.

28. A method for converting a color signal between a first color space and a second color space, comprising the steps of:

generating a color conversion table, comprising the steps of:
  obtaining a first relation between color signals irregularly distributed in said first color space and color signals distributed at grid points in said second color space in a color reproducible range of a device;
  interpolating the first relation so as to obtain a second relation between color signals distributed at grid points in the first color space and color signals irregularly distributed in the second color signal in the color reproducible range of the device;
  extrapolating the second relation so as to obtain a third relation between color signals distributed at grid points in the first color space and color signals irregularly distributed in the second color space;
  registering the second relation and the third relation to said color conversion table; and
converting the color signal using the second relation and third relation stored in the color conversion table.

29. A method for converting a color signal between a first color space and a second color space as recited in claim 28, wherein the step of generating a color conversion table, further comprises the steps of:
  dividing a unit cube surrounded by grid points in the second color space into a plurality of cubes;
  calculating color signals in the second color space at the vertexes of the divided cubes corresponding to the positions of the vertexes;
  calculating color signals in the first color space corresponding to the vertexes of the divided cubes by an interpolation calculating process;
  comparing the values of the color signals calculated by the interpolation calculating process with the values at the grid points in the first color space; and
  selecting color signals in the second color space at the vertexes of the divided cubes corresponding to the color signals at the grid points in the first color space, when the values of the color signals calculated by the interpolation calculating process are in a predetermined range from the values at the grid points in the first color space.

30. A method for converting a color signal between a first color space and a second color space as recited in claim 29, wherein the interpolation calculating process comprises the steps of:
  calculating the volumes of rectangular parallelepipeds of which the unit cube is divided at the vertexes of the divided cubes;
  referencing the color conversion table so as to detect color signals in the first color space corresponding to grid points that surround the vertexes of the divided cubes; and
  multiplying the detected color signals in the first color space by the volumes of the rectangular parallelepipeds so as to calculate color signals in the first color space corresponding to the vertexes of the divided cubes.

31. A method for converting a color signal between a first color space and a second color space, comprising the steps of:
  generating a color conversion table, comprising the steps of:
    obtaining a first relation between color signals irregularly distributed in said first color space and color signals distributed at grid points in said second color space in a color reproducible range of a device;
    extrapolating the first relation so as to obtain a second relation between color signals irregularly distributed in the first color space and color signals distributed at grid points in the second color space out of the color reproducible range of the device;
    interpolating the first relation and the second relation so as to obtain a third relation between color signals distributed at grid points in the first color space and color signals irregularly distributed in the second color signal in the color reproducible range of the device and out of the color reproducible range of the device;
    registering the third relation to a color conversion table; and
  converting the color signal using the first relation and second relation stored in the color conversion table.

32. A method for converting a color signal between a first color space and a second color space as recited in claim 31, wherein the step of generating a color conversion table, further comprises the steps of:
  dividing a unit cube surrounded by grid points in the second color space into a plurality of cubes;
  calculating color signals in the second color space at the vertexes of the divided cubes corresponding to the positions of the vertexes;
  calculating color signals in the first color space corresponding to the vertexes of the divided cubes by an interpolation calculating process;
  comparing the values of the color signals calculated by the interpolation calculating process with the values at the grid points in the first color space; and
  selecting color signals in the second color space at the vertexes of the divided cubes corresponding to the color signals at the grid points in the first color space, when the values of the color signals calculated by the interpolation calculating process are in a predetermined range from the values at the grid points in the first color space.

33. A method for converting a color signal between a first color space and a second color space as recited in claim 32, wherein the interpolation calculating process comprises the steps of:
  calculating the volumes of rectangular parallelepipeds of which the unit cube is divided at the vertexes of the divided cubes;
  referencing the color conversion table to detect color signals in the first color space corresponding to grid points that surround the vertexes of the divided cubes; and
  multiplying the detected color signals in the first color space by the volumes of the rectangular parallelepipeds so as to calculate color signals in the first color space corresponding to the vertexes of the divided cubes.

34. A color range determining method, comprising the steps of:
  inputting a first color signal;
  selecting a second color signal in the vicinity of the first color signal;
  referencing a color conversion table that has registered the relation of color signals being both in and out of a color reproducible range of a device;
  detecting the relation between the second color signal and a third color signal;
  determining whether the third color signal is in the color reproducible range of the device; and determining whether the first color signal is in the color reproducible range of the device corresponding to the determined result of the third color signal.

35. A color range determining method, comprising the steps of:

inputting a first color signal;

selecting a second color signal in the vicinity of the first color signal;

converting the second color signal into a third color signal containing a value out of a color reproducible range of a device;

converting the first color signal into a fourth color signal using the third color signal;

determining whether the fourth color signal is in the color reproducible range of the device; and determining whether the first color signal is in the color reproducible range of the device corresponding to the determined result of the fourth color signal.

36. The color range determining method as recited in claim 35, further comprising the steps of:

determining whether the third color signal is in the color reproducible range of the device;

determining that the first color signal is in the color reproducible range when the third color signal contains only a value in the color reproducible range of the device; and determining that the first color signal is out of the color reproducible range of the device when the third color signal contains only a value out of the color reproducible range of the device.

37. A method for converting a color signal using a computer program embodied on a computer-readable storage medium, comprising the steps of:

converting the color signal in a first color space into a color signal that is not color-reproducible in a second color space;

interpolating the color signal corresponding to the color signal that is not color-reproducible in the second color space;

determining whether the interpolated color signal is in a color reproducible range; and substituting the interpolated color signal with a color signal that is color-reproducible in the second color space when the interpolated result is out of the color reproducible range.

38. A method for converting a color signal using a computer program embodied on a computer-readable storage medium, comprising the steps of:

obtaining a first relation between color signals in a first color space and color signals in a second color space;

obtaining a second relation between color signals in the first color space and color signals in the second color space out of a color reproducible range of a device; and registering the first relation and the second relation to a color conversion table.

39. A method for converting a color signal using a computer program embodied on a computer-readable record medium, comprising the steps of:

inputting a first color signal;

selecting a second color signal in the vicinity of the first color signal;

converting the second color signal into a third color signal containing a value out of a color reproducible range of a device;

converting the first color signal into a fourth color signal corresponding to the third color signal;

determining whether the fourth color signal is in the color reproducible range of the device; and determining whether the first color signal is in the color reproducing range of the device corresponding to the determined result of the fourth color signal.

* * * * *